(12) United States Patent
Dioumaev

(10) Patent No.: US 7,943,721 B2
(45) Date of Patent: May 17, 2011

(54) LINEAR AND CROSS-LINKED HIGH MOLECULAR WEIGHT POLYSILANES, POLYGERMANES, AND COPOLYMERS THEREOF, COMPOSITIONS CONTAINING THE SAME, AND METHODS OF MAKING AND USING SUCH COMPOUNDS AND COMPOSITIONS

(75) Inventor: Vladimir K. Dioumaev, Mountain View, CA (US)

(73) Assignee: Kovio, Inc., Milpitas, CA (US)

(\*) Notice: Subject to any disclaimer, the term of this patent is extended or adjusted under 35 U.S.C. 154(b) by 762 days.

(21) Appl. No.: 11/543,414

(22) Filed: Oct. 5, 2006

(65) Prior Publication Data
US 2007/0078252 A1 Apr. 5, 2007

Related U.S. Application Data

(60) Provisional application No. 60/724,216, filed on Oct. 5, 2006.

(51) Int. Cl.
C08G 77/08 (2006.01)

(52) U.S. Cl. ............... 528/31; 528/15; 528/16; 528/17; 528/18; 528/34; 528/39

(58) Field of Classification Search .................... 528/14, 528/10, 12, 20, 31, 33, 15, 16, 17, 18, 34, 528/39

See application file for complete search history.

(56) References Cited

U.S. PATENT DOCUMENTS

| | | | |
|---|---|---|---|
| 3,485,862 A | | 12/1969 | Margrave et al. |
| 4,704,444 A | * | 11/1987 | Brown-Wensley et al. .... 528/25 |
| 4,792,460 A | | 12/1988 | Chu et al. |
| 4,841,083 A | * | 6/1989 | Nagai et al. .................... 556/430 |
| 4,992,520 A | | 2/1991 | Zeigler |
| 4,997,899 A | * | 3/1991 | Fujino .............................. 528/9 |
| 5,229,481 A | | 7/1993 | Tilley |
| 5,252,766 A | | 10/1993 | Sakakura et al. |
| 5,599,892 A | | 2/1997 | Hayashida |
| 5,700,400 A | | 12/1997 | Ikai et al. |
| 5,717,051 A | | 2/1998 | Hiraoka et al. |
| 5,866,471 A | | 2/1999 | Beppu et al. |
| 5,942,637 A | | 8/1999 | Boudjouk et al. |
| 6,025,117 A | * | 2/2000 | Nakano et al. ................. 430/314 |
| 6,174,982 B1 | | 1/2001 | Nishida et al. |
| 6,593,392 B2 | | 7/2003 | Wang |
| 6,624,254 B1 | | 9/2003 | Arriola et al. |
| 6,878,184 B1 | | 4/2005 | Rockenberger et al. |
| 6,936,181 B2 | | 8/2005 | Bulthaup et al. |
| 6,957,608 B1 | | 10/2005 | Hubert et al. |
| 7,067,069 B2 | | 6/2006 | Shiho et al. |
| 7,078,276 B1 | | 7/2006 | Zurcher et al. |
| 7,485,691 B1 | | 2/2009 | Guo et al. |
| 7,491,782 B1 | | 2/2009 | Guo et al. |
| 2002/0177660 A1 | * | 11/2002 | Imoto et al. .................... 525/100 |
| 2003/0045632 A1 | | 3/2003 | Shiho et al. |
| 2003/0229190 A1 | | 12/2003 | Aoki et al. |
| 2004/0029364 A1 | | 2/2004 | Aoki et al. |
| 2004/0248429 A1 | | 12/2004 | Aoki et al. |
| 2005/0008880 A1 | | 1/2005 | Kunze et al. |
| 2005/0145163 A1 | | 7/2005 | Matsuki et al. |
| 2005/0163938 A1 | | 7/2005 | Yamazaki et al. |
| 2005/0208740 A1 | | 9/2005 | Todd |
| 2006/0154036 A1 | | 7/2006 | Kunze et al. |
| 2006/0157677 A1 | | 7/2006 | Kunze et al. |
| 2006/0185712 A1 | | 8/2006 | Shiho et al. |
| 2008/0022897 A1 | | 1/2008 | Zurcher et al. |
| 2008/0085373 A1 | | 4/2008 | Karshtedt et al. |

FOREIGN PATENT DOCUMENTS

| | | |
|---|---|---|
| CA | 1213375 | 10/1986 |
| CN | 1297578 | 5/2001 |
| DE | 2 139 155 | 2/1973 |
| DE | 31 22 992 A1 | 2/1982 |
| DE | 34 26 822 | 7/1984 |

(Continued)

OTHER PUBLICATIONS

Ando et al., "Reductive Coupling Reactions of Dihalogenogermanes with Magnesium and Magnesium Bromide: Simple Preparation of Cyclotrigermanes and Cyclotetragermanes", J. Chem. Soc., Chem. Comm., 1987, pp. 1514-1515.

(Continued)

*Primary Examiner* — Margaret G Moore
(74) *Attorney, Agent, or Firm* — The Law Offices of Andrew D. Fortney; Andrew D. Fortney; William K. Nelson

(57) ABSTRACT

Methods are disclosed of making linear and cross-linked, HMW (high molecular weight) polysilanes and polygermanes, polyperhydrosilanes and polyperhydrogermanes, functional liquids containing the same, and methods of using the liquids in a range of desirable applications. The silane and germane polymers are generally composed of chains of Si and/or Ge substituted with R' substituents, where each instance of R' is, for example, independently hydrogen, halogen, alkenyl, alkynyl, hydrocarbyl, aromatic hydrocarbyl, heterocyclic aromatic hydrocarbyl, $SiR''_3$, $GeR''_3$, $PR''_2$, $OR''$, $NR''_2$, or $SR''$; where each instance of R'' is independently hydrogen or hydrocarbyl. The cross-linked polymers can be synthesized by dehalogenative coupling or dehydrocoupling. The linear polymers can be synthesized by ring-opening polymerization. The polymers can be further modified by halogenation and/or reaction with the source of hydride to furnish perhydrosilane and perhydrogermane polymers, which are used in liquid ink formulations. The synthesis allows for tuning of the liquid properties (e.g., viscosity, volatility, and surface tension). The liquids can be used for deposition of films and bodies by spincoating, inkjetting, dropcasting, etc., with or without the use of UV irradiation. The deposited films can be converted into amorphous and polycrystalline silicon or germanium, and silicon or germanium oxide or nitride by curing at 400-600 DEG C. and (optionally) laser- or heat-induced crystallization (and/or dopant activation, when dopant is present).

29 Claims, No Drawings

FOREIGN PATENT DOCUMENTS

| | | |
|---|---|---|
| DE | 41 10 917 A1 | 10/1992 |
| EP | 1 087 428 A1 | 3/2001 |
| EP | 1 284 306 A2 | 2/2003 |
| GB | 2 077 710 A | 12/1981 |
| JP | 57-27915 | 2/1982 |
| JP | 60-221321 | 11/1985 |
| JP | 61-200130 | 9/1986 |
| JP | 62-132720 | 6/1987 |
| JP | 62-132721 | 6/1987 |
| JP | 63-234033 | 9/1988 |
| JP | 1-230638 | 9/1989 |
| JP | 2-235934 | 9/1990 |
| JP | 3-91537 | 4/1991 |
| JP | 3-104893 | 5/1991 |
| JP | 4-119996 | 4/1992 |
| JP | 5-32785 | 2/1993 |
| JP | 5-163355 | 6/1993 |
| JP | 5-170913 | 7/1993 |
| JP | 5-188604 | 7/1993 |
| JP | 5-230219 | 7/1993 |
| JP | 5-301964 | 11/1993 |
| JP | 5-301965 | 11/1993 |
| JP | 5-306340 | 11/1993 |
| JP | 6-128381 | 5/1994 |
| JP | 6-191821 | 7/1994 |
| JP | 6-295079 | 10/1994 |
| JP | 7-11002 | 1/1995 |
| JP | 7-160017 | 6/1995 |
| JP | 7-247360 | 9/1995 |
| JP | 7-247361 | 9/1995 |
| JP | 7-267621 | 10/1995 |
| JP | 7-316304 | 12/1995 |
| JP | 7-316305 | 12/1995 |
| JP | 8-120082 | 5/1996 |
| JP | 8-262727 | 10/1996 |
| JP | 8-283415 | 10/1996 |
| JP | 8-295537 | 11/1996 |
| JP | 9-45922 | 2/1997 |
| JP | 9-237927 | 9/1997 |
| JP | 10-079381 | 3/1998 |
| JP | 10-321536 | 12/1998 |
| JP | 11-79727 | 3/1999 |
| JP | 11-260729 | 9/1999 |
| JP | 2000-7317 | 1/2000 |
| JP | 2000-31066 | 1/2000 |
| JP | 2001-179167 | 7/2001 |
| JP | 2001-230527 | 8/2001 |
| JP | 2002-246384 | 8/2002 |
| JP | 2003-055556 | 2/2003 |
| JP | 2003-092297 | 3/2003 |
| JP | 2003-124486 | 4/2003 |
| JP | 2003-171556 | 6/2003 |
| JP | 2003-318119 | 11/2003 |
| JP | 2004-235539 | 8/2004 |
| JP | 2004-311945 | 11/2004 |
| JP | 2005-022964 | 1/2005 |
| JP | 2005-332913 | 2/2005 |
| JP | 2005-120029 | 5/2005 |
| JP | 2005-219981 | 8/2005 |
| JP | 2006-093256 | 4/2006 |
| WO | WO 82/03069 | 9/1982 |
| WO | WO 87/06234 | 10/1987 |
| WO | WO 2004/110929 | 12/2004 |
| WO | WO 2005/113648 | 12/2005 |

OTHER PUBLICATIONS

Balasubramanian et al., "Symmetry Allowed $\pi^4s + \pi^2s$ Additions Silacyclopentadienes", Tetrahedron, vol. 29, 1973, pp. 2395-2404.

Bleckmann et al., "Dimethylgermylene insertion into a strained carbon—germanium bond and matrix isolation of tetramthyldigermene Me2Ge:GeMe2.", 1984, 1 pp.

Boudjouk et al., "Organic Sonochemistry. Ultrasound Promoted Coupling of Chlorosilanes in the Presence of Lithium Wire", Tetrahedron Letters, vol. 22, No. 39, 1981, pp. 3813-3814.

Chojnowski et al., "Organic Polysilanes Interrupted by Heteroatoms", Progress in Polymer Science, vol. 28, 2003, pp. 691-728.

Corriu et al., "Chemical and Photochemical Approaches to Amino(aryl) silylenes", Journal of Organometallic Chemistry, vol. 466, 1994, pp. 55-68.

Cypryk et al., "Anionic Ring-Opening Polymerization of 1,2,3,4-Tetramethyl-1,2,3,4-tetraphenylcyclotetrasilane" Journal of the American Chemical Society, vol. 113, 1991, pp. 1046-1047.

Danishefsky et al., "7,8-Disilabicyclo[2.2.2]-2,5-octadienes. An Approach to Tetramethyldisilene", Journal of the American Chemical Society, vol. 91, No. 10, 1969, pp. 2807-2808.

Dubac et al., "Group 14 Metalloles. 1 Synthesis, Organic Chemistry, and Physicochemical Data", Chemical Reviews, vol. 90, No. 1, 1990, pp. 215-263.

Gehrhus et al., "An Isolable Radical Anion and Dianion of a Cyclotetrasilane: Synthesis and Structure of [Si {1,2-(NEt)$_2$C$_6$H$_4$}]$_4^-$ and [Si {1,2-NEt)$_2$C$_6$H$_4$}]$_4^{2-**}$", Angew. Chem. Int. Ed., vol. 43, 2004, pp. 1124-1126.

Gollner et al., "Linear and Cyclic Polysilanes Containing the Bis(trimethylsilyl)amino Group: Synthesis, Reactions, and Spectroscope Characterization", Inorganic Chemistry, vol. 42, 2003, pp. 4579-4584.

Gupta et al., "Anionic Ring-opening Polymerization of Cyclopolysilanes", 1990, 1 pp.

Hassler et al., "Synthese einiger Phenylbrom- und Phenyliod-disilane und—trisilane", Journal of Organometallic Chemistry, vol. 385, 1990, pp. 201-206.

Hassler et al., "Synthese und Eigenschaften partiell Si-fluorierter Aryltrisilane", Journal of Organometallic Chemistry, vol. 526, 1996, pp. 157-167.

Hassler et al., "Synthese und Eigenschaften chlorierter und bromierter Aryltrisilane und Aryltetrasilane", Journal of Organometallic Chemistry, vol. 538, 1997, pp. 135-143.

Hassler et al., "Verbesserte Synthesen von Phenyltrisilanen", Journal of Organometallic Chemistry, vol. 479, 1994, pp. 193-196.

Hatano et al., "The First Stable Heteracyclopropabenzene: Synthesis and Crystal Structure of a Silacyclopropabenzene", Journal of the American Chemical Society, vol. 122, 2000, pp. 4829-4830.

Hengge et al., "An Electrochemical Method for the Synthesis of Silicon-Silicon Bonds", Journal of Organometallic Chemistry, vol. 212, 1981, pp. 155-161.

Hengge et al., "Cyclopentasilane, the First Unsubstituted Cyclic Silicon Hydride", Angew. Chem. Int. Ed., vol. 12, No. 4, 1972, pp. 316.

Hengge et al., "Periodated Cyclosilanes", Angew. Chem. Int. Ed. Engl., vol. 20, No. 8, 1981, pp. 678.

Herzog et al., "Preparation of Oligosilanes Containing Perhalogenated silyl groups (-SiX$_3$, -SiX$_2$>SiX-,X=Cl, Br) and Their Hydrogenated by Stannanes", Journal of Organometallic Chemistry, vol. 544, 1997, pps. 217-223.

Kako et al., "Charge-transfer Complex Formation and Photo-induced Electron-transfer Reaction of Dibenzo-7-silabicyclo[2.2.1]hepta-2,5-dienes", Tetrahedron, vol. 53, No. 4, 1997, pp. 1265-1274.

Kawachi et al., "Functional Group Transformations and Stereochemistry of Silicon-functionalized 7-Silabenzonorbornadienes", Chemistry Letters, vol. 34, No. 7, 2005, pp. 960-961.

Koe et al., "Heteroatom Polysilylenes", Silicon Chemistry, vol. 1, 2002, pp. 77-87.

Koe et al., "Perchloropolysilane: X-Ray Structure, Solid-State $^{29}$Si NMR Spectroscopy, and Reactions of [SiCl$_2$]$_n$ **", Angew. Chem. Int. Ed., vol. 37, No. 10, 1998, pp. 1441-1443.

Matyjaszewski et al., "Anionic Ring-opening Polymerization of Cyclotetrasilanes", 1991, 2 pps.

Miller et al., "Sacrificial Additives in the Wurtz Synthesis of Polysilanes", Macromolecules, vol. 27, 1994, pp. 5921-5923.

Miller et al., "Soluble Alkyl Substituted Polygermanes: Thermochromic Behavior", Journal of Polymer Science: Part A: Polymer Chemistry, vol. 25, 1987, pp. 111-125.

Miller et al., "The Synthesis of Soluble, Substituted Silane High Polymers by Wurtz Coupling Techniques", Journal of Polymer Science: Part A: Polymer Chemistry, vol. 29, 1991, pp. 813-824.

Miller, "Polysilane High Polymers", Chemical Reviews, vol. 89, 1989, pp. 1359-1410.

Mochida et al., Studies of Photochemical Reactions of 7,8-Digermabicyclo[2.2.2]octadienes by Steady-State and Laser Flash Photoysis Techniques, Organometallics, vol. 19, 2000, pp. 3379-3386.

Nakadaira et al., "trans-and cis 1,2-Dimethyl-1,2-diphenyldisilene. Is Si=Si a True Double Bond?", Journal of the American Chemical Society, vol. 101, No. 2, 1979, pp. 487-488.

Neumann et al., "7-Germanorbornadienes and Their Thermal Cycloeliminations", Tetrahedron Letters, vol. 21, 1980, pp. 3273-3276.

Piekos et al., "The Action of Sodium on Phenoxybromosilanes", 1961, 1 pp.

Pöschl et al., "Synthesis and Isomerism of Monofunctional Arylated Cyclotetrasilanes", Organometallics, vol. 14, 1995, pp. 4948-4952.

Pöschl et al., "Synthesis and Spectroscopy of Halogenated Cyclopentasilanes", Organometallics, vol. 15, 1996, pp. 3238-3240.

Richter et al., "Darstellung und Massenspektrometrische Untersuchung Von p-Tolylsubstituierten Cyclosilanen Und Cyclogermanen", Journal of Organometallic Chemistry, vol. 20, 1969, pp. 81-90.

Saito et al., "Amorphous silicon photoconductive films for electrophotography", 1984, 6pps.

Sakaurai et al., "Stereoselective Anionic Polymerization of Amino-Substituted Masked Disilenes", Organometallics, vol. 24, 2005, pp. 4119-4121.

Sakurai et al., "Preparation and Some Reactions of Dibenzo-7-silanorbornadiene Derivatives", Chemical Society of Japan, 1986, pp. 1797-1800.

Sakurai et al., "Organogermanium compounds. 10. Generation and Trapping if tetramethyldigermene", Chemistry Letters, vol. 11, 1982, pp. 1855-1858.

Sanji et al., "Anionic Polymerization of Tetraphenylgermole-*spiro*-cyclogermatetrasilane. A Striking Contrast in the Mechanism to the Corresponding Silole Case", Chemical Society of Japan, 1999, pp. 547-548.

Sanji et al., "Anionic Ring Opening Polymerization of Octamethyltetasilacyclopentane", Chemical Society of Japan, 1997, pp. 1121-1122.

Sanji et al., "Functional Transformation of Poly(dialkylaminotrimethyldisilene) prepared by anionic polymerization of the masked disilenes. The preparation of a true polysilastyrene" Journal of Organometallic Chemistry, vol. 685, 2003, pp. 65-69.

Sanji et al., "Helical-Sense Programming through Polysilane-Poly(triphenylmethyl methacrylate) Block Copolymers", Journal of the American Chemical Society, vol. 123, 2001, pp. 12690-12691.

Sanji et al., "Silole-Incorporated Polysilanes" Journal of the American Chemical Society, vol. 120, 1998, pp. 4552-4553.

Sanji et al., "Synthesis of Poly(ethylene oxide)-b-polysilane by anionic polymerization of masked disilenes using macroinitiator method", Silicon Chemistry, vol. 2, 2003, pp. 93-97.

Sanji et al., "The Introduction of a Helical Conformation in Polysilanes with an Optically Active Terminal Group", Chemical Society of Japan, vol. 77, 2004, pp. 1607-1611.

Schuppan et al., "The Elusive 7-Silanorbornadien-7-ylium: Synthesis and Characterization of Nitrilium and Oxonium Ions Deriving from 2,3-Benzo-7-silanorbornadien-7-ylium", Organometallics, vol. 20, 2001, pp. 4584-4592.

Seki et al., "Optical Properties of Pyrrolyl-substituted Polysilanes", Journal of Organometallic Chemistry, vol. 611, 2000, pp. 64-70.

Sekiguchi et al., "Regio- and Stereochemistry and Kinetics in the Addition Reactions of Alcohols to Phenyl-Substituted Disilenes", Journal of the American Chemical Society, vol. 115, 1993, pp. 11460-11466.

Sekiguchi et al., "Trapping of Silylenes by 9,10-Dimethylanthracene: 2,3:5,6-Dibenzo-7-silabicyclo[2.2.1.]hepta-2,5-dienes", Organometallics, vol. 5, 1986, pp. 1911-1913.

Shimoda et al., "Solution-processed Silicon Films and Transistors", Nature, vol. 440, No. 6, Apr. 2006, pp. 783-786.

Shono et al., "Electroreductive Synthesis of Polygermane and Germane-Silane Copolymer", J. Chem. Soc., Chem. Commun., 1992, pp. 896-897.

Smith et al., "A Direct Route to a Novel Tetraphenyldisabicyclo[2.2.2.]octa-2,5-diene: A Tetraphenyldisilene Precursor", J.C.S. Chem. Comm., 1975, pp. 910-911.

Stüger et al., "Amino Derivatives of Hydrooligosilanes: Synthesis, Characterization and Properties", Monatshefte für Chemie Chemical Monthly, vol. 125, 1994, pp. 615-622.

Stüger et al., "UV/Vis-Spectroscopic Investigations of Cyclosilanes", Monatshefte für Chemie Chemical Monthly, vol. 119, 1988, pp. 873-887.

Stüger "Lineare Tetrasilane mit mittelständigen Substituenten-Oligosilane mit optischer Aktivität", Journal of Organimetallic Chemistry, vol. 458, 1993, pp. 1-7.

Suzuki et al., "Synthesis of Sequence-Ordered Polysilane by Anionic Ring-Opening Polymerization of Phenylnonamethylcyclopentasilane", Macromolecules, vol. 27, 1990, pp. 2360-2363.

Tajima et al., "Synthesis and Structures of Silicon Analogues of Cyclopropabenzenes", Journal of Organometallic Chemistry, vol. 686, 2003, pp. 118-126.

Tajima et al., "The First Examples of Stable Benzenes Fused with Two Three-memberes Rings: Synthesis and Structures of the Two Stereoisomers of Bis(silacyclopropa)benzes", Chemistry Letters, vol. 32, No. 2, 2003, pp. 220-221.

Tamao et al., "Coupling of (Amino)alkylchlorosilanes with Lithium: New Access to Symmetrical Di- and Tetrafunctional Alkyldisilanes", Organometallics, vol. 12, No. 2, 1993, pp. 580-582.

Tamao et al., "Regioselective Synthesis of Polyfunctionalized Alkyltrisilanes and -tetrasilanes via Reductive Cross-Coupling Reaction of Aminoalkylsilyl Chlorides with Lithium", Organometallics, vol. 16, No. 4, 1997, pp. 780-788.

Tatsumi et al., "Efficient Trapping of Silylenes through Disilene Intermediates", Journal of the American Chemical Society, vol. 101, No. 2, 1979, pp. 486-387.

Timms et al., "Silicon-Fluorine Chemistry. I. Silicon Difluoride and the Perfluorosilanes", Journal of the American Chemical Society, vol. 87, No. 13, 1965, pp. 2824-2828.

Timms et al., "Silicon-Fluorine Chemistry. IV. The Reaction of Silicon Difluoride with Aromatic Compounds", Journal of the American Chemical Society, vol. 88, No. 5, 1966, pp. 940-942.

Trommer et al., "Generation and Investigation of Various (Alkylamino)phenylsilyllithium Species—Behaviour in Coupling Reactions with Chlorosilanes", Journal für praktische Chemie Chemiker-Zeitung, vol. 340, 1998, pp. 557-561.

Trommer et al., "NMR Spectroscopic Investigation of the Reaction between Tetrachlorodimethyldisilane and Diethylamine for the Synthesis of Chloro- and Amino-functionalized Methyldisilanes", Journal für praktische Chemie Chemiker-Zeitung, vol. 339, 1997, pp. 82-84.

Trommer et al., "Preparation and $^{29}$Si NMR Spectroscopical Investigations of (Diethylamino)-methylchlorotetra- and Pentasilanes", Journal für praktische Chemie Chemiker-Zeitung, vol. 339, 1997, pp. 637-641.

Tsutsui et al., Bis(diisopropylamino)silylene and Its Dimer, Journal of the American Chemical Society, vol. 120, 1998, pp. 9955-9956.

Unno et al., "Synthesis, Structures, and Reactions of 1,2,3-Tris(diethylamino)-1,2,3,4-tetrakis(1,1,2-trimethylpropyl)cyclotetrasilanes", 1997, 4 pps.

Yajima et al., "Highly Ordered High Molecular Weight Alternating Polysilene Copolymer Prepared by Anionic Polymerization of Masked Disilene", Macromolecules, vol. 23, 1990, pp. 4494-4496.

U.S. Appl. No. 11/246,014, filed Oct. 6,2005 to Guo et al, entitled "Polysilane Compositions, Methods for their Synthesis and Films formed therefrom".

Wenzhuo Guo et al.; "Doped Polysilanes, Compositions Containing the Same, Methods for Making the Same, and Films Formed Therefrom"; U.S. Appl. No. 11/249,167, filed Oct. 11, 2005.

* cited by examiner

LINEAR AND CROSS-LINKED HIGH MOLECULAR WEIGHT POLYSILANES, POLYGERMANES, AND COPOLYMERS THEREOF, COMPOSITIONS CONTAINING THE SAME, AND METHODS OF MAKING AND USING SUCH COMPOUNDS AND COMPOSITIONS

CROSS-REFERENCE TO RELATED APPLICATIONS

This application claims priority to provisional patent application Ser. No. 60/724,216, filed Oct. 5, 2006 to Vladimir K Dioumaev, entitled "Linear and Cross-linked High Molecular Weight Polysilanes and Polygermanes as Semiconductor Precursor Compounds, Compositions Containing the Same, and Methods of Making and Using Such Compounds and Compositions," incorporated herein by reference.

FIELD OF THE INVENTION

The present invention generally relates to the field of polysilane and polygermane compounds, compositions and methods of making and using the same. More specifically, embodiments of the present invention pertain to polyperhydrosilanes and polyperhydrogermanes, methods of making the same and their precursors, methods of depositing polyperhydrosilanes and polyperhydrogermanes on various surfaces to create bodies, and methods of converting these bodies into solid semiconductor, conductor, or dielectric (insulator) material useful for making electronic devices and photosensitive members.

BACKGROUND OF THE INVENTION

Manufacturing of microelectronic devices entails creating complex three-dimensional structures via laborious layer-by-layer process, where most steps rely on wet chemistry or gas-phase chemistry, require a multitude of expensive machines, and generate large quantities of toxic waste. It would be advantageous to replace these processes with more efficient methods such as, printing techniques used in graphic arts or similar alternatives, where the desired structure is deposit on demand and does not require waste-generating, post-processing steps (e.g. deposition and removal of photoresists, etching, cleaning, etc.). However, silicon—the main material used in semiconductors—cannot be formulated into liquids as it does not melt or dissolve at convenient temperatures (below 500 DEG C., preferably below 100 DEG C.). To overcome this complication, various gaseous and liquid hydrosilanes and hydrogermanes (silicon hydrides and germanium hydrides) are utilized as precursors, which can decompose to loose hydrogen and yield silicon and germanium.

Hydrosilanes composed entirely of hydrogen and silicon atoms, are more precisely called perhydrosilanes, but in practice prefix "per" is often omitted. Accordingly, hydrogermanes composed entirely of hydrogen and germanium atoms, are more precisely called perhydrogermanes, but in practice prefix "per" is often omitted. Simple perhydrosilanes, such as monosilane ($SiH_4$) and disilane ($Si_2H_6$) are widely used in semiconductor manufacturing. For example, a device such as a thin film transistor is conventionally manufactured by using monosilane gas to form a silicon film on a surface via a vacuum process such as thermal CVD (chemical vapor deposition), plasma enhanced CVD, or photo-assisted CVD. Unfortunately, CVD exhibit the following limitations. (a) The production yield is low due to system contamination and the formation of foreign materials, which are caused by silicon particles generated during the gas phase reaction. (b) A uniform film thickness is barely obtainable on a substrate having an uneven surface due to gaseous raw materials. (c) The productivity is low due to a low deposition rate of the film. (d) The necessary vacuum equipment is complicated and expensive, particularly for treatment of large area substrates.

Furthermore, CVD yields film covering large areas of the substrate, and the unnecessary portions of the film are subsequently removed through photolithography and etching. The utilization efficiency of raw materials is low, and a large quantity of waste is produced. In regard to materials, use of silicon hydride, which is highly reactive gas, causes difficulty in handling and requires hermetic vacuum equipment. Since these apparatuses are complicated, the apparatuses themselves are expensive. Moreover, the vacuum system and the plasma system consume a large amount of energy, resulting in high production costs.

SUMMARY OF THE INVENTION

The present invention relates to compounds and methods of making compounds and formulations containing silicon and/or germanium, which are liquid, but on demand yield solid semiconductor, conductor, or dielectric material useful for making electronic devices and photosensitive members. The liquid material can be deposited onto a substrate of choice as a film, body, or pattern by various printing and other deposition techniques and then converted into the solid material, such as elemental silicon, germanium or alloys thereof, and silicon or germanium oxide or nitride or combination thereof. The materials can be further doped with phosphorous (P), or boron (B), or other atoms known and used by those skilled in the art of manufacturing of electronic devices and photosensitive members.

More specifically, the invention relates to methods of making soluble compounds of high viscosity and low volatility composed entirely of hydrogen (H), silicon (Si), and/or germanium (Ge) atoms (polyperhydrosilanes and/or polyperhydrogermanes). The invention also relates to methods of making of polymeric and monomeric materials, which serve as precursors to these polyperhydrosilanes and polyperhydrogermanes, and to methods of converting of these precursors into these polyperhydrosilanes and polyperhydrogermanes. The invention also relates to methods of using polyperhydrosilanes, polyperhydrogermanes, and compositions thereof for making films and bodies of semiconductor, conductor, and dielectric material.

In some aspects, the invention pertains to a composition comprising a cross-linked polymer. The polymer comprises:

(a) linear chains of atoms, the atoms being independently selected from the group consisting of Si atoms and Ge atoms, wherein the chains of atoms are cross-linked to each other via a direct bond between atoms from different chains; and (b) side chains R, the R groups being directly bonded to the atoms in the chain to complete the valance of the atoms in the chain, with the proviso that if the R groups are all independently selected from the group consisting only of a hydrogen, a halogen, an aromatic hydrocarbyl group, or a substituted aromatic hydrocarbyl group, then the degree of cross-linking involves no more than about 10% of the linear chain atoms.

In further aspects, the invention pertains to a method of preparing a cross-linked polymer represented by the formula I:

$$-(ER_2)_a- \qquad (I)$$

wherein every E is independently selected from the group consisting of a Si atom and a Ge atom, the R group is independently a hydrogen, a halogen, an alkenyl group, a substituted alkenyl group, an alkynyl group, a substituted alkynyl group, an aromatic hydrocarbyl group, a substituted aromatic hydrocarbyl group, a heterocyclic aromatic hydrocarbyl group, a substituted heterocyclic aromatic hydrocarbyl group, a $SiR^1_3$ group, a $GeR^1_3$ group, a $NR^1_2$ group, a $PR^1_2$ group, an $OR^1$ group, or a $SR^1$ group, wherein every $R^1$ group is independently a hydrogen, a hydrocarbyl group, or a substituted hydrocarbyl group wherein the R groups are optionally linked to each other to form a stable bridging group and the $R^1$ are optionally linked to each other to form a stable bridging group, wherein the average a is a number from 2 to 1,000,000 and wherein a fraction of the R groups are replaced with cross-linking bonds between polymer chains wherein the cross-linking chains comprise $-(ER_2)_{a'}-$ polymeric chains with the R's being independently selected from the groups above and a' is a distribution of numbers with an average from 1 to about 1000. The method comprises polymerizing a reactive composition comprising monomers, in which the monomers are either monomers represented by the formula II or monomers represented by the formula III:

$$X-ER_2-X\ X_2RE-(ER_2)_c-ERX_2\ X_2RE-(ER_2)_c-ER_2X$$
$$X_2RE-(ER_2)_c-ER_3 \qquad (II)$$

$$REH_3\ H_3E-(ER_2)_c-EH_3\ H_3E-(ER_2)_c-ERH_2\ H_3E-$$
$$(ER_2)_c-ER_3 \qquad (III)$$

where every X is independently a halogen, every E is independently an Si atom or a Ge atom, every R group is independently selected as specified above, and c is a number from 0 to 100, and reacting of the product of polymerization with a source of hydride to replace the R groups with H.

In other aspects, the invention pertains to a method for preparing a compound represented by formula IV:

$$HR^{15}_2E-(ER^{15}_2)_v-ER^{15}_2R^{28} \qquad (IV)$$

where v is a distribution of numbers with an average from 2 to 1000000, every E is independently selected from the group consisting of Si and Ge atoms, every group $R^{15}$ is $R^{19}$, $R^{20}$, or $R^{21}$; every group $R^{28}$ is a hydrogen, a halogen, a hydrocarbyl group, a substituted hydrocarbyl group, a $SiR^{29}_3$ group, a $GeR^{29}_3$ group, a $NR^{29}_2$ group, a $PR^{29}_2$ group, a $OR^{29}$ group, or a $SR^{29}$ group, wherein every $R^{29}$ is independently a hydrogen, a hydrocarbyl group, or a substituted hydrocarbyl group, the groups $R^{28}$ are optionally linked to each other to form a stable bridging group, the groups $R^{29}$ are optionally linked to each other to form a stable bridging group, the groups $R^{15}$ are optionally linked to each other to form a stable bridging group. The method comprises polymerizing monomers or combination of monomers selected from the group consisting of compounds represented by formula V'

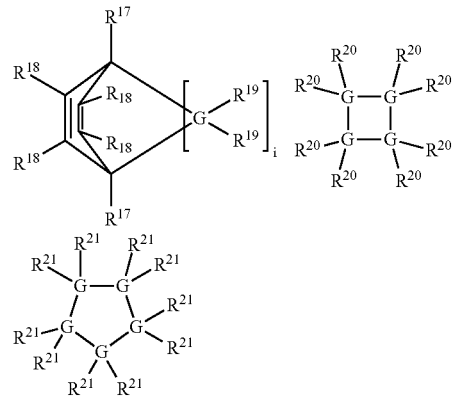

wherein i is a number from 1 to 20, every G is independently an Si atom or a Ge atom except that at least one F per molecule is a Ge atom and at least one G per molecule is an Si atom with the proviso that when i=1 in the G can be either Si or Ge, i is a number from 1 to 20, every $R^{17}$ and $R^{18}$ are independently a hydrogen, a halogen, a hydrocarbyl group, or a substituted hydrocarbyl group, the $R^{17}$ and $R^{18}$ are optionally substituted with a plurality of O atoms, N atoms or a combination thereof, the $R^{18}$ are optionally linked to each other to form a stable bridging group, every $R^{19}$ group is independently a hydrogen, halogen, an alkenyl group, a substituted alkenyl group, an alkynyl group, a substituted alkynyl group, an aromatic hydrocarbyl group, a substituted aromatic hydrocarbyl group, a heterocyclic aromatic hydrocarbyl group, a substituted heterocyclic aromatic hydrocarbyl group, a $SiR^{22}_3$ group, a $GeR^{22}_3$ group, a $NR^{22}_2$ group, a $PR^{22}_2$ group, a $OR^{22}$ group, or a $SR^{22}$ group, wherein every $R^{22}$ is independently a hydrogen, a hydrocarbyl group, or a substituted hydrocarbyl group, the $R^{19}$ are optionally linked to each other to form a stable bridging group, the $R^{22}$ are optionally linked to each other to form a stable bridging group, every $R^{20}$ group is independently a heterocyclic aromatic hydrocarbyl group, a substituted heterocyclic aromatic hydrocarbyl group, a $GeR^{23}_3$ group, a $NR^{23}_2$ group, a $PR^{23}_2$ group, or a $SR^{23}$ group, wherein every $R^{23}$ is independently a hydrogen, a hydrocarbyl group, or a substituted hydrocarbyl group, the $R^{20}$ are optionally linked to each other to form a stable bridging group, the $R^{23}$ are optionally linked to each other to form a stable bridging group, every $R^{21}$ group is independently a heterocyclic aromatic hydrocarbyl group, a substituted heterocyclic aromatic hydrocarbyl group, a $GeR^{16}_3$ group, a $NR^{16}_2$ group, a $PR^{16}_2$ group, or a $SR^{16}$ group, wherein every $R^{16}$ is independently a hydrogen, a hydrocarbyl group, or a substituted hydrocarbyl group, and the $R^{16}$ are optionally linked to each other to form a stable bridging group.

In additional aspects, the invention pertains to a method for preparing a compound represented by formula IV:

$$HR^{15}_2E-(ER^{15}_2)_v-ER^{15}_2R^{28} \qquad (IV)$$

where v is a distribution of numbers with an average from 2 to 1000000, every E is independently selected from the group consisting of Si and Ge atoms, every group $R^{15}$ is $R^{19}$, $R^{20}$, or $R^{21}$; every group $R^{28}$ is a hydrogen, a halogen, a hydrocarbyl group, a substituted hydrocarbyl group, a $SiR^{29}_3$ group, a $GeR^{29}_3$ group, a $NR^{29}_2$ group, a $PR^{29}_2$ group, a $OR^{29}$ group, or a $SR^{29}$ group, wherein every $R^{29}$ is independently a hydrogen, a hydrocarbyl group, or a substituted hydrocarbyl group, the groups $R^{28}$ are optionally linked to each other to form a stable bridging group, the groups $R^{29}$ are optionally linked to each other to form a stable bridging group, the groups $R^{15}$ are optionally linked to each other to form a stable bridging group. The method comprises polymerizing monomers or combination of monomers selected from the group consisting of compounds represented by formula V

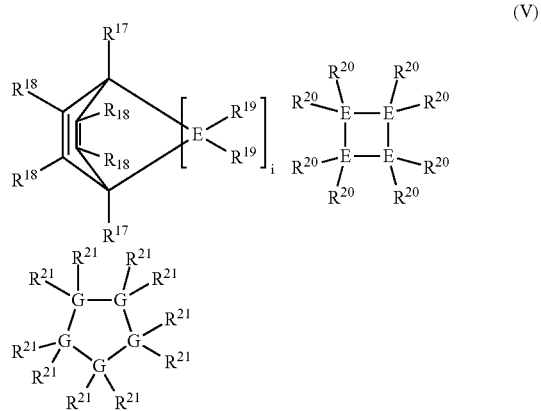

where every E is independently selected from the group consisting of Si atoms and Ge atoms, i is a number from 1 to 20, every $R^{17}$ and $R^{18}$ are independently a hydrogen, a halogen, a hydrocarbyl group, or a substituted hydrocarbyl group, the $R^{17}$ and $R^{18}$ are optionally substituted with a plurality of O atoms, N atoms or a combination thereof, the $R^{18}$ are optionally linked to each other to form a stable bridging group, every $R^{19}$ group is independently a halogen, an alkenyl group, a substituted alkenyl group, an alkynyl group, a substituted alkynyl group, an aromatic hydrocarbyl group, a substituted aromatic hydrocarbyl group, a heterocyclic aromatic hydrocarbyl group, a substituted heterocyclic aromatic hydrocarbyl group, a $SiR^{22}_3$ group, a $GeR^{22}_3$ group, a $PR^{22}_2$ group, a $NR^{22}_2$ group, a $OR^{22}$ group, or a $SR^{22}$ group, wherein every $R^{22}$ is independently a hydrogen, a hydrocarbyl group, or a substituted hydrocarbyl group, the $R^{19}$ are optionally linked to each other to form a stable bridging group, the $R^{22}$ are optionally linked to each other to form a stable bridging group, every $R^{20}$ group is independently a halogen, an alkenyl group, a substituted alkenyl group, an alkynyl group, a substituted alkynyl group, an aromatic hydrocarbyl group, a substituted aromatic hydrocarbyl group, a heterocyclic aromatic hydrocarbyl group, a substituted heterocyclic aromatic hydrocarbyl group, a $SiR^{23}_3$ group, a $GeR^{23}_3$ group, a $PR^{23}_2$ group, a $NR^{23}_2$ group, a $OR^{23}$ group, or a $SR^{23}$ group, wherein every $R^{23}$ is independently a hydrogen, a hydrocarbyl group, or a substituted hydrocarbyl group, the $R^{20}$ are optionally linked to each other to form a stable bridging group, the $R^{23}$ are optionally linked to each other to form a stable bridging group, every $R^{21}$ group is independently a halogen, an alkenyl group, a substituted alkenyl group, an alkynyl group, a substituted alkynyl group, an aromatic hydrocarbyl group, a substituted aromatic hydrocarbyl group, a heterocyclic aromatic hydrocarbyl group, a substituted heterocyclic aromatic hydrocarbyl group, a $SiR^{16}_3$ group, a $GeR^{16}_3$ group, a $PR^{16}_2$ group, a $NR^{16}_2$ group, a $OR^{16}$ group, or a $SR^{16}$ group, wherein every $R^6$ is independently a hydrogen, a hydrocarbyl group, or a substituted hydrocarbyl group, and the $R^{16}$ are optionally linked to each other to form a stable bridging group; and reacting the polymer with reagents to replace $R^{15}$ groups with hydrogen, where the reacting step comprises direct reaction with a source of hydride or first reacting the polymer to replace $R^{15}$ with a halogen followed by the reaction of the halogenated polymer with a source of hydride.

Furthermore, the invention pertains to a method for producing films and bodies selected from the group consisting of conductor, semiconductor, and dielectric, the method comprising:
(a) applying a liquid material onto a substrate to form an applied body, where the liquid material comprise a polymer composition described herein;
(b) heating the applied body sufficiently to form an amorphous, hydrogenated body. Accordingly, in some embodiments, certain advantages are provided as follows:
(a) to provide lightly cross-linked, HMW polyperhydrosilanes and polyperhydrogermanes via controlled synthesis of polymers with predetermined degree of cross-linking, solubility, and viscosity;
(b) to provide methods for controlled synthesis of lightly cross-linked, HMW polyperhydrosilanes, polyperhydrogermanes, and precursor polymers and monomers;
(c) to provide methods of conversion of lightly cross-linked, HMW precursor polymers into lightly cross-linked, HMW perhydrosilane- and perhydrogermane polymers;
(d) to provide linear, HMW polyperhydrosilanes and polyperhydrogermanes via selective linear polymerization techniques, which are not limited to IMW (intermediate molecular weight) products;
(e) to provide methods for controlled synthesis of linear, HMW polyperhydrosilanes, polyperhydrogermanes, precursor polymers, and precursor monomers;
(f) to provide methods of conversion of linear, HMW precursor polymers into linear, HMW perhydrosilane- and perhydrogermane polymers;
(g) to provide methods of deposition of cross-linked and linear, HMW polyperhydrosilanes and polyperhydrogermanes on surfaces to form high quality films and bodies;
(h) to provide methods of conversion of these films and bodies into substantially pure silicon, germanium, silicon-germanium alloy, silicon oxide, germanium oxide, mixed silicon-germanium oxide, silicon nitride, germanium nitride, and mixed silicon-germanium nitride, which can be used as semiconductor, conductor, or dielectric material in manufacturing of electronic devices and photosensitive members; and
(i) to provide methods for forming films of semiconductor, conductor, or dielectric material without the conventional vacuum process, photolithography, and etching.

Further advantages will become apparent from a consideration of the ensuing description.

DETAILED DESCRIPTION OF THE INVENTION

The present invention relates broadly to polymers containing silicon and/or germanium, methods of making such polymers, methods of using these polymers and formulations thereof for making films and bodies, and methods of converting these films into solid semiconductor, conductor, or dielectric material useful for making electronic devices and photosensitive members. The invention, in its various aspects, will be explained in greater detail below with regard to exemplary embodiments.

Commercial processes and equipment for silicon/germanium production can be substantially simplified if liquid material precursors are used instead of gases, and vacuum conditions are avoided. Methods of forming silicon and germanium films by applying liquid perhydrosilanes and perhydrogermanes of low molecular weight (LMW) onto a substrate and heating it or irradiating it with UV rays is disclosed in a number of patents: CN 1297578 to Yasuo (2001), EP 1087433 to Matsuki (2001), WO 00/59022 to Matsuki (2000), U.S. Pat. No. 6,517,911 to Matsuki (2003), EP 1087428 to Seki et al. (2001), WO 00/59014 to Seki et al. (2000), JP 61-91821 to Yano et al. (1994), JP 9-045922 to Kitsuno et al. (1997), JP 4-119996 to Fujino et al (1992), JP 7-267621 to Yano et al. (1995), JP 2000-031066 to Takadera et al. (2000), JP 11-079727 to Ouchida (1999), JP 2000-007317 to Fukuyama (2000), JP 2003-318119 Furusawa to (2003), JP 2005-332913 to Haruo (2005), and US application 2006/0157677 A1 to Kunze et al., all of which are incorporated herein by reference. However, the materials used in these methods are of low boiling point and therefore vaporize to a large extent prior to the formation of the silicon- or germanium film during heating. These large losses of material are undesired because of costs and safety concerns as perhydrosilanes and perhydrogermanes are expensive and pyrophoric (spontaneously combust upon contact with oxygen). In addition, these LMW materials exhibit poor wettability to most substrates, which contributes to poor process stability and poor quality of the film.

Materials of higher molecular weight can be obtained from the aforementioned monosilane or other LMW perhydrosilanes and perhydrogermanes via a number of polymerization techniques, such as thermal- or catalytic polymerization disclosed in DE 2139155 to Plichta (1973) and JP 11-260729 to Kitsuno et al. (1999), silent discharge disclosed in JP 62-132720 to Izeki et al. (1987) and JP 62-132721 to Izeki et al. (1987), and via photochemical polymerization disclosed in EP 1357154 to Aoki et al. (2003), US application 2003/0229190 to Aoki et al., JP2003-313299 to Aoki et al. (2003), JP2004-311945 to Aoki (2004), US application 2004/0029364 to Aoki et al., U.S. Pat. No. 6,884,700 to Aoki et al. (2004), JP2003-318120 to Aoki et al. (2003), US application 2004/0248429 to Aoki (2004), WO 2004/110929 to Iwasawa et al. (2004), CN 1407018 to Kooji et al. (2003), JP 2003-055556 to Shiho et al. (2003), JP 2002-246384 to Shiho et al. (2002), JP 2003-171556 to Shiho et al. (2003), JP 2003-124486 to Shiho et al. (2003), US application 2003-0045632 to Shiho et al. (2003), EP 1284306 to Shiho et al. (2003), TW 555690 to Shiho et al. (2003), JP 2005/022964 to Iwazawa et al. (2005), JP 2003-092297 to Kato et al. (2003), JP 2004-235539 to Sakai et al. (2004), JP 9-237927 to Beppu et al. (1997), U.S. Pat. No. 6,004,730 to Mikoshiba et al. (1999), JP 2005-219,981 to Takashi (2005), EP 1284306A to Shiho et al. (2003), U.S. Pat. No. 7,067,069 to Shiho et al. (2006), US application 2006/0185712 to Shiho et al., and JP 10-079381 to Mikoshiba et al. (1998), all of which are incorporated herein by reference. However, none of the aforementioned polymerization techniques is selective, which means that SiH and GeH bonds are cleaved mostly in a random fashion. If experimental conditions are chosen so that only a small number of SiH and GeH bonds is cleaved, a gain in molecular weight is mediocre, whereas if a large number of SiH and GeH bonds is allowed to be cleaved, a densely cross-linked and poorly soluble material is produced. A similar problem was encountered, when polyperhydrosilanes were synthesized by reductive coupling of $SiH_2Cl_2$ (and other halosilanes) in the presence Li or Na as disclosed in DE 3122992 to John et al. (1982), GB 2077710 to John et al. (1981), JP 8-262727 to Shigeru et al. (1996), JP 57-027915 to Fuiritsupu et al. (1982), JP 1-001404B to Fuiritsupu et al. (1989), JP 1-523659C to Fuiritsupu et al. (1989), and U.S. Pat. No. 5,866,471 to Beppu et al. (1999), all of which are incorporated herein by reference. Insoluble materials were obtained presumably due to a random cleavage of SiH and SiCl bonds resulting in dense cross-linking. U.S. Pat. No. 6,174,982 to Nishida et al. (2001), incorporated herein by reference, also claims synthesis of polyperhydrosilanes by reductive coupling of $(SiH_2)_{1-3}Hal_2$, but no details about the properties of the polyperhydro products are given in the examples.

Solubility is significant with respect to the quality of liquid precursors, stability of deposition process, and quality of the product film. For simple low-resolution deposition techniques, loss to evaporation and poor wettability can to some extent be solved by a relatively small gain in molecular weight, while solubility is maintained at a reasonable level. However, high-resolution deposition techniques bring about much more stringent requirement to properties of the liquid (e.g. viscosity, surface tension, shelf-life stability), which are not solved by the aforementioned random polymerization techniques. In one approach, JP 5-163355 to Shimoda et al. (1993), synthesis of polyperhydrogermane polymers by ring-opening polymerization of small perhydrogermane cycles (3-8 Ge atoms) is claimed. The properties of these claimed perhydro polymers are not known as the only examples reported in the patent are for alkyl-substituted germanes and not for perhydro-substituted germanes. No polyperhydrosilanes are claimed or suggested either.

In conclusion, low molecular weight or highly cross-linked perhydrosilanes, perhydrogermanes, and methods of their syntheses suffer from a number of disadvantages.

(a) LMW compounds are volatile and non-viscous.
(b) HMW compounds that are synthesized by random polymerization techniques are densely cross-linked, poorly soluble, and not suitable for viscous inks for high quality printing.
(c) Methods for controlled synthesis of cross-linked polyperhydrosilanes and polyperhydrogermanes with predetermined degree of cross-linking, solubility, and viscosity are not available.
(d) Compounds synthesized by selective linear polymerization techniques are of IMW (intermediate molecular weight) and are not sufficiently viscous for many printing application.
(e) Methods for controlled synthesis of linear, HMW polyperhydrosilanes and polyperhydrogermanes are desirable.

Usage of Chemical Names

Reference is made below to the embodiments of relevant polymers and processes to synthesize polymers that entail description of chemical compounds and reactions. For the sake of convenience and simplicity, compounds and substituents are referred to herein by their short names, abbreviated names, symbols, and group (class) names in their art-recognized meanings, unless indicated otherwise. The names which are most frequently used in this document are briefly described herein. However, the complete description of rules for forming chemical names is beyond the scope of this document, and is well known in the art.

In general, the polymer structures may or may not be referenced herein without specific reference to the terminal groups. This is conventional notion in the art and a person of ordinary skill will recognize that terminal groups are present with an identity based on the particular reactants, which generally falls within the same range of substituents specified for the polymer side chains. Herein, the terms group and substituent refer to chemical moieties that extend from and are bonded to another portion of a molecule. Group can refer to individual atoms, such as hydrogen or a halogen, and not just to multiple atom groupings. Also, group(s) and substituent(s)

can be used interchangeably in their singular and plural forms for convenience and the appropriate singular and plural form can be determined by a person of ordinary skill in the art in the particular context.

Terms "hydro," "hydride", and grammatical derivations thereof refer to hydrogen atoms. Terms "silane" and "germane" refer to compounds of silicon and germanium, respectively. Terms hydrosilane (germane), silane (germane) hydride, and silicon (germanium) hydride refer to compounds of silicon (germanium) bearing hydrogen atoms and may be used interchangeably herein. Terms oxide and nitride refer to compounds of oxygen and nitrogen, respectively (e.g. silicon oxide is $SiO_2$). For the sake of briefness, terms "halo," "halide", and grammatical derivations thereof may describe halogens as defined in the Periodic Table of Elements (F, Cl, Br, and I) and halogen-like species (e.g., that form stable monovalent anions) such as methanesulfonate (OMs), trifluoromethanesulfonate (OTf), toluenesulfonate (OTs), etc. Terms halogenation and dehalogenation refer, respectively, to a process of addition and removal of halogen atoms to and from a molecule. Terms halogenated and dehalogenated refer to products of such processes. Specific name of individual halogens and grammatical derivations thereof are used similarly (e.g. "chlorosilane", "dechlorination", "fluoroalkyl", etc.). A term metalloid refers to B, Ga, and other elements of the Periodic Table of Elements, which exhibit both metallic and nonmetallic properties, the properties being understood in their art-recognized meanings.

A term "hydrocarbon" refers to all permissible compounds having at least one hydrogen and at least one carbon atom, and a term "hydrocarbyl" refers to univalent groups formed by removing a hydrogen atom from a hydrocarbon. In a broad aspect, the permissible hydrocarbons include cyclic and acyclic, monocyclic and polycyclic, fused and unfused, branched and linear, carbocyclic and heterocyclic, saturated and unsaturated organic compounds, unsubstituted or substituted with one or more conventional groups, to the extent possible and/or applicable. A term "alkene" refers to all permissible compounds having at least one carbon-carbon double bond, at least four hydrogen atoms, and at least two carbon atoms. A term "alkenyl" refers to univalent groups formed by removing a hydrogen atom from an alkene. In a broad aspect, the permissible alkenes include cyclic and acyclic, monocyclic and polycyclic, fused and unfused, branched and linear, carbocyclic and heterocyclic organic compounds, unsubstituted or substituted with one or more conventional substituents, to the extent possible and/or applicable. A term "alkyne" refers to all permissible compounds having at least one carbon-carbon triple bond, at least two hydrogen atoms, and at least two carbon atoms. A term "alkynyl" refers to univalent groups formed by removing a hydrogen atom from an alkyne. In a broad aspect, the permissible alkynes include cyclic and acyclic, monocyclic and polycyclic, fused and unfused, branched and linear, carbocyclic and heterocyclic organic compounds, unsubstituted or substituted with one or more conventional substituents, to the extent possible and/or applicable. Unless otherwise indicated, terms "arene," "aryl," and "Ar" refer to both monocyclic and polycyclic aromatic species that may be fused or unfused, unsubstituted or substituted with one or more conventional substituents, to the extent possible and/or applicable. As used herein, the term "substituted" includes all permissible substituents, unless indicated otherwise. In a broad aspect, the permissible substituents include, for example, cyclic and acyclic, branched and linear, carbocyclic and heterocyclic, saturated and unsaturated organic groups, which optionally can comprise halogen-, oxygen-, nitrogen-, silicon-, germanium-, boron-, phosphorous-, and sulfur containing groups or the like.

Terms "cyclo", "poly", or "oligo" refer, respectively, to the cyclic, polymeric, or oligomeric nature of the compound or substituent. Prefixes "hydro", "organo", "amino", "alkoxy", "aryloxy", "alkyl", "alkenyl", "alkynyl", "aryl", "hydrocarbyl", "vinyl", "allyl", "halo", "silyl", and "germyl" serve to indicating groups in a molecule or a substituent and are used herein in their art-recognized meanings. These first set of prefixes can be further preceded by other prefixes such as "mono", "di", "bi", "tri", "tetra", "tetrakis", and "per", which generally refer to the number of bonding sites substituted with groups of the first set of groups in a molecule or a substituent [e.g. "di" or "bi"=2, "tri"=3, "tetra" or "tetrakis"=4, and "per"=all (entirely)]. For example "perhydrosilane" refers to a silicon compound with all sites substituted by hydrogens (compound consisting entirely of Si and H).

The terms "perhydrosilane polymer," "polyperhydrosilane", "polymeric perhydrosilane", "hydrosilane polymer," "polyhydrosilane", and "polymeric hydrosilane" may be used interchangeably herein, and unless expressly indicated otherwise, these terms individually refer to a compound or mixture of compounds that consists essentially of (1) silicon and/or germanium and (2) hydrogen.

A term "in situ" refers to synthesis and usage of compositions of matter without isolation or purification and is understood in the art-recognized meanings.

When referred to a polymer, a term "graft" and grammatical derivations thereof may describe a structural element in a polymer, wherein a chain is linked to only one other chain and in only one place (the chain is grafted to the backbone of the polymer). If the structure of a polymer is rendered into a drawing, the grafted polymer looks like a comb or a brush. When referred to a polymer, a term "cross-link" and grammatical derivations thereof may describe a structural element in a polymer, wherein a chain is linked to at least two other chains (the chain links two other chains together). If the structure of a polymer is rendered into a drawing, the cross-linked polymer can look like a web (network).

An Exemplary Cross-Linked Polymer of Silicon and/or Germanium

In some embodiments, desired polymers comprise linear chains of atoms, the atoms being independently selected from Si atoms, Ge atoms or combinations thereof, in which the atoms are directly bonded to the two neighboring atoms in the chain, the chains of atoms cross-linked to each other via a direct bond between atoms from different chains, and the atoms also bearing groups R, so that the total number of bonds for every atom in the chain is four. Substituent groups R are independently selected from the group consisting of hydrogen, halogen, alkenyl group, substituted alkenyl group, alkynyl group, substituted alkynyl group, aromatic hydrocarbyl group, substituted aromatic hydrocarbyl group, heterocyclic aromatic hydrocarbyl group, substituted heterocyclic aromatic hydrocarbyl group, $SiR^1_3$ group, $GeR^1_3$ group, $NR^1_2$ group, $PR^1_2$ group, $OR^1$ group, and $SR^1$ group, wherein every $R^1$ is independently selected from the group consisting of hydrogen, hydrocarbyl group, and substituted hydrocarbyl group; the groups R are optionally linked to each other to form a stable bridging group, and the $R^1$ are optionally linked to each other to form a stable bridging group.

The structure of the polymer influence physical properties, such as boiling point, volatility, viscosity, and surface tension. It is therefore possible to tailor properties of the polymer to predetermined specifications via synthetic control of the length of the chains, the degree of cross-linking, the number of chains per molecule, and the ratio of silicon atoms to germanium atoms in the chains. Furthermore, there are various possibilities with regard to permissible combinations of various R groups within one molecule, which serve as additional parameters for influencing physical properties of the polymer.

In some embodiments, the chains are 10-20 E atoms long with about 1-2 cross-links per chain, and about 2-20 chains linked together in a molecule. The total number of E atoms per molecule is then 20 to 4000.

In general, the degree of cross-linking can be described in terms of the percent of E atoms within a linear chain involved in a cross-link with another chain. The point of cross-linking involves an E atom with three or four bonds with other E atoms. In some embodiments, to obtain a relatively low degree of controlled cross-linking, no more than about 10% of the E atoms of a chain are involved in a cross-link, in other embodiments no more than about 8%, in further embodiments no more than about 6%, and in additional embodiments, from about 0.05% to about 5% of the E atoms are involved in cross-linking. The lower degree of cross-linking can be expressed in other ways relating to the nature of the resulting polymer structures. For example, two cross-links connecting two linear chains forms a cyclic group of E atoms embedded within the cross-linked polymer. However, with a low degree of cross-linking essentially no cycles with 12 E atoms or less in the cycle are formed, which can be expressed as less than 0.01 percent of the polymer chains is involved in a cyclic structure with 12 or less atoms in the cycle. In some embodiments, no more than 5% of the polymer chains are involved in a cyclic structure with 12 or less E atoms in the cycle, in further embodiments no more than 2%, and in other embodiments no more than 1% of the polymer chains are involved in a cyclic structure of E atoms with 12 or less E atoms in the cycle. A person of ordinary skill in the art will recognize that additional ranges of cross-linking percent or percent of cycles in the cross-linked structure within the explicit ranges above are contemplated and are within the present disclosure.

In another embodiment, all atoms in the chains are silicons, and the composition of matter is polysilane. However, in other embodiments, at least one E is Ge, and the composition of matter is polysilane-germane. In such embodiments, the polysilane-germane is essentially a random and/or statistical mixture of polysilanes, polygermanes and polysilane-germanes containing a proportion or ratio of germanium atoms to silicon atoms that substantially corresponds to the proportion or ratio of the germanium monomer to silicon monomer in the mixture of starting materials.

In another embodiment, substituents R are all hydrogens, providing polyperhydrosilane and polyperhydrogermane materials for making functional liquids.

However, in other embodiments, substituents R are halogens, aromatic, or heterocyclic aromatic groups, providing precursor material to polyhydrosilane and polyhydrogermane. In other embodiments, substituents R are amino groups, alkoxy, or aryloxy groups, also providing precursor material to polyhydrosilane and polyhydrogermane. In other embodiments, substituents R are alkenyl groups and alkynyl groups, also providing precursor material to polyhydrosilane and polyhydrogermane.

The structure and nature of the present polymers may be better understood with reference to some exemplary methods for their synthesis.

An Exemplary Method of Making Polymers of Silicon and/or Germanium

In one aspect, the selected polymers to be synthesized can be illustrated by the formula I:

$$E_a R_b \quad (I)$$

which are prepared by polymerizing monomers selected either from the group represented by the formula II or monomers represented by the formula III:

$$X\text{-}ER_2\text{—}X\ X_2RE\text{-}(ER_2)_c\text{-}ERX_2\ X_2RE\text{-}(ER_2)_c\text{-}ER_2X$$
$$X_2RE\text{-}(ER_2)_c\text{-}ER_3 \quad (II)$$

$$REH_3\ H_3E\text{-}(ER_2)_c\text{-}EH_3\ H_3E\text{-}(ER_2)_c\text{-}ERH_2\ H_3E\text{-}$$
$$(ER_2)_c\text{-}ER_3 \quad (III)$$

wherein every E is independently Si or Ge, R is the same as defined above, every X is independently a halogen, a is a number from 1 to 1000000, b is a number from 1 to 2000000, and c is a number from 0 to 100. The relative amount of the monomers within each formula influences the degree of cross-linking of the ultimate polymer.

Polymerization of monomers of formula II is usually called a dehalogenative coupling reaction (also known as Kipping reaction or Wurtz reaction) and polymerization of monomers of formula III is usually called a dehydrocoupling reaction (also known as dehydropolymerization reaction). Generally, in a polymerization reaction addition of a monomer to the growing chain can either result in preservation of an active growing center at the same chain or termination. In case of termination, a new center is formed elsewhere for the reaction to continue, and the individual acts of monomer coupling do not usually yield high molecular weight (HMW) products, as few monomers add to the same growing chain. This type of mechanism is called step-growth. While I do not wish to be bound by speculations about mechanism, I believe that dehalogenative coupling and dehydrocoupling polymerization reactions follow mainly step-growth mechanism. Therefore, dehalogenative coupling and dehydrocoupling polymerizations furnish only IMW (intermediate molecular weight) products. One aspect of the invention focuses on using monomers with more than two functional groups. The larger number of functional groups per monomer allows for branching of chains and cross-linking between chains, which leads to higher molecular weight products.

Dehalogenative coupling reaction can be performed, for example, either by electrochemical reaction in an apparatus for conducting electrolysis with a sacrificial anode or by a chemical reaction with Li, Na, Na/K alloy, K, Rb, Cs, Mg, Ca, Sr, or Al.

Dehydrocoupling reaction can be catalyzed, for example, by $R^2_d R^3_e M$, and $R^2_d R^3_e M^{f+} A^{f-}$, which may be synthesized separately or synthesized in situ from the corresponding precursors, wherein M is selected from the group consisting of metals and metalloids of group 3 through group 13 of the Periodic Table of Elements, lanthanides, and actinides; d and e are integer numbers from 0 to 10, f is a number from 0 to 2, every $R^2$ is independently selected from the group consisting of $SiR^4_3$ groups, $GeR^4_3$ groups, $NR^4$ groups, $NR^4_2$ groups, $NR^4_3$ groups, $PR^4$ groups, $PR^4_2$ groups, $PR^4_3$ groups, $OR^4$ groups, $SR^4$ groups, and cyclopentadienyl groups or substituted cyclopentadienyl groups represented by the formula $C_5H_g R^4_{5-g}$, the $R^2$ are optionally linked to each other to form a stable bridging group, wherein g is an integer number from 0 to 5, every $R^4$ is independently selected from the group consisting of hydrogen, hydrocarbyl groups, substituted hydrocarbyl groups, $OR^5$ groups, $C(=O)R^5$ groups, $CO_2R^5$ groups, $SiR^5_3$ groups, $GeR^5_3$ groups, and $NR^5_2$ groups; the $R^4$ groups are optionally linked to each other to form a stable bridging group, in which every $R^5$ group is independently selected from the group consisting of hydrogen, hydrocarbyl groups, and substituted hydrocarbyl groups, the $R^5$ groups are optionally linked to each other to form a stable bridging group, $R^3$ is independently selected from the group consisting of CO group, $R^6CN$ groups, $R^6NC$ groups, hydride groups, hydrocarbyl groups, substituted hydrocarbyl groups, $SiR^6_3$ groups, $GeR^6_3$ groups, $NR^6$ groups, $NR^6_2$ groups, $NR^6_3$ groups, $PR^6$ groups, $PR^6_2$ groups, $PR^6_3$ groups, $OR^6$ groups, and $SR^6$ groups, the $R^3$ are optionally linked to each other to form a stable bridging group, in which every $R^6$ is independently selected from the group consisting of hydrogen, hydrocarbyl groups, substituted hydrocarbyl groups, $OR^7$ groups, $C(=O)R^7$ groups, $CO_2R^7$ groups, $SiR^7_3$ groups, $GeR^7_3$ groups, and $NR^7_2$ groups; the $R^6$ are optionally linked to each other to form a stable bridging group, wherein every $R^7$ is independently selected from the group consisting of hydrogen, hydrocarbyl groups, and substituted hydrocarbyl groups, the $R^7$ are optionally linked to each other to form a stable bridging group, and $A^{f+}$ is an anion selected from the group consisting of $BF_4^-$, $PF_6^-$, $SbF_6^-$, $CF_3SO_3^-$, $CB_{11}H_{12}^-$, $CB_9H_{10}^-$, $CB_9H_5X^1_5^-$, $CB_{11}H_6X^1_6^-$, $B(C_6F_5)_4^-$, and $[(M^1)_h Z^1Z^2\ldots Z^j]^{f-}$, in which $X^1$ is halogen, $M^1$ is selected from the group consisting of B, Al, or Ga, h is a number from 0 to 4, j is an integer number from 0 to 12, or j is 4, and $Z^1$ through $Z^j$ are independently selected from the group consisting of H, hydrocarbyl groups, substituted hydrocarbyl groups, halogens, halogen substituted hydrocarbyl groups, halogen substituted hydrocarbyl organometalloid groups, $OR^8$, $C(=O)R^8$, $CO_2R^8$, and $NR^8_2$, wherein every $R^8$ is independently selected from the group consisting of H, hydrocarbyl groups, substituted hydrocarbyl groups, and halogen substituted hydrocarbyl groups; the $Z^1$ through $Z^j$ are optionally linked to each other to form a stable bridging group.

The dehalogenative coupling reaction can be further promoted by solubilization agents, such as cryptands (also known as cryptates), crown ethers, encapsulating ligands, linear oligoethers, linear polyethers, compounds $R^9O((CR^{10}_2)_kO)_mR^9$, compounds $R^9(NR^{11})((CR^{10}_2)_k(NR^{11}))_m R^9$, compounds $R^9N[((CR^{10}_2)_kO)_m(CR^{10}_2)_k]_2NR^9$, and compounds $N[((CR^{10}_2)_kO)_m(CR^{10}_2)_k]_3N$, wherein k and m are numbers from 1 to 20, every $R^9$ and $R^{11}$ are independently selected from the group consisting of hydrocarbyl groups and substituted hydrocarbyl groups, every $R^{10}$ is independently selected from the group consisting of hydride, hydrocarbyl groups, and substituted hydrocarbyl groups, the $R^9$, $R^{10}$, and $R^{11}$ are optionally linked to each other to form a stable bridging group.

Monomers $X-ER_2-X$, $X_2RE-(ER_2)_c-ER_3$, $REH_3$, and $H_3E-(ER_2)_c-EPh_3$ (when R is not H or halide) have only two functional groups that are reactive under chosen polymerization conditions (only two out of three H groups in $EH_3$ are reactive) and therefore contribute only to linear chain growth. Monomers $X_2RE-(ER_2)_c-ER_2X$ and $H_3E-(ER_2)_c-ERH_2$ (when R is not H or halide) have three groups per monomer (only one out of two H groups in $ERH_2$ is reactive) and contribute to grafting—a process of growing a side chain, which is cross-linked to another chain in only one place. Monomers $X_2RE-(ER_2)_c-ERX_2$ and $H_3E-(ER_2)_c-EH_3$ (when R is not H or halide) have four groups per monomer and contribute to cross-linking two linear chains by a $(ER_2)_c$ bridge. The possibility of combining of two or all three types of monomers in various ratios offers substantial control over the structure and properties of the polymer.

In some embodiments, the polyperhydrosilane and polyperhydrogermane are synthesized by polymerizing the monomers, followed by removal of R groups via reaction with a source of hydride, wherein R is an $NR^1_2$ group, $PR^1_2$ group, $OR^1$ group, or $SR^1$ group; wherein $R^1$ is the same as defined above; wherein the source of hydride is $H_nM^2_pX^2_qR^{12}_r$ or $H_nM^2_pM^3_sX^2_qR^{12}_r$, wherein n, p, q, r and s are independently numbers from 0 to 20, $M^2$ and $M^3$ are independently selected from the group consisting of Li, Na, K, Rb, Cs, Mg, Ca, Sr, B, Al, Si, and Sn, every $X^2$ is an independently selected halogen, and every $R^{12}$ is independently selected from the group consisting of hydrocarbyl groups, substituted hydrocarbyl groups, $NR^{13}_2$ groups, and $OR^{13}$ groups, wherein every $R^{13}$ is independently selected from the group consisting of hydrocarbyl groups and substituted hydrocarbyl groups, the $R^{12}$ and $R^{13}$ groups are optionally substituted with a plurality of O atoms, N atoms or a combination thereof, the $R^{12}$ are optionally linked to each other to form a stable bridging group, and the $R^{13}$ are optionally linked to each other to form a stable bridging group.

In another embodiment, the polyperhydrosilane, polyperhydrogermane or copolymer thereof is synthesized by polymerizing the monomers, followed by halogenation, followed by removal of halogens via reaction with a source of hydride, wherein R is an alkenyl group, substituted alkenyl group, alkynyl group, substituted alkynyl group, aromatic hydrocarbyl group, substituted aromatic hydrocarbyl group, heterocyclic aromatic hydrocarbyl group, substituted heterocyclic aromatic hydrocarbyl group, $NR^1_2$ group, $PR^1_2$ group, $OR^1$ group, or $SR^1$ group; in which $R^1$ is the same as defined above; in which the source of hydride is the same as defined above; in which halogenation is driven, for example, by $HX^3$, $R^{14}(C=O)X^3$, or a combination of $HX^5$ with $M^6X^3$; in which $X^3$ is a halogen and $X^5$ is OMs methanesulfonate groups, OTf trifluoromethanesulfonate groups, or OTs toluenesulfonate groups; wherein $M^6$ is Li, Na, K, Cs, or Rb; and wherein $R^{14}$ is selected from the group consisting of hydride, hydrocarbyl groups, and substituted hydrocarbyl groups.

In another embodiment, the halogenation is further catalyzed, for example, by $M^4_tX^4_u$, wherein $M^4$ is selected from the group consisting of metal and metaloid of group 3 through group 13 of the Periodic Table of Elements, lanthanides, and actinides, $X^4$ is a halogen, t is a number from 1 to 5, and u is a number from 1 to 30.

In another embodiment, the monomers for dehalogenative coupling reaction are selected from the group consisting of $SiR_2Cl_2$, $Cl_2RSi-SiR_2-SiRCl_2$, $Cl_2RSi-(SiR_2)_2-SiRCl_2$, $Cl_2RSi-(SiR_2)_3-SiRCl_2$, $Cl_2RSi-SiR_2-SiR_2Cl$, $Cl_2RSi-(SiR_2)_2-SiR_2Cl$, $Cl_2RSi-(SiR_2)_3-SiR_2Cl$, $Cl_2RSi-SiR_2-SiR_3$, $Cl_2RSi-(SiR_2)_2-SiR_3$, $Cl_2RSi-(SiR_2)_3-SiR_3$, $GeR_2Cl_2$, $Cl_2RGe-GeR_2-GeRCl_2$, $Cl_2RGe-(GeR_2)_2-GeRCl_2$, $Cl_2RGe-(GeR_2)_3-GeRCl_2$, $Cl_2RGe-GeR_2-GeR_2Cl$, $Cl_2RGe-(GeR_2)_2-GeR_2Cl$, $Cl_2RGe-(GeR_2)_3-GeR_2Cl$, $Cl_2RGe-GeR_2-GeR_3$, $Cl_2RGe-(GeR_2)_2-GeR_3$, and $Cl_2RGe-(GeR_2)_3-GeR_3$; wherein R groups in $SiR_3$ and $GeR_3$ are selected from the group consisting of all permissible combinations of Ph, $NMe_2$, $NEt_2$, OMe, OEt, OPh, $NC_4H_4$ pyrrolyl, 1,2-$(NMe)_2C_6H_4$, 1,2-$(NEt)_2C_6H_4$, 1,2-$(NMe)_2C_2H_2$, 1,2-$(NEt)_2C_2H_2$, 1,2-$(NMe)_2C_2H_4$, and 1,2-$(NEt)_2C_2H_4$; in which $ER_2$ (E is Si or Ge) are $EPh_2$, $EPh(NMe_2)$, $EPh(NEt_2)$, $EPh(OMe)$, $EPh(OEt)$, $EPh(OPh)$, $E(NMe_2)_2$, $E(NEt_2)_2$, $E(NMe_2)OPh$, $E(NEt_2)OPh$, $E(NMe_2)OMe$, $E(NMe_2)OEt$, $E(NEt_2)OMe$, $E(NEt_2)OEt$, $E(NC_4H_4)Ph$, $E(NC_4H_4)_2$, $E(1,2-(NMe)_2C_6H_4)$, $E(1,2-(NEt)_2C_6H_4)$, $E(1,2-(NMe)_2C_2H_2)$, $E(1,2-(NEt)_2C_2H_2)$, $E(1,2-(NMe)_2C_2H_4)$, and $E(1,2-(NEt)_2C_2H_4)$; and in which $ER_1$ (E is Si or Ge) is EPh, $E(NMe_2)$, $E(NEt_2)$, $E(OMe)$, $E(OEt)$, $E(OPh)$, and $E(NC_4H_4)$.

In another embodiment, the dehalogenative coupling is driven, for example, by Li, Na, or Mg.

In another embodiment, the dehalogenative coupling is performed by electrolysis utilizing a sacrificial electrode made of Mg, Cu, or Al, and in particular Mg.

In another embodiment, the dehalogenative coupling is performed by electrolysis in an aprotic solvent (preferably dimethoxyethane or tetrahydrofurane).

In another embodiment, the dehalogenative coupling is performed by electrolysis in the presence of a supporting electrolyte (such as, perchlorate salt, for example, ammonium perchlorate or lithium perchlorate).

In another embodiment, the dehalogenative coupling is promoted by 15-crown-5, 18-crown-6, dibenzo-18-crown-6, cyclohexyl-18-crown-6, dimethoxyethane, hexamethylphosphoramide, diglyme, triglyme, tetraglyme, cryptand-221, or cryptand-222.

In another embodiment, the dehalogenative coupling is initialized by ultrasonication by placing the vessel with the reaction into an ultrasonic bath or placing and ultrasound-generating device into the reaction vessel.

In another embodiment, the dehalogenative coupling is driven, for example, by Li, Na, or Mg in combination with ultrasonication.

In another embodiment, the dehalogenative coupling is carried out in toluene, toluene-heptane mixture, dimethoxyethane, or tetrahydrofurane solvent.

In another embodiment, the monomers for dehydrocoupling reaction are selected from the group consisting of $PhSiH_3$, $H_3Si-SiHPh-SiH_3$, $H_3Si-(SiHPh)_2-SiH_3$, $H_3Si-(SiHPh)_3-SiH_3$, $H_3Si-SiPh_2-SiH_3$, $H_3Si-(SiPh_2)_2-SiH_3$, $H_3Si-(SiPh_2)_3-SiH_3$, $H_3Si-SiHPh-SiPhH_2$, $H_3Si-(SiHPh)_2-SiPhH_2$, $H_3Si-(SiHPh)_3-SiPhH_2$, $H_3Si-SiPh_2-SiPhH_2$, $H_3Si-(SiPh_2)_2-SiPhH_2$, $H_3Si-(SiPh_2)_3-SiPhH_2$, $H_3Si-SiHPh-SiPh_3$, $H_3Si-(SiHPh)_2-SiPh_3$, $H_3Si-(SiHPh)_3-SiPh_3$, $H_3Si-SiPh_2-SiPh_3$, $H_3Si-(SiPh_2)_2-SiPh_3$, $H_3Si-(SiPh_2)_3-SiPh_3$, $(CH_3C_6H_4)SiH_3$ tolylsilane, $H_3Si-SiH(CH_3C_6H_4)-SiH_3$, $H_3Si-(SiH(CH_3C_6H_4))_2-SiH_3$, $H_3Si-(SiH(CH_3C_6H_4))_3-SiH_3$, $H_3Si-Si(CH_3C_6H_4)_2-SiH_3$, $H_3Si-(Si(CH_3C_6H_4)_2)_2-SiH_3$, $H_3Si-(Si(CH_3C_6H_4)_2)_3-SiH_3$, $H_3Si-SiH(CH_3C_6H_4)H_2$, $H_3Si-(SiH(CH_3C_6H_4))_2-Si(CH_3C_6H_4)H_2$, $H_3Si-(SiH(CH_3C_6H_4))_3-Si(CH_3C_6H_4)H_2$, $H_3Si-Si(CH_3C_6H_4)_2-Si(CH_3C_6H_4)H_2$, $H_3Si-(Si(CH_3C_6H_4)_2)_2-Si(CH_3C_6H_4)H_2$, $H_3Si-(Si(CH_3C_6H_4)_2)_3-Si(CH_3C_6H_4)H_2$, $H_3Si-SiH(CH_3C_6H_4)-Si(CH_3C_6H_4)_3$, $H_3Si-(SiH(CH_3C_6H_4))_2-Si(CH_3C_6H_4)_3$, $H_3Si-(SiH(CH_3C_6H_4))_3-Si(CH_3C_6H_4)_3$, $H_3Si-Si(CH_3C_6H_4)_2-Si(CH_3C_6H_4)_3$, $H_3Si-(CH_3C_6H_4)_2)_2-Si(CH_3C_6H_4)_3$, $H_3Si-(Si(CH_3C_6H_4)_2)_3-Si(CH_3C_6H_4)_3$, $PhGeH_3$, $H_3Ge-GeHPh-GeH_3$, $H_3Ge-(GeHPh)_2-GeH_3$, $H_3Ge-(GeHPh)_3-GeH_3$, $H_3Ge-GePh_2-GeH_3$, $H_3Ge-(GePh_2)_2-GeH_2$, $H_3Ge-(GePh_2)_3-GeH_3$, $H_3Ge-GeHPh-GePhH_2$, $H_3Ge-(GeHPh)_2-GePhH_2$, $H_3Ge-(GeHPh)_3-GePh_2$, $H_3Ge-GePh_2-GePhH_2$, $H_3Ge-(GePh_2)_2-GePhH_2$, $H_3Ge-(GePh_2)_3-GePhH_2$, $H_3Ge-GeHPh-GePh_3$, $H_3Ge-(GeHPh)_2-GePh_3$, $H_3Ge-(GeHPh)_3-GePh_3$, $H_3Ge-GePh_2-GePh_3$, $H_3Ge-(GePh_2)_2-GePh_3$, $H_3Ge-(GePh_2)_3-GePh_3$, $(CH_3C_6H_4)GeH_3$ tolylgermane, $H_3Ge-GeH(CH_3C_6H_4)-GeH_3$, $H_3Ge-(GeH(CH_3C_6H_4))_2-GeH_3$, $H_3Ge-(GeH(CH_3C_6H_4))_3-GeH_3$, $H_3Ge-Ge(CH_3C_6H_4)_2-GeH_3$, $H_3Ge-(Ge(CH_3C_6H_4)_2)_2-GeH_3$, $H_3Ge-(Ge(CH_3C_6H_4)_2)_3-GeH_3$, $H_3Ge-GeH(CH_3C_6H_4)-Ge(CH_3C_6H_4)H_2$, $H_3Ge-(GeH(CH_3C_6H_4))_2-Ge(CH_3C_6H_4)H_2$, $H_3Ge-(GeH(CH_3C_6H_4))_3-Ge(CH_3C_6H_4)H_2$, $H_3Ge-Ge(CH_3C_6H_4)_2-Ge(CH_3C_6H_4)H_2$, $H_3Ge-(Ge(CH_3C_6H_4)_2)_2-Ge(CH_3C_6H_4)H_2$, $H_3Ge-(Ge(CH_3C_6H_4)_2)_3-Ge(CH_3C_6H_4)H_2$, $H_3Ge-GeH(CH_3C_6H_4)-Ge(CH_3C_6H_4)_3$, $H_3Ge-(GeH(CH_3C_6H_4))_2-Ge(CH_3C_6H_4)_3$, $H_3Ge-(GeH$ $(CH_3C_6H_4))_3-Ge(CH_3C_6H_4)_3$, $H_3Ge-Ge(CH_3C_6H_4)_2-Ge(CH_3C_6H_4)_3$, and $H_3Ge-(Ge(CH_3C_6H_4)_2)_3-Ge(CH_3C_6H_4)_3$.

In another embodiment, the dehydrocoupling is catalyzed by $Cp_2MH_2$, $CpCp*MH_2$, $Cp_2M(CH_3)_2$, $CpCp*M(CH_3)_2$, $Cp_2M(OCH_3)_2$, $CpCp*M(OCH_3)_2$, $Cp_2M(N(CH_3)_2)_2$, $CpCp*M(NCH_3)_2)_2$, $Cp_2M(C_6H_5)_2$, $CpCp*M(C_6H_5)_2$, $Cp_2M(OC_6H_5)_2$, $CpCp*M(OC_6H_5)_2$, $Cp_2M(C_2H_5)_2$, $CpCp*M(C_2H_5)_2$, $Cp_2M(C_3H_7)_2$, $CpCp*M(C_3H_7)_2$, $Cp_2M(C_4H_9)_2$, or $CpCp*M(C_4H_9)_2$; in which Cp is $C_5H_5$ cyclopentadienyl and Cp* is $C_5(CH_3)_5$ pentamethylcyclopentadienyl group; wherein M is Ti, Zr, or Hf.

In another embodiment, the dehydrocoupling is catalyzed by $Cp_2MHA^f$, $CpCp*MHA^f$, $Cp_2M(CH_3)A^f$, $CpCp*M(CH_3)A^f$, $Cp_2M(OCH_3)A^f$, $CpCp*M(OCH_3)A^f$, $Cp_2M(N(CH_3)_2)A^f$, $CpCp*M(NCH_3)_2)A^f$, $Cp_2M(C_6H_5)A^f$, $CpCp*M(C_6H_5)A^f$, $Cp_2M(OC_6H_5)A^f$, $CpCp*M(OC_6H_5)A^f$, $Cp_2M(C_3H_7)A^f$, $CpCp*M(C_3H_7)A^f$, $Cp_2M(C_4H_9)A^f$, or $CpCp*M(C_4H_9)A^f$; in which Cp is $C_5H_5$ cyclopentadienyl and Cp* is $C_5(CH_3)_5$ pentamethylcyclopentadienyl group; in which M is Ti, Zr, or Hf; in which $A^f$ is $B(C_6F_5)_4$, or $BH(C_6F_5)_3$, or $B(CH_3)(C_6F_5)_3$, or $B(OCH_3)(C_6F_5)_3$, or $B(N(CH_3)_2)(C_6F_5)_3$, or $B(C_6H_5)(C_6F_5)_3$, or $B(OC_6H_5)(C_6F_5)_3$, or $B(C_3H_7)(C_6F_5)_3$, or $B(C_4H_9)(C_6F_5)_3$.

In another embodiment, the dehydrocoupling is carried out in neat monomer without solvent.

In another embodiment, the source of hydride is LiH, NaH, KH, $LiAlH_4$, $NaBH_4$, or $NaAlH_2(OCH_2CH_2OCH_3)_2$.

In another embodiment, the reaction with the source of hydride is carried out in diethyl ether solvent or a mixture of diethyl ether and cyclohexane.

In another embodiment, the halogenation is driven by HCl, HBr, or HI in combination with $AlCl_3$, $AlBr_3$, or $AlI_3$.

In another embodiment, the halogenation is driven by $CF_3SO_3H$ in the presence of LiCl or LiF, in which $CF_3SO_3$ is a trifluoromethanesulfonate group.

In another embodiment, the halogenation is carried out in cyclohexane, toluene, or dichloromethane solvent.

In some embodiments, the dehydrocoupling is carried out at a temperature of from −20 DEG C. to +100 DEG C., in other embodiments from 0 DEG C. to 50 DEG C., in further embodiments from +10 DEG C. to +30 DEG C.

In another embodiment, the dehalogenative coupling is carried out at a temperature of about −20 DEG C. to +200 DEG C., in further embodiments from −20 DEG C. to +120 DEG C., an in additional embodiments from 0 DEG C. to +80 DEG C.

In another embodiment, the reaction with the source of hydride is carried out at a temperature of from −60 DEG C. to +100 DEG C., in other embodiments from −40 DEG C. to +50 DEG C., and in further embodiments from −20 DEG C. to +20 DEG C.

In some embodiments, the halogenation is carried out at a temperature of from −60 DEG C to +100 DEG C., in other embodiments from −30 DEG C. to +50 DEG C., and in further embodiments from −10 DEG C. to +30 DEG C.

Prior examples of cross-linked polyperhydrosilanes and polyperhydrogermanes synthesized by dehalogenative- or dehydrogenative polymerizations are known: DE 4110917 to Hengge et al. (1992), JP 6-128381 to Nomura et al. (1994), DE 3122992 to John et al. (1982), GB 2077710 to John et al. (1981), JP 8-262727 to Shigeru et al. (1996), JP 57-027915 to Fuiritsupu et al. (1982), JP 1-001404B to Fuiritsupu et al. (1989), JP 1-523659C to Fuiritsupu et al. (1989), U.S. Pat. No. 5,866,471 to Beppu et al. (1999), JP 5-032785 to Sakakura et al. (1993), U.S. Pat. No. 5,252,766 to Sakakura et al. (1993), JP 5-301964A to Nishida et al. (1993), JP 5-301965A to Nishida et al. (1993), JP 7-316304A to Nishida et al. (1995), JP 7-316305A to Nishida et al. (1995), U.S. Pat. No. 5,717,051 to Hiraoka et al. (1998), and JP 10-321536 to Yamamoto (1998), all of which are incorporated herein by reference. All of these examples are based on polymerization of monomers that have no groups other than hydrogen or halogen. These groups are all reactive and can all react in the course of the synthesis. That leads to random polymerization, dense cross-linking, and no control over polymer structure or solubility. One aspect of control, achieved in polymerization reactions described herein, is in the existence of additional substituents other than hydrogen or halogen in the starting monomers. The additional substituents do not react under polymerization conditions and are utilized to prevent dense cross-linking at this stage. The additional substituents are subsequently replaced with hydrogen to furnish soluble perhydrosilane and perhydrogermane polymers. The processes described herein are useful for the syntheses of lightly cross-linked materials via procedures described herein.

An Exemplary Method of Making Linear Polymers

In some embodiments, linear polymers are represented by formula IV:

$$HR^{15}{}_2E\text{-}(ER^{15}{}_2)_v ER^{15}{}_2 R^{28}, \qquad (IV)$$

and can be prepared by polymerizing monomer or combination of monomers selected from the group consisting of compounds represented by formula V,

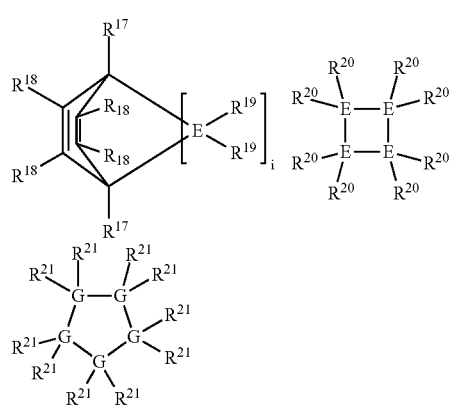

wherein v is a number from 0 to 1000000, every E is independently selected from the group consisting of Si atoms, Ge atoms and combinations thereof, every $R^{15}$ is a group independently selected from the group consisting of $R^{19}$, $R^{20}$, and $R^{12}$; every $R^{28}$ is a group independently selected from the group consisting of hydrogen, halogen, hydrocarbyl groups, substituted hydrocarbyl groups, $SiR^{29}{}_3$ groups, $GeR^{29}{}_3$ groups, $NR^{29}{}_2$ groups, $PR^{29}{}_2$ groups, $OR^{29}$ groups, and $SR^{29}$ groups, wherein every $R^{29}$ is independently selected from the group consisting of hydrogen, hydrocarbyl groups, and substituted hydrocarbyl groups; the groups $R^{28}$ are optionally linked to each other to form a stable bridging group, the groups $R^{29}$ are optionally linked to each other to form a stable bridging group, the groups $R^{15}$ are optionally linked to each other to form a stable bridging group, every E is independently selected from the group consisting of Si atoms, Ge atoms or combinations thereof, i is a number from 1 to 20, every $R^{17}$ and $R^{18}$ groups are independently selected from the group consisting of hydrogen, halogen, hydrocarbyl groups, and substituted hydrocarbyl groups, the $R^{17}$ and $R^{18}$ groups are optionally substituted with a plurality of O atoms, N atoms and combinations thereof, the $R^{18}$ groups are optionally linked to each other to form a stable bridging group, every $R^{19}$ group is independently selected from the group consisting of hydrogen, halogen, alkenyl groups, substituted alkenyl groups, alkynyl groups, substituted alkynyl groups, aromatic hydrocarbyl group, substituted aromatic hydrocarbyl group, heterocyclic aromatic hydrocarbyl groups, substituted heterocyclic aromatic hydrocarbyl groups, $SiR^{22}{}_3$ groups, $GeR^{22}{}_3$ group, $NR^{22}{}_2$ group, $PR^{22}{}_2$ groups, $OR^{22}$ groups, and $SR^{22}$ groups, wherein every $R^{22}$ is independently selected from the group consisting of hydrogen, hydrocarbyl groups, and substituted hydrocarbyl groups; the $R^{19}$ are optionally linked to each other to form a stable bridging group, the $R^{22}$ are optionally linked to each other to form a stable bridging group, every $R^{20}$ group is independently selected from the group consisting of halogen, alkenyl group, substituted alkenyl group, alkynyl group, substituted alkynyl group, aromatic hydrocarbyl group, substituted aromatic hydrocarbyl group, heterocyclic aromatic hydrocarbyl groups, substituted heterocyclic aromatic hydrocarbyl groups, $SiR^{23}{}_3$ group, $GeR^{23}{}_3$ groups, $NR^{23}{}_2$ groups, $PR^{23}{}_2$ groups, $OR^{23}$ group, and $SR^{23}$ groups, wherein every $R^{23}$ is independently selected from the group consisting of hydrogen, hydrocarbyl groups, and substituted hydrocarbyl groups; the $R^{20}$ are optionally linked to each other to form a stable bridging group, the $R^{23}$ are optionally linked to each other to form a stable bridging group; every $R^{21}$ group is independently selected from the group consisting of halogen, alkenyl group, substituted alkenyl group, alkynyl group, substituted alkynyl group, aromatic hydrocarbyl group, substituted aromatic hydrocarbyl group, heterocyclic aromatic hydrocarbyl groups, substituted heterocyclic aromatic hydrocarbyl groups, $SiR^{16}{}_3$ groups, $GeR^{16}{}_3$ groups, $NR^{16}{}_2$ groups, $PR^{16}{}_2$ groups, $OR^{16}$, and $SR^{16}$ groups, wherein every $R^{16}$ is independently selected from the group consisting of hydrogen, hydrocarbyl groups, and substituted hydrocarbyl groups; and the $R^{16}$ are optionally linked to each other to form a stable bridging group. In some embodiments of interest, at least one of the E atoms in the monomers of formula (V) is a Ge atom. In further embodiments, at least one E is a Ge in the monomers of formula (V) and at least one E is a Si atom. With respect to the range of v, in some embodiments, v is a distribution with an average from 2 to 1,000,000, in further embodiments, from 12 to 100,000, in additional embodiments from 16 to 50,000, in other embodiments, from 25 to 10,000 and in more embodiments from 51 to 5000. A person of ordinary skill in the art will recognize that additional ranges within the explicit ranges of v are contemplated and are within the present disclosure.

As discussed above, in a polymerization reaction addition of a monomer to the growing chain can either result in preservation of an active growing center at the same chain or termination. In case of preservation of the active center chain growth continues, many individual acts of coupling per growing chain occur even when little monomer is consumed, and substantially high molecular weight (HMW) polymers are formed. This type of polymerization is called chain-growth polymerization. While I do not wish to be bound by speculations about mechanism, I believe that monomers represented by formula V are polymerized mainly by chain-growth mechanism. Polymerizations of these monomers, therefore, provide a route to substantially HMW, linear polymers without the necessity of cross-linking.

In some embodiments, the polymerization is driven by heating the monomers to a temperature of from about 40 DEG C. to +140 DEG C., in other embodiments from about 60 DEG C. to +120 DEG C.

In other embodiments, the polymerization is catalyzed by $R^{24}_w M^5$, $R^{24}_w M^5 X^2$, $R^{24}_4 NF$, $LiAlH_4$, $NaBH_4$, $NaAlH_2(OCH_2CH_2OCH_3)_2$, $H_n M^2_p X^2_q R^{12}_r$, $H_n M^2_p M^3_s X^2_q R^{12}_r$, $HX^2$, $HBF_4$, $HPF_6$, $HSbF_6$, $CF_3SO_3H$, and $CF_3(CO)H$, wherein n, p, q, r and s are independently numbers from 0 to 20, w is a number from 1 to 4, $M^2$, $M^3$, and $M^5$ are independently selected from the group consisting of Li, Na, K, Rb, Cs, Mg, Ca, Sr, B, Al, Si, and Sn, every $X^2$ is an independently selected halogen, and every $R^{12}$ is independently selected from the group consisting of hydrocarbyl groups, substituted hydrocarbyl groups, $NR^{13}_2$ groups, and $OR^{13}$ groups, in which every $R^{13}$ is independently selected from the group consisting of hydrocarbyl groups and substituted hydrocarbyl groups, the $R^{12}$ and $R^{13}$ groups are optionally substituted with a plurality of O atoms, N atoms or a combination thereof, the $R^{12}$ are optionally linked to each other to form a stable bridging group, and the $R^{13}$ are optionally linked to each other to form a stable bridging group, every $R^{24}$ is independently selected from the group consisting of hydrogen, hydrocarbyl groups, substituted hydrocarbyl groups, $SiR^{25}_3$ groups, $GeR^{25}_3$ groups, $NR^{25}_2$ groups, $PR^{25}_2$ groups, $OR^{25}$ groups, and $SR^{25}$ groups, in which every $R^{25}$ is independently selected from the group consisting of hydrogen, hydrocarbyl groups, and substituted hydrocarbyl groups; the groups $R^{24}$ are optionally linked to each other to form a stable bridging group, the $R^{25}$ are optionally linked to each other to form a stable bridging group.

In another embodiment, the polymerization is promoted by cryptands, crown ethers, encapsulating ligands, linear oligoethers, linear polyethers, compounds $R^9O((CR^{10}_2)_kO)_m R^9$, compounds $R^9(NR^{11})((CR^{10}_2)_k(NR^{11}))_m R^9$, compounds $R^9N[((CR^{10}_2)_kO)_m(CR^{10}_2)_k]_2 NR^9$, compounds $N[((CR^{10}_2)_kO)_m(CR^{10}_2)_k]_3 N$, wherein k and m are numbers from 1 to 20, every $R^9$ and $R^{11}$ are independently selected from the group consisting of hydrocarbyl groups and substituted hydrocarbyl groups, every $R^{10}$ is independently selected from the group consisting of hydride, hydrocarbyl groups, and substituted hydrocarbyl groups, the $R^9$, $R^{10}$, and $R^{11}$ are optionally linked to each other to form a stable bridging group.

In another embodiment, the polymerization is followed by removal of $R^{19}$, $R^{20}$, and $R^{21}$ groups via reaction with a source of hydride, wherein $R^{19}$ is a halogen, $PR^{22}_2$ groups, $OR^{22}$ groups, or $SR^{22}$ groups; in which $R^{20}$ is an $NR^{23}_2$ group, $PR^{23}_2$ group, or $SR^{23}$ group; in which $R^{21}$ is an $NR^{16}_2$ group, $PR^{16}_2$ group, or $SR^{16}$ group; in which $R^{16}$, $R^{22}$, and $R^{23}$ are the same as defined above; in which the source of hydride is selected from the group consisting of LiH, NaH, KH, $LiAlH_4$, $NaBH_4$, $NaAlH_2(OCH_2CH_2OCH_3)_2$, $H_n M^2_p X^2_q R^{12}_r$, and $H_n M^2_p M^3_s X^2_q R^{12}_r$, in which n, p, q, r and s are independently numbers from 0 to 20, $M^2$ and $M^3$ are independently selected from the group consisting of Li, Na, K, Rb, Cs, Mg, Ca, Sr, B, Al, Si, and Sn, every $X^2$ is an independently selected halogen, and every $R^{12}$ is independently selected from the group consisting of hydrocarbyl groups, substituted hydrocarbyl groups, $NR^{13}_2$ groups, and $OR^{13}$ groups, in which every $R^{13}$ is independently selected from the group consisting of hydrocarbyl groups and substituted hydrocarbyl groups, the $R^{12}$ and $R^{13}$ groups are optionally substituted with a plurality of O atoms, N atoms or a combination thereof, the $R^{12}$ are optionally linked to each other to form a stable bridging group, and the $R^{13}$ are optionally linked to each other to form a stable bridging group.

In another embodiment, the polymerization is followed by halogenation reaction, in which the halogenation is carried out by reacting the product of polymerization with $CF_3SO_3H$ in the presence of $LiX^3$, in which $CF_3SO_3$ is trifluoromethanesulfonate group, and $X^3$ is halogen.

In another embodiment, the polymerization is followed by halogenation reaction, in which the halogenation is carried out by reacting the product of polymerization with $HX^3$ or $R^{14}(C=O)X^3$, in which $X^3$ is halogen and $R^{14}$ is selected from the group consisting of hydride, hydrocarbyl groups, and substituted hydrocarbyl groups.

In another embodiment, halogenation is facilitated by a catalytic composition comprising $M^4_t X^4_u$, wherein $M^4$ is selected from the group consisting of metal and metaloid of group 3 through group 13 of the Periodic Table of Elements, lanthanides, and actinides, $X^4$ is a halogen, t is a number from 1 to 5, and u is a number from 1 to 30.

In another embodiment, the polymerization is followed by halogenation reaction, which is followed by reaction with a source of hydride, wherein reagents and catalysts for halogenation reaction and the source of hydride are the same as defined above.

In another embodiment, the monomers for polymerization reaction are selected from the group of compounds represented by formula V,

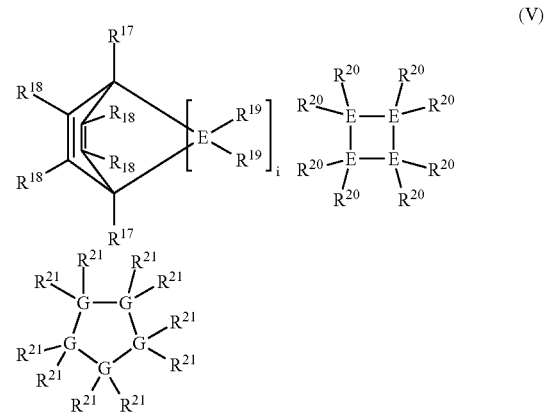

(V)

wherein E is Si, every $R^{17}$ is a hydrogen or phenyl group, $R^{18}$ is a hydrogen, every $R^{19}$ is independently selected from the group consisting of alkenyl groups, substituted alkenyl groups, alkynyl groups, substituted alkynyl groups, heterocyclic aromatic hydrocarbyl groups, substituted heterocyclic aromatic hydrocarbyl groups, $OR^{22}$ groups, and $SR^{22}$ groups, in which every $R^{22}$ is independently selected from the group consisting of $CH_3$, $C_2H_5$, and $C_3H_9$; the $R^{19}$ are optionally linked to each other to form a stable bridging group, every $R^{20}$ is independently selected from the group consisting of heterocyclic aromatic hydrocarbyl groups, substituted heterocyclic aromatic hydrocarbyl groups, $NR^{23}_2$ groups, $PR^{23}_2$ groups, and $SR^{23}$ groups, in which every $R^{23}$ is independently selected from the group consisting of $CH_3$, $C_2H_5$, and $C_3H_9$; the $R^{20}$ are optionally linked to each other to form a stable bridging group; every $R^{21}$ is independently selected from the group consisting of heterocyclic aromatic hydrocarbyl groups, substituted heterocyclic aromatic hydrocarbyl groups, $NR^{16}_2$ groups, $PR^{16}_2$ groups, and $SR^{16}$ groups, and wherein every $R^{16}$ is independently selected from the group consisting of $CH_3$, $C_2H_5$, and $C_3H_9$. In some embodiments relating to formula V, the center and right monomers can correspond to mixed cyclic compounds with at least one E being Si and at least one E being Ge. For these embodiments with mixed cycles, the formula can be denoted with V' and the E replaced with F.

In another embodiment, the monomers for polymerization reaction are selected from the group of compounds represented by formula V, formula V

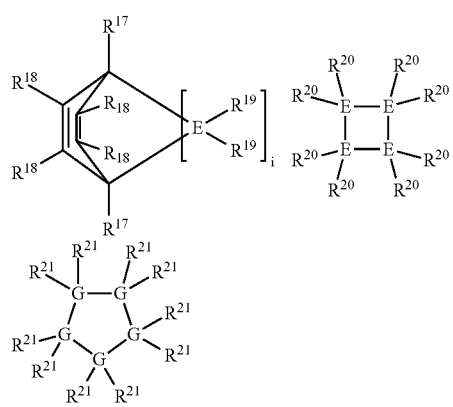

wherein E is Si, every $R^{17}$ is a hydrogen or phenyl group, $R^{18}$ is a hydrogen, every $R^{19}$ is independently selected from the group consisting of $CH_2CH=CH_2$, $CH_2CH=CHCH_3$, pyridyl, pyrimidyl, pyrazyl, pyridazyl, triazyl, furyl, thiophenyl, thiazolyl, quinolinyl, isoquinolinyl, benzofuranyl, isobenzofuranyl, benzothiophenyl, OMe, OEt, OPr, O$^i$Pr, and OBu groups, every $R^{20}$ is independently selected from the group consisting of pyridyl, pyrimidyl, pyrazyl, pyridazyl, triazyl, furyl, thiophenyl, thiazolyl, quinolinyl, isoquinolinyl, benzofuranyl, isobenzofuranyl, benzothiophenyl, $NMe_2$, $NEt_2$, $NPr_2$, and $N^iPr_2$ groups; every $R^{21}$ is independently selected from the group consisting of pyridyl, pyrimidyl, pyrazyl, pyridazyl, triazyl, furyl, thiophenyl, thiazolyl, quinolinyl, isoquinolinyl, benzofuranyl, isobenzofuranyl, benzothiophenyl, $NMe_2$, $NEt_2$, $NPr_2$, and $N^iPr_2$ groups.

In another embodiment, the polymerization is catalyzed by MeLi, BuLi, PhLi, MeMgBr, $Me_2Mg$, allyl-MgBr, NaH, $LiAlH_4$, $NaAlH_2(OCH_2CH_2OCH_3)_2$, $Ph_2MeSiLi$, $Ph_2MeSiNa$, $Ph_2MeSiK$, $Ph_3SiLi$, $Ph_3SiNa$, $Ph_3SiK$, $Bu_4NF$, HCl, HBr, HI, $HBF_4$, $HPF_6$, $HSbF_6$, $CF_3SO_3H$, and $CF_3(CO)H$.

In another embodiment, the polymerization is promoted by 15-crown-5, 18-crown-6, dibenzo-18-crown-6, cyclohexyl-18-crown-6, dimethoxyethane, hexamethylphosphoramide, diglyme, triglyme, tetraglyme, cryptand-221, or cryptand-222.

In another embodiment, the polymerization is carried out in toluene, dimethoxyethane, or tetrahydrofurane solvent.

In another embodiment, the source of hydride is LiH, NaH, KH, $LiAlH_4$, $NaBH_4$, or $NaAlH_2(OCH_2CH_2OCH_3)_2$.

In another embodiment, the reaction with the source of hydride is carried out in diethyl ether solvent or a mixture of diethyl ether and cyclohexane.

In another embodiment, the halogenation is driven by HCl, HBr, or HI in combination with $AlCl_3$, $AlBr_3$, or $AlI_3$.

In another embodiment, the halogenation is carried out in cyclohexane solvent.

In some embodiments, the polymerization is carried out at a temperature of from −80 DEG C. to +180 DEG C., further embodiments from −50 DEG C. to +80 DEG C., in other embodiments from −30 DEG C. to +30 DEG C.

In another embodiment, the reaction with the source of hydride is carried out at a temperature of from −60 DEG C. to +100 DEG C., in other embodiments from −40 DEG C. to +50 DEG C., in further embodiments from −20 DEG C. to +20 DEG C.

In some embodiments, the halogenation is carried out at a temperature of from −60 DEG C. to +100 DEG C., in further embodiments from −30 DEG C. to +50 DEG C., and in other embodiments from −10 DEG C. to +30 DEG C.

Ring-opening polymerization of monocyclic compounds of formula V is described in Japanese Laid-Open Patent Publication No. H05-230219 to Hiyama et al. (1993), incorporated herein by reference, (E=Si and $R^{20}$ or $R^{21}$=H, alkyl, aryl, alkenyl, alkynyl, alkoxy, silyl, or halogen) and in JP 5-163355 to Shimoda et al. (1993), incorporated herein by reference, (E=Ge and $R^{20}$ or $R^{21}$=H, alkyl, aryl). Detailed examples of polymerization of $Si_5Me_9Ph$, $Si_4Cl_8$, $Si_4(OMe)_8$, and $Si_4Me_4Ph_4$ monocyclic monomers of formula V are disclosed in JP 5-170913 to Suzuki et al. (1993), Suzuki et al., "Synthesis of Sequence-Ordered Polysilane by Anionic Ring-Opening Polymerization of Phenylnonamethylcyclopentasilane," *Macromolecules,* 27: 2360-2363 (1994), "Anionic ring-opening polymerization of cyclopolysilanes," *Polymer Preprints,* 31(1): 46-47 (1990), Matyjaszewski et al., "Anionic ring-opening polymerization of cyclotetrasilanes," *Makromolekulare Chemie, Macromolecular Symposia,* 42/43, 269-280 (1991), Koe et al., "Heteroatom Polysilylenes," *Silicon Chemistry,* 1: 77-87 (2002), all of which are incorporated herein by reference. The prior examples of polymerization of polycyclic monomers of formula V include monomers in which $R^{19}$ is hydrogen, $NBu_2$, alkyl, or aryl and are disclosed in JP 3-091537 to Sakurai et al. (1991), Sakurai et al., "Stereoselective Anionic Polymerization of Amino-Substituted Masked Disilenes," *Organometallics,* 24: 4119-4121 (2005), JP 1-230638 to Sakurai (1989), JP 2-235934 to Sakurai (1990), and JP 63-234033 to Takeda et al. (1988), all of which are incorporated herein by reference. The present disclosure substantially expands the scope of polymers, method of making such polymers and the ability to use suitable polymers in a wider range of applications not previously possible due to limitations in the polymer properties.

An Exemplary Method of Forming Functional Films and Bodies

In other embodiments, methods relate to making films of conductor, semiconductor, or dielectric, made of functional materials comprising silicon, germanium, silicon-germanium alloy, silicon oxide, germanium oxide, mixed silicon-germanium oxide, silicon nitride, germanium nitride, and mixed silicon-germanium nitride. The materials are optionally doped with B, P, Sb, As, or other doping additives conventionally used in manufacturing of semiconductors. The films can be made in a controlled atmosphere by (a) applying a polyperhydrosilane or polyperhydrogermane liquid composition onto a substrate to form an applied film (optionally, with simultaneous or subsequent UV irradiation); (b) heating the applied film sufficiently to form an amorphous, hydrogenated film (performed in an optional presence of additives for conversion); (c) and annealing by heating and/or irradiating the amorphous, hydrogenated film sufficiently to at least partially crystallize and/or reduce a hydrogen content of the product. The term "film" refers to a variety of shapes of film, and a multitude of such films may be deposited on a single substrate in a variety of patterns and forms of predetermined dimensions forming complex bodies. The controlled atmosphere comprises gases selected from the group consisting of $N_2$, He, Ar, Xe, Kr, or mixture thereof. The additives for conversion can comprise, for example, $H_2$ for making Si and Ge; air, $O_2$, or $O_3$ for making the oxides; and $NH_3$ or $N_2H_6$ for making the nitrides. The liquid composition comprises the perhydrosilane polymer, perhydrogermane polymers, copolymers thereof, or a mixture of these polymers, or a solution of these polymers in a solvent. The liquid composition further optionally comprises a surface-tension adjusting material and/or a doping material containing Group 13 element or Group 15 element of the Periodic Table of Elements.

The solvent for the liquid composition can be one that effectively does not react with polyperhydrosilane or polyperhydrogermane and easily evaporates from the applied film without leaving behind contaminations. The solvent is selected, for example, from aliphatic and aromatic hydrocarbons, halogenated hydrocarbons, ethers, polyethers, and mixtures thereof. Specific examples of the solvent include n-hexane, n-heptane, n-octane, n-decane, cyclohexane, cycloheptane, cyclooctane, cis-decahydronaphthalene, trans-decahydronaphthalene, dicyclopentane, benzene, toluene, xylene, durene, indene, tetrahydronaphtalene, decahydronaphtalene, cyclohexylbenzene, squalene, diethyl ether, dipropyl ether, tetrahydrofurane, tetrahydropyrane, 1,2-dimethoxyethane, bis(2-methoxyethyle)ether, p-dioxane, ethylene glycol dimethyl ether, ethylene glycol diethyl ether, ethylene glycol methyl ethyl ether, diethylene glycol dimethyl ether, diethylene glycol diethyl ether, diethylene glycol methyl ethyl ether, methylene chloride, and chloroform. In some embodiments, the solvent is selected from $C_6$-$C_{16}$ linear alkanes, cycloalkanes, polycycloalkanes, and polycycloaromatic hydrocarbons. In other embodiments, the solvent is selected from n-hexane, n-heptane, cyclohexane, cycloheptane, cyclooctane, cis-decahydronaphthalene, trans-decahydronaphthalene, tetrahydronaphthalene, and mixtures thereof.

In some embodiments, the liquid composition further comprises an optional surfactant (surface tension modifier), such as a fluorine type or a nonionic type. The surfactant improves wettability of the substrate by the liquid composition and uniformity of the applied film. The surfactant can be added in a trace amount within a range which does not impair required functions. The amount of the surfactant to achieve the desired surface tension is generally 10 parts or less by weight, particularly preferably 0.01 to 5 parts by weight based on 100 parts by weight of the total weight of the composition. In some embodiments, the surface tension of the liquid composition is in a range of 20 to 70 dyn/cm. The surface tension of less than 20 dyn/cm increases wettability of the liquid composition to a nozzle surface of an inkjet printer, adversely effecting directional precision of a droplet discharge. The surface tension exceeding 70 dyn/cm causes an unstable meniscus shape of the liquid at the nozzle tip, resulting in poor control of the volume and timing of the discharge.

Examples of the fluorinated surfactants include EFFTOP EF301™, EFFTOP EF303™, and EFFTOP EF352™ (made by Shin Akita Kasei K.K.); MEGAFACK F171™ and MEGAFACK F173™ (made by Dainippon Ink and Chemicals); Asahi GUARD AG710™, (made by Asahi Glass Co., Ltd.); FLUORAD FC-170C, FLUORAD FC430, and FLUORAD FC431™ (made by Sumitomo 3M Limited); SURFLON S-382 SURFLON SC101™, SURFLON SC102™, SURFLON SC103™, SURFLON SC104 ™, SURFLON SC105™, and SURFLON SC106™ (made by Asahi Glass Co., Ltd.); BM-1000™ and BM-1100™ (made by B. M.-Chemie); and SCHSEGO-FLUOR™ (made by Schwegmann).

The nonionic surfactants include polyethers terminated with fluoroalkyl groups or hydrocarbyl groups. Preferred fluoroalkyl-terminated nonionic surfactants include $C_9F_{19}CONHC_{12}H_{25}$, $C_8F_{17}SO_2NH$—$(C_2H_4O)_6H$, $C_9F_{17}O$-(PLURONIC L-35)-$C_9F_{17}$, $C_9F_{17}O$-(PLURONIC P-84)-$C_9F_{17}$, and $C_9F_{17}O$-(TETRONIC-704)-$C_9F_{17}$, wherein PLURONIC L-35™ is a polyoxypropylene-polyoxyethylene block copolymer having an average molecular weight of 1,900 (made by Asahi Denka Kogyo K.K.), PLURONIC P-84™ is a polyoxypropylene-polyoxyethylene block copolymer having an average molecular weight of 4,200 (made by Asahi Denka Kogyo K.K.), and TETRONIC-704™ is an N,N,N',N'-tetrakis(polyoxypropylene-polyoxyethylene) block copolymer having an average molecular weight of 5,000 (made by Asahi Denka Kogyo K.K.). The hydrocarbyl-terminated nonionic surfactants include polyoxyethylene alkyl ethers, polyoxyethylene allyl ether, polyoxyethylene alkylphenol ethers, polyoxyethylene fatty acid esters, sorbitan fatty acid esters, polyoxyethylene sorbitan fatty acid ethers, and oxyethylene-oxypropylene block copolymers. Preferred hydrocarbyl-terminated nonionic surfactants include EMULGEN 105™, EMULGEN 430™, EMULGEN 810™, EMULGEN 920™, RHEODOL SP-40S™, RHEODOL TW-L120™, EMANOL 3199™, EMANOL 4110™, EXCEL P-40S™, BRIDGE 30™, BRIDGE 52™, BRIDGE 72™, BRIDGE 92™, ARLACEL 20™, EMASOL 320™, TWIN 20™, TWIN 60™, MERGE 45™ (made by Kao Corporation), NONIBOL 55™ (made by Sanyo Chemical Industries, Ltd.), CHEMISTAT 2500™ (made by Sanyo Chemical Industries, Ltd.), SN-EX9228™ (made by San Nopco Limited), and NONAL 530™ (made by Toho Chemical Industry Co., Ltd.)

The liquid composition can be handled and applied onto a substrate in the atmosphere containing substantially no oxidizing substance such as $O_2$ or $CO_2$. Specifically, the atmosphere can be $N_2$, He, Ar, Xe, Kr, or mixture thereof in the optional presence of $H_2$. In some embodiments, the atmosphere is $N_2$ or Ar, in the optional presence of $H_2$.

The liquid composition can be applied to the substrate to a thickness of 0.005 to 10 micrometers, in some embodiments 0.01 to 5 micrometers, and in further embodiments 0.02 to 1 micrometers. Film layers thicker than 5 micrometer are often susceptible to cracking upon drying. The overall thickness of the film may be increased by repeating the film forming process several times. When the composition comprises a solvent, it should be understood that the thickness is a value obtained after the removal of the solvent. The deposition of films is performed by suitable means such as spray coating, roll coating, curtain coating, spin coating, dip coating, spray coating, slit coating, extrusion coating, meniscus coating, drop casting, screen printing, offset printing, ink jet printing, gravure printing, or flexographic printing.

In one aspect, the liquid composition is irradiated at least once during or shortly after deposition onto the substrate. The source of radiation can comprise, for example, a low-pressure or high-pressure mercury lamp, deuterium lamp, discharge lamp of rare gas such as argon, krypton, or xenon, YAG laser, $CO_2$ laser, or excimer laser such as $F_2$ laser, $Cl_2$ laser, argon laser, krypton laser, xenon laser, XeF laser, XeCl laser, XeBr laser, KrF laser, KrCl laser, ArF laser, or ArCl laser. A suitable light output is 10 to 5,000 W. In general, an output of 100 to 1,000 W suffices. The wavelength of radiation is not particularly limited as long as radiation is somewhat absorbed by the polymer; although 120 to 500 nm generally is suitable. While I do not wish to be bound by speculations about the role of irradiation, I believe that irradiation fixes molecules of the polymer to the substrate and/or to each other by scission of E-H bonds of the polymer, formation of new E-E bonds, and substantial solidification of the polymer. To an extent, irradiation prevents beading up of the liquid polymer and shrinking of the applied body, preserves the intended shape of the applied body, improves uniformity of a subsequently formed body and adhesion of the body to the substrate.

The irradiation step can be also carried out in the atmosphere of $N_2$, He, Ar, Xe, Kr, or mixture thereof in the optional presence of $H_2$. In some embodiments, the atmosphere is $N_2$ or Ar, in the optional presence of $H_2$.

The substrate, on which the film is formed, is not particularly limited. The substrate may have a flat surface or uneven surface with a level difference and is not limited to a particular surface. When the thermal and chemical treatment of the coated film is carried out by heating or exposure to air, $H_2$, $O_2$, $O_3$, $NH_3$, or $N_2H_6$, the material of the substrate generally is selected to withstand the treatment conditions. The substrate can be made from, for example, glass, metal, plastic, or ceramic. The electrically conductive substrates may have an optional dielectric layer such as a layer of the corresponding oxide thereon. Examples of generally suitable glass include, for example, quartz glass, borosilicate glass, soda glass, lead glass, and lanthanum-based glass. Examples of generally suitable metal include, for example, gold, silver, copper, nickel, silicon, iron, titanium, aluminum, tungsten, and stainless steel. Examples of generally suitable plastic include, for example, polyimide, polyether sulfone, norbornene-based ring-open polymers, and hydrides thereof. Examples of generally sutiableceramic include, for example, transparent electrodes such as ITO. The shape of the substrate is not particularly limited; preferably block-like, plate-like, disk-like, foil-like, or film-like coating on another substrate.

The heating, that follows the deposition step and yields the amorphous, hydrogenated film, generally comprises two steps (a) a soft curing and (b) a hard curing. The soft curing serves the purpose of removing the solvent in a temperature regime, where solvent decomposition via pyrolysis and reactions with polyperhydrosilane or polyperhydrogermane are negligible. The soft curing step also serves the purpose of removing most of the solvent before hard curing to keep the tool for hard curing (oven, furnace, etc.) mostly free of carbon contaminations. The hard curing step serves the purpose of converting the polyperhydrosilane or polyperhydrogermane polymer into the amorphous hydrogenated film. The curing conditions may be appropriately determined by the boiling point and the vapor pressure of the solvent and thermal behavior of the polymer and the amorphous film, without particular limitation. The soft curing is generally carried out at a temperature of $\leq 200$ DEG C., in further embodiments $\leq 150$ DEG C., in other embodiments $\leq 120$ DEG C. or any temperature range within these explicit ranges, sufficient to remove most of volatile components (e.g., solvent, volatile silane compounds, etc.) and/or to further solidify the applied film. The exposure time for soft curing can be 0.01 to 30 minutes or in further embodiments 0.1 to 10 minutes, or any subranges within these ranges. The hard curing can be performed at a temperature of $\leq 700$ DEG C., in some embodiments $\leq 600$ DEG C., in further embodiments $\leq 450$ DEG C. or any temperature range within these ranges, sufficiently to form a hydrogenated, amorphous film film. The exposure time for hard curing can be 1 to 600 minutes or in further embodiments 10 to 120 minutes. In general, when the temperature is lower than 300 DEG C., thermal decomposition of the polymer does not proceed to completion, and a substantial amount of hydrogen is left in the film. At a temperature of about 550 DEG C. or less, hydrogen loss is more complete, and the amorphous hydrogenated film is formed with $\leq 0.5\%$ hydrogen by weight.

Separation of the heating step into the two step procedure (the soft and hard cure), however, is not mandatory. Single step treatment at a constant temperature of $\leq 700$ DEG C. or a gradually increasing temperature from 20 DEG C. to $\leq 700$ DEG C. also furnishes suitable hydrogenated, amorphous film.

To form the silicon or germanium film, the soft curing and hard curing are carried out in the atmosphere of $N_2$, He, Ar, Xe, Kr, or mixture thereof in the optional presence of $H_2$. In some embodiments, the atmosphere is $N_2$ or Ar, in the optional presence of $H_2$. In an aspect, the formed silicon or germanium film is subsequently doped, e.g., by conventional ion implantation or other doping technique such as ion showering or use of conventional spin-on-dopants (and optionally, subsequent annealing). In another aspect, the doped silicon or germanium film is formed by utilizing the liquid composition containing at least one optional doping additive in an amount sufficient to provide a predetermined doping level or concentration and/or electrical characteristics in the electrically active film within a predetermined range of values. The doping additives comprise materials containing Group 13 or Group 15 element of the Periodic Table of Elements. When the doping additive contains Group 13 element (e. g. B), the formed semiconductor becomes a p type semiconductor. When the doping additive contains Group 15 element (e. g. As, P, or Sb), the formed semiconductor becomes a n type semiconductor. Suitable doping additives comprise compounds of the formula $D_xR^{26}_y$, where D is Sb, As, P, or B; x is from 1 to 20; y is an integer corresponding to the number of binding sites available on the x instances of D, or y is from 0 to 26; each of the y instances of $R^{26}$ is independently H, hydrocarbyl, or $ER^{23}$, where E is Si or Ge, $R^{27}$ is hydrogen, hydrocarbyl, or $E_zH_{2z+1}$, where z is from 1 to 6. In alternative embodiments, the doping additives are $H_2D(^tBu)$, $HD(^tBu)_2$, $D(^tBu)_3$, $D(SiH_3)_3$, $D(Si_2H_7)_3$, $HD(Si_2H_7)_2$, $D(Si_3H_{10})_3$, $HD(Si_3H_{10})_2$, $H_2D(Si_3H_{10})$, $D(Si_4H_{13})_3$, $HD(Si_4H_{13})_2$, $H_2D(Si_4H_{13})$, $B_{10}H_{14}$ hydride, elemental boron, elemental phosphorus, elemental arsenic, or elemental antimony. The content of the doping additive in the liquid composition is 50 or less parts by weight, preferably 0.00001 to 20 parts by weight, particularly preferably 0.001 to 10 parts by weight based on 100 parts by weight of the total weight of the composition.

To form the silicon oxide or germanium oxide film, the soft curing and hard curing are carried out in the atmosphere of $N_2$, He, Ar, Xe, Kr, or mixture thereof in the presence of air, $O_2$, and/or $O_3$. In some embodiments, the soft curing is carried out in the atmosphere of Ar in the presence of 0.01 to 5% of $O_2$, and the hard curing is carried out in air or in the atmosphere of Ar in the presence of 5 to 50% of $O_2$.

To form the silicon nitride or germanium nitride film the soft curing and hard curing are carried out in the atmosphere of $N_2$, He, Ar, Xe, Kr, or mixture thereof in the presence of $NH_3$ or $N_2H_6$. In some embodiments, the soft curing and hard are carried out in the atmosphere of $N_2$ in the presence of 0.01 to 100% of $NH_3$, in further embodiments in the presence of 5 to 50% of $NH_3$.

To obtain the most commercially valuable electrical activity and/or characteristics, the amorphous, hydrogenated film can be further heated in a furnace and/or irradiating with a dose of laser radiation sufficient to partly or substantially anneal and crystallize the hydrogenated, amorphous material, and to reduce the hydrogen content of the product. The annealing and crystallization by heating can be done at 600 to 1,200 DEG C., in further embodiments from 700 to 1100 DEG C., and in additional embodiments from 800 to 1000 DEG C. The use of laser radiation for annealing and crystallization can be desirable in some embodiments. The radiation source and the wavelength may be the same as described above. The atmosphere for the annealing and crystallization can comprise, for example, $N_2$, He, Ar, Xe, Kr, or mixture thereof. In many cases, such crystallization may also activate at least some of an added dopant, if a dopant is present.

The films formed as described herein may contain an impurity such as carbon and hydrogen in quantities that do not impair the object of the present invention.

The methods described herein generally are capable of forming films regardless of the area or shape of the substrate. The films may be made of substantially pure materials or materials doped with predetermined amounts of B, P, As, or Sb. In some embodiments, the materials comprise silicon, germanium, silicon-germanium alloy, silicon oxide, germanium oxide, mixed silicon-germanium oxide, silicon nitride, germanium nitride, and mixed silicon-germanium nitride. The methods described herein generally do not require an expensive device such as a vacuum device, thereby reducing manufacturing costs.

Advantages

From the description above, a number of advantages of certain embodiments become evident.
  (a) Introduction of the cross-linking element to the structure of polyperhydrosilanes and polyperhydrogermanes allows selection over a wider range for many physical properties (such as solubility, viscosity, volatility, surface tension, etc.) and to tune such properties to predetermined specification of the deposition.
  (b) The use of the dehalogenative coupling or dehydrocoupling in conjunction with the cross-linkable monomers provides improved control over the structure of the polymer (e. g., the length of the chains, the degree of cross-linking, the number of chains per molecule, and the proportion of silicon atoms to germanium atoms in the chains) and, therefore, allows tailoring of the physical properties of the product.
  (c) The use of monomers represented by formula V will allow to obtain linear polyperhydrosilanes and polyperhydrogermanes of a substantially higher molecular weight than those available by methods of the prior art. Thus, HMW polymers can be synthesized without the necessity of cross-linking.
  (d) With the use of the halogenation reaction and/or reaction with the source of hydride one can modify the substituents on Si and/or Ge atoms of the cross-linked and linear polymers without any substantial changes to the backbone of the polymer. Thus, the structure of the backbone is established in the polymerization step with the outcome permissible for the monomers with one type of substituents, but the final product can be furnished with hydride substituents and substantially the same backbone (even if this type of backbone could not be formed in a direct polymerization of hydride-substituted monomers and/or even if suitable hydride-substituted monomers could not be provided).
  (e) The conversion of the deposited liquid material provides a variety of solid materials, such as elemental silicon or germanium, and silicon or germanium oxide or nitride, which can be used as semiconductor, conductor, or dielectric material in manufacturing of electronic devices and photosensitive members.

The following non-limiting examples are illustrative of the methods and compositions described herein. It should be noted that various changes could be made in the specific embodiments herein without departing from the scope of the present invention. For this reason, it is intended that the examples of the present application should be interpreted as being illustrative and not limiting in any sense. All of the references cited herein are incorporated by reference for the specific issue raised as well as in their entirety to the extent that they are not inconsistent with the specific disclosure herein.

PROPHETIC EXAMPLES

General Procedures

All operations can be performed in a grease-free Schlenk-type glassware on dual-manifold Schlenk line or in an argon-filled glovebox. The glassware can be dried at 160 DEG C. in an oven before use. The solvents can be purified and dried by standard techniques. Hydrocarbon solvents and ethers can be passed through a column of activated alumina followed by distillation over sodium metal in an atmosphere of dry argon (or in vacuum, for high temperature boiling solvents). For most applications, alcohols are purified by fractional distillation. For rigorously anhydrous applications, alcohols can be dried over sodium sulfate and distilled over sodium metal in an atmosphere of dry argon. Diglyme can be dried over sodium and used without further purification. $LiAlH_4$ can be purified by recrystallization from a mixture of $Et_2O$ and hexanes. Ultrasound experiments can be performed using a Heat Systems model W-380 variable output probe sonicator with a ¼ inch tapped horn and a ¼ inch half wave extender tip. A glass tube (25 mm O.D.) with an O-ring male joint can be used to connect the reaction flask to a Suslick collar 43 allowing for inert atmosphere sonication.

Note that most of the silicon and germanium compounds described are sensitive to light. Whenever possible the operations are performed in low light conditions. The flasks and storage vessels can be made of amber glass and protected from light by aluminum foil.

Example 1

Synthesis of polyphenylsilane from $Ph_2SiBr_2$ and $Br_2PhSi—SiPh_2-SiPhBr_2$ at 65 DEG C. In a glovebox, a 1 L Schlenk flask is loaded with 215 mmol of Na metal and 100 mL of toluene. The mixture is heated to reflux and stirred to produce a fine suspension of Na in toluene. The suspension is chilled to room temperature and transferred to an addition funnel. A 1 L Schlenk flask is loaded with 95 mmol of $Ph_2SiBr_2$, 5 mmol of $Br_2PhSi—SiPh_2-SiPhBr_2$, 10 mL of diglyme, and 100 mL of toluene ($Br_2PhSi—SiPh_2-SiPhBr_2$ is synthesized as described by Hassler et al., "Synthese einiger Phenylbrom-und Phenyliod-disilane und-trisilane," *J. Organomet. Chem.*, 385: 201-206 (1990)), incorporated herein by reference. The temperature of the mixture is brought to 65 DEG C. and a suspension of Na in toluene is added slowly over a period of 10 minutes. After the addition of the monomer, the mixture is stirred at 65 DEG C. for 4-5 h and allowed to cool to room temperature and stirred overnight. Isopropanol is added (30 mL) and the mixture is stirred for 1 hour to quench unreacted sodium. The polymer is precipitated with 500 mL of isopropanol. The solid is filtered out, dried in vacuum, and extracted into 500 mL of warm (40 DEG C.) toluene. The toluene solution is washed with water and filtered through Celite. The solvent is removed in vacuum, and the product is dried in vacuum at 80 DEG C.

Example 2

Synthesis of polyphenylsilane from $Ph_2SiBr_2$ and $Br_2PhSi—SiPh_2-SiPhBr_2$ using ultrasonic activation In a glovebox, a 1 L Schlenk flask equipped with a sonicator probe is loaded with 215 mmol of Na metal and 100 mL of toluene.

The mixture is sonicated at maximum output without cooling. After approximately 10 min, a fine dispersion is produced. The suspension is chilled to room temperature and transferred to an addition funnel. A 1 L Schlenk flask equipped with a sonicator probe is loaded with 95 mmol of $Ph_2SiBr_2$, 5 mmol of $Br_2PhSi$—$SiPh_2$-$SiPhBr_2$, 10 mL of diglyme, and 100 mL of toluene ($Br_2PhSi$—$SiPh_2$-$SiPhBr_2$ is synthesized as described by Hassler et al., "Synthese einiger Phenylbrom- und Phenyliod-disilane und-trisilane," *J. Organomet. Chem.*, 385: 201-206 (1990)), incorporated herein by reference. The flask is cooled in an ice bath and sonicated at 60% of maximum output (resulting in a reaction temperature of ca. 25 DEG C.). A suspension of Na in toluene is added slowly over a period of 10 minutes. After the addition is complete, the mixture is sonicated for an additional 45 min and quenched with 30 mL of isopropanol by stirring for 1 hour. The polymer is precipitated with 500 mL of isopropanol. The solid is filtered out, dried in vacuum, and extracted into 500 mL of warm (40 DEG C.) toluene. The toluene solution is washed with water and filtered through Celite. The solvent is removed in vacuum, and the product is dried in vacuum at 80 DEG C.

Example 3

Synthesis of polyphenylsilane from $Ph_2SiBr_2$ and $Br_2PhSi$—$SiPh_2$-$SiPhBr_2$ using electroreduction In a glovebox, a 1 L undivided electrochemical cell with Mg rod anode and cathode and a sonicator probe is loaded with 20 mmol of $NH_4ClO_4$, 95 mmol of $Ph_2SiBr_2$, 5 mmol of $Br_2PhSi$—$SiPh_2$-$SiPhBr_2$, and 100 mL of dimethoxyethane ($Br_2PhSi$—$SiPh_2$-$SiPhBr_2$ is synthesized as described by Hassler et al., "Synthese einiger Phenylbrom-und Phenyliod-disilane und-trisilane," *J. Organomet. Chem.*, 385: 201-206 (1990)), incorporated herein by reference. Electroreduction is carried out by passing 0.21 F of electricity through the solution over a period of 3 h. The anode and cathode are alternated at an interval of 15 s, and sonication is applied continuously. The polymer is precipitated with 500 mL of isopropanol. The solid is filtered out, dried in vacuum, and extracted into 500 mL of warm (40 DEG C.) toluene. The toluene solution is washed with water and filtered through Celite. The solvent is removed in vacuum, and the product is dried in vacuum at 80 DEG C.

Example 4

Synthesis of polyphenylsilane from $Ph_2SiBr_2$ and $Br_2PhSi$—$SiPh_2$-$SiPhBr_2$ utilizing 15-crown-5, 18-crown-6, dibenzo-18-crown-6, cyclohexyl-18-crown-6, dimethoxyethane, hexamethylphosphoramide, diglyme, triglyme, tetraglyme, cryptand-221, or cryptand-222 in place of diglyme The same procedures as described for the synthesis of polyphenylsilane by reaction at 65 DEG C. or using ultrasonic activation are applied. 15-crown-5, 18-crown-6, dibenzo-18-crown-6, cyclohexyl-18-crown-6, dimethoxyethane, hexamethylphosphoramide, diglyme, triglyme, tetraglyme, cryptand-221, or cryptand-222 is used in place of diglyme.

Example 5

Synthesis of polyphenylsilane from $Ph_2SiBr_2$ and $Br_2PhSi$—$SiPh_2$-$SiPhBr_2$ by using electroreduction The same procedures as described for the synthesis of polyphenylsilane with Mg electrodes are used with Ca, Sr, or Al electrodes.

Example 6

Synthesis of polyarylsilane from $Ph_2SiBr_2$ and $Ph_2BrSi$—$SiBr(p-Tol)$—$SiBrPh_2$ at 65 DEG C. or using ultrasonic activation, or using electroreduction The same procedures as described for the synthesis of polyphenylsilane from $Ph_2SiBr_2$ and $Br_2PhSi$—$SiPh_2$-$SiPhBr_2$ are used with $Ph_2SiBr_2$ and $Ph_2BrSi$—$SiBr(p-Tol)$—$SiBrPh_2$. The trisilane monomer is synthesized as described by Hassler et al., "Synthese und Eigenschaften chlorierter und bromierter Aryltrisilane und Aryltetrasilane," *J. Organomet. Chem.*, 538 (1-2): 135-144 (1997), incorporated herein by reference.

Example 7

Synthesis of polyphenylsilane from $Ph_2SiI_2$ and $I_2PhSi$—$SiPh_2$-$SiPhI_2$ at 65 DEG C., or using ultrasonic activation, or using electroreduction The same procedures as described for the synthesis of polyphenylsilane from $Ph_2SiBr_2$ and $Br_2PhSi$—$SiPh_2$-$SiPhBr_2$ are used with $Ph_2SiI_2$ and $I_2PhSi$—$SiPh_2$-$SiPhI_2$ in place of $Ph_2SiBr_2$ and $Br_2PhSi$—$SiPh_2$-$SiPhBr_2$. The trisilane monomer is synthesized as described by Hassler et al., "Synthese einiger Phenylbrom-und Phenyliod-disilane und-trisilane," *J. Organomet. Chem.*, 385: 201-206 (1990), incorporated herein by reference.

Example 8

Synthesis of polyarylsilane from a mixture of $Ph_2SiCl_2$ with $PhCl_2Si$—$SiClPh$-$SiPh_3$, $PhCl_2Si$—$SiClPh$-$SiClPh_2$, $PhCl_2Si$—$SiPh_2$-$SiClPh_2$, $Ph_2ClSi$—$SiCl(p-Tol)SiClPh_2$, or $PhCl_2Si$—$SiPh_2$-$SiClPh_2$ at 65 DEG C. or using ultrasonic activation. or using electroreduction The same procedures as described for the synthesis of polyphenylsilane from $Ph_2SiBr_2$ and $Br_2PhSi$—$SiPh_2$-$SiPhBr_2$ are used with a mixture of $Ph_2SiCl_2$ with $PhCl_2Si$—$SiClPh$-$SiPh_3$, $PhCl_2Si$—$SiClPh$-$SiClPh_2$, $PhCl_2Si$—$SiPh_2$-$SiClPh_2$, $Ph_2ClSi$—$SiCl(p-Tol)SiClPh_2$, or $PhCl_2Si$—$SiPh_2$-$SiClPh_2$ in place of $Ph_2SiBr_2$ and $Br_2PhSi$—$SiPh_2$-$SiPhBr_2$. The trisilane monomers are synthesized as described by Hassler et al., "Synthese und Eigenschaften chlorierter und bromierter Aryltrisilane und Aryltetrasilane," *J. Organomet. Chem.*, 538 (1-2): 135-144 (1997), incorporated herein by reference.

Example 9

Synthesis of polyarylsilane from a mixture of $Ph_2SiF_2$ with $(FPh_2Si)_2SiF(p-Tol)$. $(p-TolF_2Si)_2SiPh_2$, $F_2PhSi$-$Ph_2Si$—$SiFPh_2$, or $FPh_2Si$-$(p-Tol)_2Si$—$SiPh_2F$ at 65 DEG C., or using ultrasonic activation, or using electroreduction The same procedures as described for the synthesis of polyphenylsilane from $Ph_2SiBr_2$ and $Br_2PhSi$—$SiPh_2$-$SiPhBr_2$ are used with a mixture of $Ph_2SiF_2$ with $(FPh_2Si)_2SiF(p-Tol)$, $(p-TolF_2Si)_2SiPh_2$, $F_2PhSi$-$Ph_2Si$—$SiFPh_2$, or $FPh_2Si$-$(p-Tol)_2Si$—$SiPh_2F$ in place of $Ph_2SiBr_2$ and $Br_2PhSi$—$SiPh_2$-$SiPhBr_2$. The trisilane monomers are synthesized as described by Hassler et al., "Synthese und Eigenschaften partiell Si-fluorierter Aryltrisilane," *J. Organomet. Chem.*, 526: 157-167 (1996), incorporated herein by reference.

Example 10

Synthesis of polyarylsilane-germane from a mixture of $Ph_2GeCl_2$ with $PhCl_2Si$—$SiClPh$-$SiPh_3$, $PhCl_2Si$—$SiClPh$-$SiClPh_2$, $PhCl_2Si$—$SiPh_2$-$SiClPh_2$, $Ph_2ClSi$—$SiCl(p-Tol)SiClPh_2$, or $PhCl_2Si$—$SiPh_2$-$SiClPh_2$ at 65 DEG C., or using ultrasonic activation, or using electroreduction The same procedures as described for the synthesis of polyphenylsilane from Ph$_2$SiBr$_2$ and Br$_2$PhSi—SiPh$_2$-SiPhBr$_2$ are used with a mixture of Ph$_2$GeCl$_2$ with PhCl$_2$Si—SiClPh-SiPh$_3$, PhCl$_2$Si—SiClPh-SiClPh$_2$, PhCl$_2$Si—SiPh$_2$-SiClPh$_2$, Ph$_2$ClSi—SiCl(p-Tol)SiClPh$_2$, or PhCl$_2$Si—SiPh$_2$-SiClPh$_2$ in place of Ph$_2$SiBr$_2$ and Br$_2$PhSi—SiPh$_2$-SiPhBr$_2$. The trisilane monomers are synthesized as described by Hassler et al., "Synthese und Eigenschaften chlorierter und bromierter Aryltrisilane und Aryltetrasilane," *J. Organomet. Chem.*, 538 (1-2): 135-144 (1997), incorporated herein by reference.

Example 11

Synthesis of polyphenylsilane from PhSiH$_3$ catalyzed by CpCp*Zr(C$_6$H$_5$)$_2$ (where Cp* is C$_5$(CH$_3$)$_5$ pentamethylcyclopentadienyl) In a glovebox, a 1 L Schlenk flask is loaded with 200 mmol of PhSiH$_3$ and 1 mmol CpCp*Zr(C$_6$H$_5$)$_2$. The reaction mixture is attached to a vacuum line, stirred and heated to approximately 80 DEG C. for 5 minutes. The stirring is continued at room temperature under argon flow for 7 days. The reaction is accompanied by evolution of hydrogen gas and solidification of the reaction mixture. In air, the product is dissolved in 50 ml of toluene and 10 mL of methanol. The solution is passed through a column of 30 g Florisil (Aldrich, 100-200 mesh). The product is eluted from the column with additional 100 mL of toluene. The solvents are removed at room temperature in vacuum and the polyphenylsilane is further dried in vacuum at 80 DEG C. for two hours.

Example 12

Synthesis of polyphenylsilane from PhSiH$_3$ catalyzed by CpCp*ZrPh$_2$ synthesized in situ In a glovebox, a 1 L Schlenk flask is loaded with 1 mmol of CpCp*ZrCl$_2$ and 50 mL of tetrahydrofurane. Solution of 2 mmol of PhMgBr in tetrahydrofurane is added, and the mixture is stirred for 30 min at room temperature. The solvent is removed in vacuum. The flask is loaded with 200 mmol of PhSiH$_3$. The rest of procedures are as described for the synthesis of polyphenylsilane from PhSiH$_3$ catalyzed by CpCp*Zr(C$_6$H$_5$)$_2$.

Example 13

Synthesis of polyphenylsilane from PhSiH$_3$ catalyzed by CpCp*ZrH$_2$, Cp$_2$Ti(CH$_3$)$_2$, CpCp*$_2$Hf(OCH$_3$)$_2$, CP$_2$Zr(N(CH$_3$)$_2$)$_2$, CpCp*$_2$Ti(OC$_6$H$_5$)$_2$, or Cp$_2$Zr(C$_3$H$_7$)$_2$ The same procedures as described for the synthesis of polyphenylsilane from PhSiH$_3$ catalyzed by CpCp*Zr(C$_6$H$_5$)$_2$ are used for reactions catalyzed by CpCp*ZrH$_2$, Cp$_2$Ti(CH$_3$)$_2$, CpCp*$_2$Hf(OCH$_3$)$_2$, Cp$_2$Zr(N(CH$_3$)$_2$)$_2$, CpCp*$_2$Ti(OC$_6$H$_5$)$_2$, or Cp$_2$Zr(C$_3$H$_7$)$_2$.

Example 14

Synthesis of polyphenylsilane from PhSiH$_3$ catalyzed by CpCp*Zr(C$_4$H$_9$)$_2$ and B(C$_6$F$_5$)$_3$ In a glovebox, a 1 L Schlenk flask is loaded with 1 mmol of CpCp*ZrCl$_2$, 2 mmol of C$_4$H$_9$Li hexanes, and 50 mL of toluene. The mixture is stirred for 30 min at room temperature. 1 mmol of B(C$_6$F$_5$)$_3$ is added, and the solvent is removed in vacuum. The flask is loaded with 200 mmol of PhSiH$_3$. The rest of procedures are as described for the synthesis of polyphenylsilane from PhSiH$_3$ catalyzed by CpCp*Zr(C$_6$H$_5$)$_2$.

Example 15

Synthesis of polyphenylsilane from PhSiH$_3$ catalyzed by CpCp*ZrH$_2$, Cp$_2$Ti(CH$_3$)$_2$, CpCp*$_2$Hf(OCH$_3$)$_2$, CP$_2$Zr(N(CH$_3$)$_2$)$_2$, CpCp*$_2$Ti(OC$_6$H$_5$)$_2$, or Cp$_2$Zr(C$_3$H$_7$)$_2$ The same procedures as described for the synthesis of polyphenylsilane from PhSiH$_3$ catalyzed by CpCp*Zr(C$_6$H$_5$)$_2$ are used for reactions catalyzed by CpCp*ZrH$_2$, Cp$_2$Ti(CH$_3$)$_2$, CpCp*$_2$Hf(OCH$_3$)$_2$, Cp$_2$Zr(N(CH$_3$)$_2$)$_2$, CpCp*$_2$Ti(OC$_6$H$_5$)$_2$, or Cp$_2$Zr(C$_3$H$_7$)$_2$.

Example 16

Synthesis of polyarylsilanes and polyarylsilanes-germanes catalyzed by CpCp*Zr(C$_6$H$_5$)$_2$ In a glovebox, a 1 L Schlenk flask is loaded with 200 mmol of PhSiH$_3$, 1 mmol of CpCp*Zr(C$_6$H$_5$)$_2$, and 4 mmol of SiH$_3$SiPhHSiH$_3$, PhH$_2$GeSiH$_3$, SiH$_3$GePhHSiH$_3$, H$_3$SiSiPhHSiPhHSiH$_3$, or (PhH$_2$Si)$_2$SiH$_2$. The experimental procedures are same as described for the synthesis of polyphenylsilane from PhSiH$_3$ catalyzed by CpCp*Zr(C$_6$H$_5$)$_2$. The SiH$_3$SiPhHSiH$_3$, PhH$_2$GeSiH$_3$, and SiH$_3$GePhHSiH$_3$ monomers are synthesized as described by Fehér et al., "Beiträge zur Chemie des Siliziums und Germaniums XIV. Über die Umsetzung von Kaliumsilyl mit Phenylbromsilanen und Phenylbromgermanen Darstellung von Phenylsilylkalium," *Tetrahedron Lett.*, 51: 4443-4447 (1970), incorporated herein by reference. The H$_3$SiSiPhHSiPhHSiH$_3$ monomer is synthesized as described by Stüger, "Lineare Tetrasilane mit mittelständigen Substituenten-Oligosilane mit optischer Aktivität," *J. Organomet. Chem.*, 458(1-2) 1-7 (1993), incorporated herein by reference. The (PhH$_2$Si)$_2$SiH$_2$ monomer is synthesized as described by Hassler et al., "Verbesserte Synthesen von Phenyltrisilanen," *J. Organomet. Chem.*, 479(1-2): 193-196 (1994), incorporated herein by reference.

Example 17

Synthesis of polyaminosilane from (NEt$_2$)SiH$_3$ catalyzed by CpCp*Zr(C$_4$H$_9$)$_2$ In a glovebox, a 1 L Schlenk flask is loaded with 1 mmol of CpCp*ZrCl$_2$, 2 mmol of C$_4$H$_9$Li hexanes, and 50 mL of toluene. The mixture is stirred for 30 min at room temperature, and the solvent is removed in vacuum. The flask is loaded with 200 mmol of (NEt$_2$)SiH$_3$. The reaction mixture is attached to a vacuum line, stirred and heated to approximately 60 DEG C. for 5 minutes. The stirring is continued at room temperature under argon flow for 7 days. The reaction is accompanied by evolution of hydrogen gas and solidification of the reaction mixture. In a glovebox, the product is dissolved in 50 ml of dry toluene and treated with 20 mL of 3% HCl in dry methanol. The solution is passed through a column of 30 g Florisil (Aldrich, 100-200 mesh). The product is eluted from the column with additional 100 mL of dry toluene. The solvents are removed at room temperature in vacuum and the polyphenylsilane is further dried in vacuum at 60 DEG C. for two hours.

Example 18

Synthesis of polyethoxysilane from (EtO)SiH$_3$ catalyzed by CpCp*Zr(C$_4$H$_9$)$_2$ The same procedures as described for the synthesis of polyaminosilane from (NEt$_2$)SiH$_3$ are used for the synthesis with (EtO)SiH$_3$.

Example 19

Synthesis of polyaminosilane from (NEt$_2$)SiH$_3$ and SiH$_3$—Si(NEt$_2$)H—Si(NEt$_2$)H—SiH$_3$ or (Me$_3$Si)$_2$NSiH—SiH$_2$—SiN(Me$_3$Si)$_2$ In a glovebox, a 1 L Schlenk flask is loaded with 1 mmol of CpCp*ZrCl$_2$, 2 mmol of C$_4$H$_9$Li hexanes, and 50 mL of toluene. The mixture is stirred for 30 min at room temperature, and the solvent is removed in vacuum. The flask is loaded with 200 mmol of $(NEt_2)SiH_3$ and 4 mmol of $SiH_3$—$Si(NEt_2)H$—$Si(NEt_2)H$—$SiH_3$ or $(Me_3Si)_2NSiH$—$SiH_2$—$SiN(Me_3Si)_2$. The rest of experimental procedures are same as described for the synthesis with $(NEt_2)SiH_3$ catalyzed by $CpCp*Zr(C_4H_9)_2$. $SiH_3$—$Si(NEt_2)H$—$Si(NEt_2)H$—$SiH_3$ and $(Me_3Si)_2NSiH$—$SiH_2$—$SiN(Me_3Si)_2$ are synthesized as described by Stüger et al., "Aminoderivate hydrierter Oligosilane: Darstellung, Charakterisierung und Eigenschaften," Monatsh. Chem., 125(6/7): 615-622 (1994), incorporated herein by reference.

Example 20

Synthesis of polyperhydrosilane from polyaminosilane via reaction with $LiAlH_4$ In a glovebox, a 1 L Schlenk flask is loaded with 200 mL of dimethoxyethane and polyaminosilane synthesized from 200 mmol of $(NEt_2)SiH_3$. The mixture is chilled to approximately –10 DEG C. 60 ml of 1M $LiAlH_4$ solution in diethyl ether is added slowly over a period of 20 minutes, while the temperature of the reaction mixture is maintained at approximately –10 DEG C. The reaction mixture is slowly brought to room temperature and stirred for 2 hours at room temperature. The product is extracted with 200 mL of cyclohexane.
Purification of polyperhydrosilane The crude product solution in cyclohexane is concentrated in vacuum to about 20 ml, chilled to 10 DEG C., and treated for 2 minutes with 20 ml of cold degassed de-ionized water. The organic phase is separated and treated again with 20 ml of cold degassed de-ionized water. The organic phase is separated, filtered through a 0.2 µm membrane, and dried in vacuum for 2 hours in the dark to yield the final product.
Alternatively, crude product in cyclohexane is concentrated in vacuum to about 20 mL and treated for 10 minutes with 20 ml of cold degassed methanol. The cyclohexane-product phase is separated and treated again with 20 ml of cold degassed methanol. The cyclohexane-product phase is separated, filtered through a 0.2 µm membrane, and dried in vacuum for 2 hours in the dark to yield the final product.
Alternatively, crude product in cyclohexane is treated for 10 minutes with 20 ml of cold degassed methanol, filtered through a 0.2 µm membrane, and dried in vacuum for 2 hours in the dark to yield the final product.
Alternatively, crude product in cyclohexane is passed through a silica gel column (20 g of silica gel pretreated with 20 mL of water or methanol). The product is eluted with 100 mL of cyclohexane, and dried in vacuum for 2 hours in the dark to yield the final product.

Example 21

Synthesis of polyperhydrosilane from polyaminosilane via reaction with $NaAlH_2(OCH_2CH_2OCH_3)_2$ The same procedures as described for the synthesis and purification of polyperhydrosilane from polyaminosilane via reaction with $LiAlH_4$ are used to synthesize polyperhydrosilane from polyaminosilane via reaction with $NaAlH_2(OCH_2CH_2OCH_3)_2$ except that 120 mmol of $NaAlH_2(OCH_2CH_2OCH_3)_2$ in diethyl ether is used instead of 60 mmol of $LiAlH_4$.

Example 22

Synthesis of polyperhydrosilane from polyethoxysilane. The same procedures as described for the synthesis and purification of polyperhydrosilane from polyaminosilane are used to synthesize polyperhydrosilane from polyethoxysilane.

Example 23

Synthesis of polyperhydrosilane from polyphenylsilane via reaction with HCl. In a glovebox, a 1 L Schlenk flask is loaded with 200 mL of cyclohexane, 20 g of polyphenylsilane, and 2 mmol of freshly sublimed $AlCl_3$. The mixture is frozen in liquid nitrogen and put under dynamic vacuum. The valve on the flask is then closed, and the mixture is thawed out in static vacuum. The freeze-pump-thaw cycle is repeated 3 times. The flask is put in a cold water bath and back filled with HCl gas. The mixture is stirred vigorously for 4 hours under dynamic flow of HCl and for 2 hours under static atmosphere of HCl. The temperature is maintained at approximately 10 to 25 DEG C. The flask is then put under dynamic vacuum for 1 minute to remove most of HCl. The mixture is diluted with 50 mL of diethyl ether and chilled to approximately –10 DEG C. 60 ml of 1M $LiAlH_4$ solution in diethyl ether is added slowly over a period of 20 minutes, while the temperature of the reaction mixture is maintained at approximately –10 DEG C. The reaction mixture is slowly brought to room temperature and stirred for 2 hours at room temperature. The product is extracted with 200 mL of cyclohexane. The solution is concentrated in vacuum to about 20 ml, purified as described for the synthesis of polyperhydrosilane from polyaminosilane, and dried in vacuum for 2 hours in the dark to yield the final product.

Example 24

Synthesis of polyperhydrosilane-germane from polyphenylsilanes-germane In a glovebox, a 1 L Schlenk flask is loaded with 200 mL of cyclohexane, 2 mmol of freshly sublimed $AlCl_3$, and 20 g of polyphenylsilane-germane. The same procedures as described for the synthesis and purification of polyperhydrosilane from polyphenylsilane are used to synthesize polyperhydrosilane-germane from polyphenylsilane-germane. The polyphenylsilane-germane is produced as described in the synthesis of polyarylsilanes and polyarylsilanes-germanes catalyzed by $CpCp*Zr(C_6H_5)_2$.

Example 25

Synthesis of polyperhydrosilane from polyphenylsilane via reaction with $NaAlH_2(OCH_2CH_2OCH_3)_2$ The same procedures as described for the synthesis and purification of polyperhydrosilane from polyphenylsilane via reaction with $LiAlH_4$ are used to synthesize polyperhydrosilane from polyaminosilane via reaction with $NaAlH_2(OCH_2CH_2OCH_3)_2$ except that 120 mmol of $NaAlH_2(OCH_2CH_2OCH_3)_2$ in diethyl ether is used instead of 60 mmol of $LiAlH_4$.

Example 26

Synthesis of polyperhydrosilane from polyphenylsilane via reaction with HBr or HI In a glovebox, a 1 L Schlenk flask is loaded with 200 mL of cyclohexane, 20 g of polyphenylsilane, and 2 mmol of $AlCl_3$, $AlBr_3$, $AlI_3$, $MgCl_2$, or $FeCl_3$. The same procedures as described for the synthesis and purification of polyperhydrosilane from polyphenylsilane via reaction with HCl are used. HBr or HI is used instead of HCl.

Example 27

Synthesis of polyperhydrosilane from polyphenylsilane via reaction with $CH_3(C\!=\!O)Cl$ In a glovebox, a 1 L Schlenk flask is loaded with 200 mL of hexane, 20 g of polyphenylsilane, and 250 mmol of freshly sublimed $AlCl_3$. The flask is put in an ice bath. The mixture is stirred vigorously, and 250 mmol of $CH_3(C=O)Cl$ is added dropwise. The mixture is stirred for 4 hours at 0 DEG C. and for 12 hours at 25 DEG C. The upper layer is separated and the residue is extracted twice with 300 mL of cyclohexane. The mixture is concentrated in vacuum to approximately 200 mL, diluted with 50 mL of diethyl ether, and chilled to approximately −10 DEG C. 60 ml of 1M $LiAlH_4$ solution in diethyl ether is added slowly over a period of 20 minutes, while the temperature of the reaction mixture is maintained at approximately −10 DEG C. The reaction mixture is slowly brought to room temperature and stirred for 2 hours at room temperature. The product is extracted with 200 mL of cyclohexane. The solution is concentrated in vacuum to about 20 ml, purified as described for the synthesis of polyperhydrosilane from polyaminosilane, and dried in vacuum for 2 hours in the dark to yield the final product.

Example 28

Synthesis of polyperhydrosilane from polyphenylsilane via reaction with $CH_3(C=O)Br$ The same procedures as described for the synthesis and purification of polyperhydrosilane from polyphenylsilane via reaction with $CH_3(C=O)Cl$ are used. $CH_3(C=O)Br$ is used instead of $CH_3(C=O)Cl$. Optionally, $AlBr_3$ is used instead of $AlCl_3$.

Example 29

Synthesis of polyperhydrosilane from polyphenylsilane via reaction with $CF_3SO_3H$ In a glovebox, a 1 L Schlenk flask is loaded with 20 g of polyphenylsilane and 500 mL of toluene or dichloromethane. The reaction mixture is chilled to −30 DEG C., and 200 mmol of $CF_3SO_3H$ is added upon vigorous stirring. The mixture is stirred for 1 hour at −30 DEG C. The stirring is continued for 5 hours while the temperature is allowed to rise slowly to 25 DEG C. The mixture is diluted with 200 mL of n-octane, concentrated in vacuum to approximately 200 mL, and chilled to approximately −10 DEG C. 60 ml of 1M $LiAlH_4$ solution in diethyl ether is added slowly over a period of 20 minutes, while the temperature of the reaction mixture is maintained at approximately −10 DEG C. The reaction mixture is slowly brought to room temperature and stirred for 2 hours at room temperature. The product is extracted with 200 mL of cyclohexane. The solution is concentrated in vacuum to about 20 ml, purified as described for the synthesis of polyperhydrosilane from polyaminosilane, and dried in vacuum for 2 hours in the dark to yield the final product.

Example 30

Synthesis of polyperhydrosilane from polyphenylsilane via reaction with $CF_3SO_3H$ and LiF. In a glovebox, a 1 L Schlenk flask is loaded with 20 g of polyphenylsilane and 500 mL of toluene or dichloromethane. The reaction mixture is chilled to −30 DEG C., and 200 mmol of $CF_3SO_3H$ is added upon vigorous stirring. The mixture is stirred for 1 hour at −30 DEG C. The stirring is continued for 1 hour while the temperature is allowed to raise slowly to 25 DEG C. A slurry of 200 mmol of LiF in 500 mL of diethyl ether is added, and stirring is continued for 10 h at 25 DEG C. The mixture is diluted with 200 mL of n-octane, concentrated in vacuum to approximately 200 mL, and chilled to approximately −10 DEG C. 60 ml of 1M $LiAlH_4$ solution in diethyl ether is added slowly over a period of 20 minutes, while the temperature of the reaction mixture is maintained at approximately −10 DEG C. The reaction mixture is slowly brought to room temperature and stirred for 2 hours at room temperature. The product is extracted with 200 mL of cyclohexane. The solution is concentrated in vacuum to about 20 ml, purified as described for the synthesis of polyperhydrosilane from polyaminosilane, and dried in vacuum for 2 hours in the dark to yield the final product.

Example 31

Synthesis of polyperhydrosilane from polyphenylsilane via reaction with $CF_3SO_3H$ and LiCl. The same procedures as described for the synthesis and purification of polyperhydrosilane from polyphenylsilane via reaction with $CF_3SO_3H$ and LiCl are used except that LiCl is used instead of LiF.

Example 32

Synthesis of polyperhydrosilane from polyarylsilane, polyarylsilane-germane, polyaminosilane, or polyethoxysilane The same procedures as described for the synthesis and purification of polyperhydrosilane from polyphenylsilane are used to synthesize polyperhydrosilane from polyarylsilane, polyarylsilane-germane, polyaminosilane, or polyethoxysilane.

Example 33

Synthesis of polyperhydrosilane from cyclo-$Si_4Cl_8$. A 1 L Schlenk flask is loaded with 25 mmol of cyclo-$Si_4Cl_8$, 150 mL of cyclohexane, and a magnetic stirring bar (cyclo-$Si_4Cl_8$ is synthesized as described by Stüger et al., "UV/Vis-spektroskopische Untersuchungen an Cyclosilanderivaten," *Monatsh. Chem.*, 119: 873-888 (1988), incorporated herein by reference). The mixture is diluted with 50 mL of diethyl ether and chilled to approximately −10 DEG C. 60 ml of 1M $LiAlH_4$ solution in diethyl ether is added slowly over a period of 20 minutes, while the temperature of the reaction mixture is maintained at approximately −10 DEG C. The reaction mixture is slowly brought to room temperature and stirred for 2 hours at room temperature. The product is extracted with 200 mL of cyclohexane, concentrated, and purified by the same procedures as described for the synthesis of polyperhydrosilane from polyaminosilane.

Example 34

Synthesis of polyperhydrosilane from cyclo-$Si_4Br_8$, cyclo-$Si_4I_8$, or cyclo-$Si_4(OMe)_8$ The same procedure as described for the synthesis of polyperhydrosilane from cyclo-$Si_4Cl_8$ is utilized with cyclo-$Si_4Br_8$, cyclo-$Si_4I_8$, or cyclo-$Si_4(OMe)_8$ in place of $Si_4Cl_8$. Cyclo-$Si_4Br_8$, cyclo-$Si_4I_8$, and cyclo-$Si_4(OMe)_8$ are synthesized as described by Stüger et al., "UV/Vis-spektroskopische Untersuchungen an Cyclosilanderivaten," *Monatsh. Chem.*, 119: 873-888 (1988), incorporated herein by reference.

Example 35

Synthesis of polyperhydrosilane from cyclo-(p-$Tol_2Si)_4$ where p-Tol is p-$CH_3C_6H_5$ para-tolyl group. In a glovebox, a 1 L Schlenk flask is loaded with 200 mL of cyclohexane, 25 mmol of cyclo-(p-$Tol_2Si)_4$, and 2 mmol of freshly sublimed $AlCl_3$. Cyclo-(p-$Tol_2Si)_4$ is synthesized as described by Richter et al., "Darstellung und Massenspektrometrische Untersuchung von p-Tolylsubstituierten Cyclosilanen und Cyclogermanen," *J. Organomet. Chem.*, 20: 81-90 (1969), incorporated herein by reference. The mixture is frozen in liquid nitrogen and put under dynamic vacuum. The valve on the flask is then closed, and the mixture is thawed out in static vacuum. The freeze-pump-thaw cycle is repeated 3 times. The flask is put in a cold water bath and back filled with HCl gas. The mixture is stirred vigorously for 8 hours under dynamic flow of HCl and for 16 hours under static atmosphere of HCl. The temperature is maintained at approximately 25 DEG C. The flask is then put under dynamic vacuum for 1 minute to remove most of HCl. The mixture is diluted with 50 mL of diethyl ether and chilled to approximately −10 DEG C. 60 ml of 1M $LiAlH_4$ solution in diethyl ether is added slowly over a period of 20 minutes, while the temperature of the reaction mixture is maintained at approximately −10 DEG C. The reaction mixture is slowly brought to room temperature and stirred for 2 hours at room temperature. The product is extracted with 200 mL of cyclohexane. The solution is concentrated in vacuum to about 20 ml, purified as described for the synthesis of polyperhydrosilane from polyaminosilane, and dried in vacuum for 2 hours in the dark to yield the final product.

Example 36

Synthesis of polyperhydrosilane-germane from cyclo-(p-$Tol_2Si)_4$ and cyclo-(p-$Tol_2Ge)_4$, where p-Tol is p-$CH_3C_6H_5$ para-tolyl group. In a glovebox, a 1 L Schlenk flask is loaded with 200 mL of cyclohexane, 20 mmol of cyclo-(p-$Tol_2Si)_4$, 5 mmol of cyclo-(p-$Tol_2Ge)_4$, and 2 mmol of freshly sublimed $AlCl_3$. Cyclo-(p-$Tol_2Si)_4$ and cyclo-(p-$Tol_2Ge)_4$ are synthesized as described by Richter et al., "Darstellung und Massenspektrometrische Untersuchung von p-Tolylsubstituierten Cyclosilanen und Cyclogermanen," *J. Organomet. Chem.*, 20: 81-90 (1969), incorporated herein by reference. Synthesis and purification of polyperhydrosilane are performed as described for the synthesis of polyperhydrosilane from cyclo-(p-$Tol_2Si)_4$.

Example 37

Synthesis of polyperhydrosilane from cyclo-$Si_5H_{10}$ in the presence of $Bu_4NF$. In a glovebox, a 1 L Schlenk flask is loaded with 200 mL of dimethoxyethane or tetrahydrofurane and 40 mmol of cyclo-$Si_5H_{10}$. Cyclo-$Si_5H_{10}$ is synthesized as described by Hengge et al., "Cyclopentasilane, the First Unsubstituted Cyclic Silicon Hydride", *Angew. Chem. Int. Ed.*, 12(4): 316-316 (1973), incorporated herein by reference. The mixture is cooled to −50 DEG C., and 0.8 mmol of $Bu_4NF$ is added. The mixture is stirred for 20 hours at −50 DEG C., then is frozen in liquid nitrogen, and put under dynamic vacuum. The flask is back filled with HCl gas, thawed out, and stirred for 10 minutes. Solvent and HCl are removed in vacuum. The product is extracted with 30 mL of cyclohexane, purified as described for the synthesis of polyperhydrosilane from polyaminosilane, and dried in vacuum for 2 hours in the dark to yield the final product.

Example 38

Synthesis of polyperhydrosilane from cyclo-$Si_5H_{10}$ in the presence of $(CH_3)_3SiK$ and hexamethylphosphoramide In a glovebox, a 1 L Schlenk flask is loaded with 200 mL of dimethoxyethane or tetrahydrofurane, 10 mL of hexamethylphosphoramide, and 40 mmol of cyclo-$Si_5H_{10}$. Cyclo-$Si_5H_{10}$ is synthesized as described by Hengge et al., "Cyclo- pentasilane, the First Unsubstituted Cyclic Silicon Hydride", *Angew. Chem. Int. Ed.*, 12(4): 316-316 (1973), incorporated herein by reference. The mixture is cooled to −50 DEG C., and 0.8 mmol of $(CH_3)_3SiK$ is added. The mixture is stirred for 20 hours at −50 DEG C., then is frozen in liquid nitrogen, and put under dynamic vacuum. The flask is back filled with HCl gas, thawed out, and stirred for 10 minutes. Solvent and HCl are removed in vacuum. The product is extracted with 30 mL of cyclohexane, purified as described for the synthesis of polyperhydrosilane from polyaminosilane, and dried in vacuum for 2 hours in the dark to yield the final product.

Example 39

Synthesis of polyperhydrosilane from cyclo-$Si_5H_{10}$ in the presence of $(CH_3)_2(C_6H_5)SiK$ and 18-crown-6. In a glovebox, a 1 L Schlenk flask is loaded with 200 mL of dimethoxyethane or tetrahydrofurane, 0.8 mmol of 18-crown-6, and 40 mmol of cyclo-$Si_5H_{10}$. Cyclo-$Si_5H_{10}$ is synthesized as described by Hengge et al., "Cyclopentasilane, the First Unsubstituted Cyclic Silicon Hydride", *Angew. Chem. Int. Ed.*, 12(4): 316-316 (1973), incorporated herein by reference. The mixture is cooled to −50 DEG C., and 0.8 mmol of $(CH_3)_2(C_6H_5)SiK$ is added. The mixture is stirred for 20 hours at −50 DEG C., then is frozen in liquid nitrogen, and put under dynamic vacuum. The flask is back filled with HCl gas, thawed out, and stirred for 10 minutes. Solvent and HCl are removed in vacuum. The product is extracted with 30 mL of cyclohexane, purified as described for the synthesis of polyperhydrosilane from polyaminosilane, and dried in vacuum for 2 hours in the dark to yield the final product.

Example 40

Synthesis of polyperhydrosilane from cyclo-$Si_5H_{10}$ in the presence of $LiAlH_4$ and 18-crown-6 In a glovebox, a 1 L Schlenk flask is loaded with 200 mL of dimethoxyethane or tetrahydrofurane, 0.8 mmol of 18-crown-6, and 40 mmol of cyclo-$Si_5H_{10}$. Cyclo-$Si_5H_{10}$ is synthesized as described by Hengge et al., "Cyclopentasilane, the First Unsubstituted Cyclic Silicon Hydride", *Angew. Chem. Int. Ed.*, 12(4): 316-316 (1973), incorporated herein by reference. The mixture is cooled to −50 DEG C., and 0.8 mmol of $LiAlH_4$ is added. The mixture is stirred for 20 hours at −50 DEG C., then is frozen in liquid nitrogen, and put under dynamic vacuum. The flask is back filled with HCl gas, thawed out, and stirred for 10 minutes. Solvent and HCl are removed in vacuum. The product is extracted with 30 mL of cyclohexane, purified as described for the synthesis of polyperhydrosilane from polyaminosilane, and dried in vacuum for 2 hours in the dark to yield the final product.

Example 41

Synthesis of polyperhydrosilane from cyclo-$Si_5Cl_{10}$ in the presence of $Bu_4NF$ In a glovebox, a 1 L Schlenk flask is loaded with 200 mL of dimethoxyethane or tetrahydrofurane and 40 mmol of cyclo-$Si_5Cl_{10}$. Cyclo-$Si_5Cl_{10}$ is synthesized as described by Stüger et al., "UV/Vis-spektroskopische Untersuchungen an Cyclosilanderivaten," *Monatsh. Chem.*, 119: 873-888 (1988), incorporated herein by reference. The mixture is cooled to −50 DEG C., and 0.8 mmol of $Bu_4NF$ is added. The mixture is stirred for 20 hours at −50 DEG C., then is frozen in liquid nitrogen, and put under dynamic vacuum. The flask is back filled with HCl gas, thawed out, and stirred for 10 minutes. Solvent and HCl are removed in vacuum. The product is suspended in 100 mL of cyclohexane. The mixture is diluted with 50 mL of diethyl ether and chilled to approximately −10 DEG C. 120 ml of 1M LiAlH$_4$ solution in diethyl ether is added slowly over a period of 20 minutes, while the temperature of the reaction mixture is maintained at approximately −10 DEG C. The reaction mixture is slowly brought to room temperature and stirred for 2 hours at room temperature. The product is extracted with 300 mL of cyclohexane. The solution is concentrated in vacuum to about 20 ml, purified as described for the synthesis of polyperhydrosilane from polyaminosilane, and dried in vacuum for 2 hours in the dark to yield the final product.

Example 42

Synthesis of polyperhydrosilane from cyclo-Si$_5$Br$_{10}$, cyclo-Si$_5$I$_{10}$, or cyclo-Si$_5$(OMe)$_{10}$ in the presence of Bu$_4$NF The same procedures as described for the synthesis and purification of polyperhydrosilane from cyclo-Si$_5$Cl$_{10}$ are utilized with cyclo-Si$_5$Br$_{10}$, cyclo-Si$_5$I$_{10}$, or cyclo-Si$_5$(OMe)$_{10}$ in place of cyclo-Si$_5$Cl$_{10}$. Cyclo-Si$_5$Br$_{10}$, cyclo-Si$_5$I$_{10}$, or cyclo-Si$_5$(OMe)$_{10}$ are synthesized as described by Stüger et al., "UV/Vis-spektroskopische Untersuchungen an Cyclosilanderivaten," *Monatsh. Chem.*, 119: 873-888 (1988), incorporated herein by reference.

Example 43

Synthesis of polyperhydrosilane from cyclo-(p-Tol$_2$Si)$_5$ in the presence of (C$_6$H$_5$)$_3$SiK and 18-crown-6 In a glovebox, a 1 L Schlenk flask is loaded with 200 mL of dimethoxyethane or tetrahydrofurane, 0.8 mmol of 18-crown-6, and 40 mmol of cyclo-(p-Tol$_2$Si)$_5$. Cyclo-(p-Tol$_2$Si)$_5$ is synthesized as described by Richter et al., "Darstellung und Massenspektrometrische Untersuchung von p-Tolylsubstituierten Cyclosilanen und Cyclogermanen," *J. Organomet. Chem.*, 20: 81-90 (1969), incorporated herein by reference. The mixture is cooled to −50 DEG C., and 0.8 mmol of (C$_6$H$_5$)$_3$SiK is added. The mixture is stirred for 20 hours at −50 DEG C., then is frozen in liquid nitrogen, and put under dynamic vacuum. The flask is back filled with HCl gas, thawed out, and stirred for 10 minutes. Solvent and HCl are removed in vacuum. The product is suspended in 200 mL of cyclohexane, and 2 mmol of freshly sublimed AlCl$_3$ is added. The mixture is frozen in liquid nitrogen and put under dynamic vacuum. The valve on the flask is then closed, and the mixture is thawed out in static vacuum. The freeze-pump-thaw cycle is repeated 3 times. The flask is put in a cold water bath and back filled with HCl gas. The mixture is stirred vigorously for 8 hours under dynamic flow of HCl and for 16 hours under static atmosphere of HCl. The temperature is maintained at approximately 25 DEG C. The flask is then put under dynamic vacuum for 1 minute to remove most of HCl. The mixture is diluted with 50 mL of diethyl ether and chilled to approximately −10 DEG C. 120 ml of 1M LiAlH$_4$ solution in diethyl ether is added slowly over a period of 20 minutes, while the temperature of the reaction mixture is maintained at approximately −10 DEG C. The reaction mixture is slowly brought to room temperature and stirred for 2 hours at room temperature. The product is extracted with 200 mL of cyclohexane. The solution is concentrated in vacuum to about 20 ml, purified as described for the synthesis of polyperhydrosilane from polyaminosilane, and dried in vacuum for 2 hours in the dark to yield the final product.

Example 44

Synthesis of polyperhydrosilane from cyclo-(p-Tol$_2$Si)$_5$ in the presence of Bu$_4$NF. The same procedures as described for the synthesis of polyperhydrosilane from cyclo-(p-Tol$_2$Si)$_5$ in the presence of (C$_6$H$_5$)$_3$SiK and 18-crown-6 are utilized. Bu$_4$NF is used in place of (C$_6$H$_5$)$_3$SiK, and 18-crown-6 is not used at all.

Example 45

Synthesis of polyperhydrosilane-germane from cyclo-(p-Tol$_2$Si)$_5$ and cyclo-(p-Tol$_2$Ge)$_5$ in the presence of (C$_6$H$_5$)$_3$SiK and 18-crown-6. In a glovebox, a 1 L Schlenk flask is loaded with 200 mL of dimethoxyethane or tetrahydrofurane, 0.8 mmol of 18-crown-6, and 35 mmol of cyclo-(p-Tol$_2$Si)$_5$ and 5 mmol of cyclo-(p-Tol$_2$Ge)$_5$. Cyclo-(p-Tol$_2$Si)$_5$ and cyclo-(p-Tol$_2$Ge)$_5$ are synthesized as described by Richter et al., "Darstellung und Massenspektrometrische Untersuchung von p-Tolylsubstituierten Cyclosilanen und Cyclogermanen," *J. Organomet. Chem.*, 20: 81-90 (1969), incorporated herein by reference. The same procedures as described for the synthesis of polyperhydrosilane from cyclo-(p-Tol$_2$Si)$_5$ in the presence of (C$_6$H$_5$)$_3$SiK and 18-crown-6 are utilized.

Example 46

Synthesis of polyperhydrosilane from 2,2,3,3,4,4-hexafluoro-2,3,4-trisilabicyclo-[3.2.2]nona-6,8-diene, C$_6$H$_6$)CF$_2$)$_3$ In a glovebox, a 1 L Schlenk flask is loaded with 200 mL of dimethoxyethane or tetrahydrofurane, 70 mmol of 2,2,3,3,4,4-hexafluoro-2,3,4-trisilabicyclo-[3.2.2]nona-6,8-diene, and 7 mmol of Bu$_4$NF. 2,2,3,3,4,4-hexafluoro-2,3,4-trisilabicyclo-[3.2.2]nona-6,8-diene is synthesized as described by Timms et al., "Silicon-Fluorine Chemistry. 4. Reaction of Silicon Difluoride with Aromatic Compounds," *J. Am. Chem. Soc.*, 88 (5): 940 (1966), incorporated herein by reference. The mixture is stirred for 24 hours at 25 DEG C., then is frozen in liquid nitrogen, and put under dynamic vacuum. The flask is back filled with HCl gas, thawed out, and stirred for 10 minutes. Solvent and HCl are removed in vacuum. The product is suspended in 100 mL of cyclohexane. The mixture is diluted with 50 mL of diethyl ether and chilled to approximately −10 DEG C. 120 ml of 1M LiAlH$_4$ solution in diethyl ether is added slowly over a period of 20 minutes, while the temperature of the reaction mixture is maintained at approximately −10 DEG C. The reaction mixture is slowly brought to room temperature and stirred for 2 hours at room temperature. The product is extracted with 300 mL of cyclohexane. The solution is concentrated in vacuum to about 20 ml, purified as described for the synthesis of polyperhydrosilane from polyaminosilane, and dried in vacuum for 2 hours in the dark to yield the final product.

Example 47

Synthesis of polyperhydrosilane from a mixture of C$_6$H$_6$(CF$_2$)$_n$ compounds, where n=2-8 In a glovebox, a 1 L Schlenk flask is loaded with 200 mL of dimethoxyethane or tetrahydrofurane, 20 g of 2,2,3,3,4,4-hexafluoro-2,3,4-trisilabicyclo-[3.2.2]nona-6,8-diene, and 7 mmol of Bu$_4$NF. A mixture of C$_6$H$_6$(CF$_2$)$_n$ compounds is synthesized as described by Timms et al., "Silicon-Fluorine Chemistry. 4. Reaction of Silicon Difluoride with Aromatic Compounds," *J. Am. Chem. Soc.*, 88 (5): 940 (1966), incorporated herein by reference. The rest of procedures are the same as described for the synthesis and purification of polyperhydrosilane from 2,2,3,3,4,4-hexafluoro-2,3,4-trisilabicyclo-[3.2.2]nona-6,8-diene.

Example 48

Synthesis of polyperhydrosilane from 2,3-benzo-1,4,5,6-tetraphenyl-7-chloro-7-mesityl-7-silanorbornadiene by thermal polymerization In a glovebox, a 1 L Schlenk flask is loaded with 40 mmol of 2,3-benzo-1,4,5,6-tetraphenyl-7-chloro-7-mesityl-7-silanorbornadiene. 2,3-benzo-1,4,5,6-tetraphenyl-7-chloro-7-mesityl-7-silanorbornadiene is synthesized as described by Kawachi et al., "Functional Group Transformations and Stereochemistry of Silicon-functionalized 7—Silabenzonorbornadienes," *Chem. Lett.*, 34(7): 960-961 (2005), incorporated herein by reference. The flask is heated to 200 DEG C., and the molten mixture is stirred for 2 hours at 200 DEG C. The product is mixed with 500 mL of dimethoxyethane and 0.8 mmol of freshly sublimed $AlCl_3$. The mixture is frozen in liquid nitrogen and put under dynamic vacuum. The valve on the flask is then closed, and the mixture is thawed out in static vacuum. The freeze-pump-thaw cycle is repeated 3 times. The flask is put in a cold water bath and back filled with HCl gas. The mixture is stirred vigorously for 4 hours under dynamic flow of HCl and for 2 hours under static atmosphere of HCl. The temperature is maintained at approximately 10 to 25 DEG C. The flask is then put under dynamic vacuum for 1 minute to remove most of HCl. The solution is filtered, and the precipitate is extracted with 200 mL of hot cyclohexane. The cyclohexane extract is combined with dimethoxyethane extract and filtered again. The solvents are removed in vacuum, and the product is extracted with 200 mL of hot cyclohexane. The extract is concentrated to 30 mL in vacuum, chilled to 10 DEG C., filtered, diluted with 10 mL of diethyl ether, and chilled to approximately −10 DEG C. 25 ml of 1M $LiAlH_4$ solution in diethyl ether is added slowly over a period of 10 minutes, while the temperature of the reaction mixture is maintained at approximately −10 DEG C. The reaction mixture is slowly brought to room temperature and stirred for 2 hours at room temperature. The product is extracted with 20 mL of cyclohexane. The solution is concentrated in vacuum to about 10 ml, filtered, purified as described for the synthesis of polyperhydrosilane from polyaminosilane, and dried in vacuum for 2 hours in the dark to yield the final product.

Example 49

Synthesis of polyperhydrosilane from 2,3-benzo-1,4,5,6-tetraphenyl-7-phenylamino-7-mesityl-7-silanorbornadiene by polymerization catalyzed by $(C_6H_5)_3SiK$ In a glovebox, a 1 L Schlenk flask is loaded with 500 mL of dimethoxyethane and 40 mmol of 2,3-benzo-1,4,5,6-tetraphenyl-7-phenylamino-7-mesityl-7-silanorbornadiene. 2,3-benzo-1,4,5,6-tetraphenyl-7-phenylamino-7-mesityl-7-silanorbornadiene is synthesized as described by Kawachi et al., "Functional Group Transformations and Stereochemistry of Silicon-functionalized 7—Silabenzonorbornadienes," *Chem. Lett.*, 34(7): 960-961 (2005), incorporated herein by reference. The mixture is chilled to 0 DEG C., and 0.8 mmol of $(C_6H_5)_3SiK$ is added. The mixture is stirred for 1 hour at 25 DEG C., then is frozen in liquid nitrogen, and put under dynamic vacuum. The flask is back filled with HCl gas, thawed out, and stirred for 10 minutes. Most of HCl is removed by a 10 seconds exposure to dynamic vacuum. The product is mixed with 0.8 mmol of freshly sublimed $AlCl_3$. The mixture is frozen in liquid nitrogen and put under dynamic vacuum. The valve on the flask is then closed, and the mixture is thawed out in static vacuum. The freeze-pump-thaw cycle is repeated 3 times. The flask is put in a cold water bath and back filled with HCl gas. The mixture is stirred vigorously for 4 hours under dynamic flow of HCl and for 2 hours under static atmosphere of HCl. The temperature is maintained at approximately 10 to 25 DEG C. The flask is then put under dynamic vacuum for 1 minute to remove most of HCl. The solution is filtered, and the precipitate is extracted with 200 mL of hot cyclohexane. The cyclohexane extract is combined with dimethoxyethane extract and filtered again. The solvents are removed in vacuum, and the product is extracted with 200 mL of hot cyclohexane. The extract is concentrated to 30 mL in vacuum, chilled to 10 DEG C., filtered, diluted with 10 mL of diethyl ether, and chilled to approximately −10 DEG C. 25 ml of 1M $LiAlH_4$ solution in diethyl ether is added slowly over a period of 10 minutes, while the temperature of the reaction mixture is maintained at approximately −10 DEG C. The reaction mixture is slowly brought to room temperature and stirred for 2 hours at room temperature. The product is extracted with 20 mL of cyclohexane. The solution is concentrated in vacuum to about 10 ml, filtered, purified as described for the synthesis of polyperhydrosilane from polyaminosilane, and dried in vacuum for 2 hours in the dark to yield the final product.

Example 50

Synthesis of polyperhydrosilane from 2,3-benzo-1,4,5,6-tetraphenyl-7-phenylamino-7-mesityl-7-silanorbornadiene by polymerization catalyzed by $(C_6H_5)_3SiK$ with cryptand [2.2.2] In a glovebox, a 1 L Schlenk flask is loaded with 500 mL of dimethoxyethane, 0.8 mmol of cryptand[2.2.2], and 40 mmol of 2,3-benzo-1,4,5,6-tetraphenyl-7-phenylamino-7-mesityl-7-silanorbornadiene. 2,3-benzo-1,4,5,6-tetraphenyl-7-phenylamino-7-mesityl-7-silanorbornadiene is synthesized as described by Kawachi et al., "Functional Group Transformations and Stereochemistry of Silicon-functionalized 7—Silabenzonorbornadienes," *Chem. Lett.*, 34(7): 960-961 (2005), incorporated herein by reference. Synthesis and purification of polyperhydrosilane are performed as described for the synthesis of polyperhydrosilane from 2,3-benzo-1,4,5,6-tetraphenyl-7-phenylamino-7-mesityl-7-silanorbornadiene by polymerization catalyzed by $(C_6H_5)_3SiK$.

Example 51

Synthesis of polyperhydrosilane from 1,4,5,6-tetraphenyl-7,7-ditolyl-7-silanorbornadiene by polymerization catalyzed by $(C_6H_5)_3SiK$ In a glovebox, a 1 L Schlenk flask is loaded with 500 mL of dimethoxyethane and 40 mmol of 1,4,5,6-tetraphenyl-7,7-ditolyl-7-silanorbornadiene. 1,4,5,6-tetraphenyl-7,7-ditolyl-7-silanorbornadiene is synthesized as described by Appler et al., "Die Chemie der Schweren Carben-Analogen $R_2M$, M=Si, Ge, Sn. IX. Eigenschaften und Thermolyse von Neuen7—Silabicyclo[2.2.1]heptadienen," *J. Organomet. Chem.*, 291: 9-23 (1985), incorporated herein by reference. Synthesis and purification of polyperhydrosilane are performed as described for the synthesis of polyperhydrosilane from 2,3-benzo-1,4,5,6-tetraphenyl-7-phenylamino-7-mesityl-7-silanorbornadiene by polymerization catalyzed by $(C_6H_5)_3SiK$.

Example 52

Synthesis of polyperhydrosilane from 2,3-benzo-1,4,5,6-tetraphenyl-7-chloro-7-mesityl-7-silanorbornadiene by polymerization catalyzed by $Bu_4NF$ In a glovebox, a 1 L Schlenk flask is loaded with 500 mL of dimethoxyethane, 0.8 mmol of $Bu_4NF$, and 40 mmol of 2,3-benzo-1,4,5,6-tetraphenyl-7-chloro-7-mesityl-7-silanorbornadiene. 2,3-benzo-1,4,5,6-tetraphenyl-7-chloro-7-mesityl-7-silanorbornadiene is synthesized as described by Kawachi et al., "Functional Group Transformations and Stereochemistry of Silicon-functionalized 7—Silabenzonorbornadienes," *Chem. Lett.*, 34(7): 960-961 (2005), incorporated herein by reference. The mixture is stirred for 24 hours at 25 DEG C. The product is mixed with 0.8 mmol of freshly sublimed $AlCl_3$. The mixture is frozen in liquid nitrogen and put under dynamic vacuum. The valve on the flask is then closed, and the mixture is thawed out in static vacuum. The freeze-pump-thaw cycle is repeated 3 times. The flask is put in a cold water bath and back filled with HCl gas. The mixture is stirred vigorously for 4 hours under dynamic flow of HCl and for 2 hours under static atmosphere of HCl. The temperature is maintained at approximately 10 to 25 DEG C. The flask is then put under dynamic vacuum for 1 minute to remove most of HCl. The solution is filtered, and the precipitate is extracted with 200 mL of hot cyclohexane. The cyclohexane extract is combined with dimethoxyethane extract and filtered again. The solvents are removed in vacuum, and the product is extracted with 200 mL of hot cyclohexane. The extract is concentrated to 30 mL in vacuum, chilled to 10 DEG C., filtered, diluted with 10 mL of diethyl ether, and chilled to approximately −10 DEG C. 25 ml of 1M $LiAlH_4$ solution in diethyl ether is added slowly over a period of 10 minutes, while the temperature of the reaction mixture is maintained at approximately −10 DEG C. The reaction mixture is slowly brought to room temperature and stirred for 2 hours at room temperature. The product is extracted with 20 mL of cyclohexane. The solution is concentrated in vacuum to about 10 ml, filtered, purified as described for the synthesis of polyperhydrosilane from polyaminosilane, and dried in vacuum for 2 hours in the dark to yield the final product.

Example 53

Synthesis of polyperhydrosilane from 2,3-benzo-1,4,5,6-tetraphenyl-7-phenyl-7-silanorbornadiene by polymerization catalyzed by $Bu_4NF$. In a glovebox, a 1 L Schlenk flask is loaded with 500 mL of dimethoxyethane, 0.8 mmol of $Bu_4NF$, and 40 mmol of 2,3-benzo-1,4,5,6-tetraphenyl-7-phenyl-silanorbornadiene. 2,3-benzo-1,4,5,6-tetraphenyl-7-phenyl-7-silanorbornadiene is synthesized as described by Schuppan et al., "The Elusive 7—Silanorbornadien-7-ylium: Synthesis and Characterization of Nitrilium and Oxonium Ions Deriving from 2,3-Benzo-7-silanorbornadien-7-ylium," *Organometallics*, 20(22): 4584-4592 (2001), incorporated herein by reference. Synthesis and purification of polyperhydrosilane are performed as described for the synthesis of polyperhydrosilane from 2,3-benzo-1,4,5,6-tetraphenyl-7-chloro-7-mesityl-7-silanorbornadiene by polymerization catalyzed by $Bu_4NF$.

Example 54

Synthesis of polyperhydrosilane from 1,4,5,6-tetraphenyl-7,7-dichloro-7-silanorbornadiene by polymerization catalyzed by $Bu_4NF$. In a glovebox, a 1 L Schlenk flask is loaded with 500 mL of dimethoxyethane, 0.8 mmol of $Bu_4NF$, and 40 mmol of 1,4,5,6-tetraphenyl-7,7-dichloro-7-silanorbornadiene. 1,4,5,6-tetraphenyl-7,7-dichloro-7-silanorbornadiene is synthesized as described by Appler et al., "Die Chemie der Schweren Carben-Analogen $R_2M$, M=Si, Ge, Sn. IX. Eigenschaften und Thermolyse von Neuen 7—Silabicyclo[2.2.1] heptadienen," *J. Organomet. Chem.*, 291: 9-23 (1985), incorporated herein by reference. The mixture is stirred for 24 hours at 25 DEG C. The solution is filtered, and the precipitate is extracted with 200 mL of hot cyclohexane. The cyclohexane extract is combined with dimethoxyethane extract and filtered again. The solvents are removed in vacuum, and the product is extracted with 200 mL of hot cyclohexane. The extract is concentrated to 30 mL in vacuum, chilled to 10 DEG C., filtered, diluted with 10 mL of diethyl ether, filtered, and chilled to approximately −10 DEG C. 25 ml of 1M $LiAlH_4$ solution in diethyl ether is added slowly over a period of 10 minutes, while the temperature of the reaction mixture is maintained at approximately −10 DEG C. The reaction mixture is slowly brought to room temperature and stirred for 2 hours at room temperature. The product is extracted with 20 mL of cyclohexane. The solution is concentrated in vacuum to about 10 ml, filtered, purified as described for the synthesis of polyperhydrosilane from polyaminosilane, and dried in vacuum for 2 hours in the dark to yield the final product.

Example 55

Synthesis of polyperhydrogermane from 2,3-trimethylbenzo-1,4,5,6-tetraphenyl-7,7-diphenyl-7-germanorbornadiene by polymerization catalyzed by $(C_6H_5)_3SiK$. In a glovebox, a 1 L Schlenk flask is loaded with 500 mL of dimethoxyethane and 40 mmol of 2,3-trimethylbenzo-1,4,5,6-tetraphenyl-7,7-diphenyl-7-germanorbornadiene. 2,3-trimethylbenzo-1,4,5,6-tetraphenyl-7,7-diphenyl-7-germanorbornadiene is synthesized as described by Neumann et al., "7-Germanorbornadienes and Their Thermal Cycloeliminations," *Tetrahedron Lett.*, 3273-3276 (1980), incorporated herein by reference. Synthesis and purification of polyperhydrogermane are performed as described for the synthesis of polyperhydrosilane from 2,3-benzo-1,4,5,6-tetraphenyl-7-phenylamino-7-mesityl-7-silanorbornadiene by polymerization catalyzed by $(C_6H_5)_3$ SiK.

Example 56

Synthesis of polyperhydrogermane from 2,3-trimethylbenzo-1,4,5,6-tetraphenyl-7,7-diphenyl-7-germanorbornadiene by polymerization catalyzed by PhLi with cryptand [2.2.2]. In a glovebox, a 1 L Schlenk flask is loaded with 500 mL of dimethoxyethane, 0.8 mmol of cryptand[2.2.2], and 40 mmol of 2,3-trimethylbenzo-1,4,5,6-tetraphenyl-7,7-diphenyl-7-germanorbornadiene. 2,3-trimethylbenzo-1,4,5,6-tetraphenyl-7,7-diphenyl-7-germanorbornadiene is synthesized as described by Neumann et al., "7-Germanorbornadienes and Their Thermal Cycloeliminations," *Tetrahedron Lett.*, 3273-3276 (1980), incorporated herein by reference. Synthesis and purification of polyperhydrogermane are performed as described for the synthesis of polyperhydrosilane from 2,3-benzo-1,4,5,6-tetraphenyl-7-phenylamino-7-mesityl-7-silanorbornadiene by polymerization catalyzed by $(C_6H_5)_3SiK$, except that 0.8 mmol of PhLi is used instead of $(C_6H_5)_3SiK$.

Example 57

Synthesis of polyperhydrogermane from 2,3-trimethylbenzo-1,4,5,6-tetraphenyl-7,7-diphenyl-7-germanorbornadiene by thermal polymerization In a glovebox, a 1 L Schlenk flask is loaded with 40 mmol of 2,3-trimethylbenzo-1,4,5,6-tetraphenyl-7,7-diphenyl-7-germanorbornadiene. 2,3-trimethylbenzo-1,4,5,6-tetraphenyl-7,7-diphenyl-7-germanorbornadiene is synthesized as described by Neumann et al., "7-Germanorbornadienes and Their Thermal Cycloeliminations," *Tetrahedron Lett.*, 3273-3276 (1980), incorporated herein by reference. Synthesis and purification of polyperhydrogermane are performed as described for the synthesis polyperhydrosilane from 2,3-benzo-1,4,5,6-tetraphenyl-7-chloro-7-mesityl-7-silanorbornadiene by thermal polymerization.

Example 58

Synthesis of polyperhydrosilane from 2:3,5:6-dibenzo-7,7,8,8-tetraphenyl-7,8-disilabicyclo[2.2.2.]octa-2,5-diene by polymerization catalyzed by $(C_6H_5)_3SiK$ In a glovebox, a 1 L Schlenk flask is loaded with 500 mL of dimethoxyethane and 40 mmol of 2:3,5:6-dibenzo-7,7,8,8-tetraphenyl-7,8-disilabicyclo[2.2.2.]octa-2,5-diene. 2:3,5:6-dibenzo-7,7,8,8-tetraphenyl-7,8-disilabicyclo[2.2.2.]octa-2,5-diene is synthesized as described by Smith et al., "A Direct Route to a Novel Tetraphenyldisilabicyclo[2.2.2.]octa-2,5-diene: A Tetraphenyldisilene Precursor," *J. Chem. Soc., Chem. Commun.*, 910-911 (1975), incorporated herein by reference. The mixture is chilled to 0 DEG C., and 0.8 mmol of $(C_6H_5)_3SiK$ is added. The mixture is stirred for 1 hour at 25 DEG C., then is frozen in liquid nitrogen, and put under dynamic vacuum. The flask is back filled with HCl gas, thawed out, and stirred for 10 minutes. Most of HCl is removed by a 10 seconds exposure to dynamic vacuum. The product is mixed with 0.8 mmol of freshly sublimed $AlCl_3$. The mixture is frozen in liquid nitrogen and put under dynamic vacuum. The valve on the flask is then closed, and the mixture is thawed out in static vacuum. The freeze-pump-thaw cycle is repeated 3 times. The flask is put in a cold water bath and back filled with HCl gas. The mixture is stirred vigorously for 4 hours under dynamic flow of HCl and for 2 hours under static atmosphere of HCl. The temperature is maintained at approximately 10 to 25 DEG C. The flask is then put under dynamic vacuum for 1 minute to remove most of HCl. The solution is filtered, and the precipitate is extracted with 400 mL of hot cyclohexane. The cyclohexane extract is combined with dimethoxyethane extract and filtered again. The solvents are removed in vacuum, and the product is extracted with 400 mL of hot cyclohexane. The extract is concentrated to 60 mL in vacuum, chilled to 10 DEG C., filtered, diluted with 20 mL of diethyl ether, and chilled to approximately −10 DEG C. 50 ml of 1M $LiAlH_4$ solution in diethyl ether is added slowly over a period of 10 minutes, while the temperature of the reaction mixture is maintained at approximately −10 DEG C. The reaction mixture is slowly brought to room temperature and stirred for 2 hours at room temperature. The product is extracted with 40 mL of cyclohexane. The solution is concentrated in vacuum to about 20 ml, filtered, purified as described for the synthesis of polyperhydrosilane from polyaminosilane, and dried in vacuum for 2 hours in the dark to yield the final product.

Example 59

Synthesis of polyperhydrosilane from 2:3,5:6-dibenzo-7,7,8,8-tetraphenyl-7,8-disilabicyclo[2.2.2.]octa-2,5-diene by polymerization catalyzed by PhLi with cryptand[2.2.2] In a glovebox, a 1 L Schlenk flask is loaded with 500 mL of dimethoxyethane, 0.8 mmol of cryptand[2.2.2], and 40 mmol of 2:3,5:6-dibenzo-7,7,8,8-tetraphenyl-7,8-disilabicyclo[2.2.2.]octa-2,5-diene. 2:3,5:6-dibenzo-7,7,8,8-tetraphenyl-7,8-disilabicyclo[2.2.2.]octa-2,5-diene is synthesized as described by Smith et al., "A Direct Route to a Novel Tetraphenyldisilabicyclo[2.2.2.]octa-2,5-diene: A Tetraphenyldisilene Precursor," *J. Chem. Soc., Chem. Commun.*, 910-911 (1975), incorporated herein by reference. Synthesis and purification of polyperhydrosilane are performed as described for the synthesis of polyperhydrosilane from 2:3,5:6-dibenzo-7,7,8,8-tetraphenyl-7,8-disilabicyclo[2.2.2.]octa-2,5-diene by polymerization catalyzed by $(C_6H_5)_3SiK$ except that 0.8 mmol of PhLi is used instead of $(C_6H_5)_3SiK$.

Example 60

Synthesis of polyperhydrosilane from 2:3,5:6-dibenzo-7,7,8,8-tetraphenyl-7,8-disilabicyclo[2.2.2.]octa-2,5-diene by polymerization catalyzed by $Bu_4NF$ In a glovebox, a 1 L Schlenk flask is loaded with 500 mL of dimethoxyethane, 0.8 mmol of $Bu_4NF$, and 40 mmol of 2:3,5:6-dibenzo-7,7,8,8-tetraphenyl-7,8-disilabicyclo[2.2.2.]octa-2,5-diene. 2:3,5:6-dibenzo-7,7,8,8-tetraphenyl-7,8-disilabicyclo[2.2.2.]octa-2,5-diene is synthesized as described by Smith et al., "A Direct Route to a Novel Tetraphenyldisilabicyclo[2.2.2.]octa-2,5-diene: A Tetraphenyldisilene Precursor," *J. Chem. Soc., Chem. Commun.*, 910-911 (1975), incorporated herein by reference. The mixture is stirred for 24 hours at 25 DEG C. The product is mixed with 0.8 mmol of freshly sublimed $AlCl_3$. The mixture is frozen in liquid nitrogen and put under dynamic vacuum. The valve on the flask is then closed, and the mixture is thawed out in static vacuum. The freeze-pump-thaw cycle is repeated 3 times. The flask is put in a cold water bath and back filled with HCl gas. The mixture is stirred vigorously for 4 hours under dynamic flow of HCl and for 2 hours under static atmosphere of HCl. The temperature is maintained at approximately 10 to 25 DEG C. The flask is then put under dynamic vacuum for 1 minute to remove most of HCl. The solution is filtered, and the precipitate is extracted with 400 mL of hot cyclohexane. The cyclohexane extract is combined with dimethoxyethane extract and filtered again. The solvents are removed in vacuum, and the product is extracted with 400 mL of hot cyclohexane. The extract is concentrated to 60 mL in vacuum, chilled to 10 DEG C., filtered, diluted with 20 mL of diethyl ether, and chilled to approximately −10 DEG C. 50 ml of 1M $LiAlH_4$ solution in diethyl ether is added slowly over a period of 10 minutes, while the temperature of the reaction mixture is maintained at approximately −10 DEG C. The reaction mixture is slowly brought to room temperature and stirred for 2 hours at room temperature. The product is extracted with 40 mL of cyclohexane. The solution is concentrated in vacuum to about 20 ml, filtered, purified as described for the synthesis of polyperhydrosilane from polyaminosilane, and dried in vacuum for 2 hours in the dark to yield the final product.

CONCLUSIONS, RAMIFICATIONS, AND SCOPE

As described above, cross-linked and linear HMW polymeric precursors to functional liquids can be synthesized by polymerization of monomers bearing various substituents on Si and Ge atoms. Substituents can then be replaced with hydrogen to furnish polyperhydrosilanes and polyperhydrogermanes, which are used in a range of desirable applications. The choice of the proper monomers with the proper substituents permits control of the outcome of the polymerization (the backbone structure of the polymer), whereas the choice of the proper techniques to replace the precursor substituents with hydrogen permits preservation of the desired backbone structure. The polymerization techniques can involve cross-linking by dehalogenative coupling or dehydrocoupling, and linear polymerization by ring-opening of monomers presented by formula V. The polymer modification techniques can involve halogenation reaction and/or reaction with the source of hydride.

Functional liquids can be used for production of amorphous and polycrystalline silicon or germanium, and silicon or germanium oxide or nitride films by spincoating or printing, followed by curing at 400-600 DEG C. and (optionally) laser- or heat-induced crystallization (and/or dopant activation, when dopant is present).

Furthermore, the materials described herein can have additional advantages in that cross-linking permits a larger variety of attainable polyperhydrosilanes and polyperhydrogermanes and, therefore, enables matching properties of such polymers with requirements of a larger variety of applications;

dehalogenative coupling or dehydrocoupling in conjunction with the cross-linkable monomers permits controlled synthesis of viscous and soluble polyperhydrosilanes, polyperhydrogermanes, and their precursors; it allows synthesis of lightly cross-linked, HMW polymers in a controlled way, to predetermined specifications;

linear polyperhydrosilanes and polyperhydrogermanes of higher molecular weight permit a better match of physical properties of the polymers with requirements of selected applications;

polymerization of monomers represented by formula V permits controlled synthesis of viscous and soluble polyperhydrosilanes, polyperhydrogermanes, and their precursors; it allows to synthesize linear, HMW polymers in a controlled way, to predetermined specifications;

halogenation and/or reaction with the source of hydride allow for the conversion of the cross-linked or linear precursor polymers into the cross-linked or linear product, respectively; these reactions provide an avenue for modification of the groups on Si and/or Ge atoms of the polymer without any substantial changes to the backbone of the polymer;

the deposition of Si and Ge materials as liquids can replace the slow and energy-consuming vacuum deposition processes; it also allows to shape and pattern these materials without photolithography and etching; and conversion of the deposited liquid material into semiconductor, conductor, or dielectric material permits manufacturing of printed electronic devices and photosensitive members made of such materials as elemental silicon or germanium, and silicon or germanium oxide or nitride.

Although the description above contains many specificities, these should not be construed as limiting the scope of invention but as merely providing illustrations of some of the presently preferred embodiments of this invention. The specific details are set forth in order to provide a thorough understanding of the present invention and enable others skilled in the art to best utilize the invention and various embodiments with various modifications as are suited to the particular use contemplated. The invention is intended to cover alternatives, additions, omissions, substitutions, and other modifications and equivalents, which may be included within the spirit and scope of the invention as defined by the appended claims. In other instances, well-known methods, procedures, components, and circuits have not been described in detail so as not to unnecessarily obscure aspects of the present invention. Thus the scope of the invention should be determined by the appended claims and their legal equivalents, rather than by the examples given.

I claim:

1. A method of preparing a hydrogenated cross-linked polymer, comprising:
   polymerizing a reactive composition comprising a mixture of at least two different monomers, wherein the monomers are represented by the formula III:

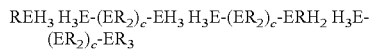

(III)

wherein every E is independently a Si atom or a Ge atom, every R group is independently selected as specified below, and c is a number from 0 to 100, to form a cross-linked polymer represented by the formula I:

(I)

wherein every E is as specified above, every R group is independently a hydrogen, a halogen, an alkenyl group, a substituted alkenyl group, an alkynyl group, a substituted alkynyl group, an aromatic hydrocarbyl group, a substituted aromatic hydrocarbyl group, a heterocyclic aromatic hydrocarbyl group, a substituted heterocyclic aromatic hydrocarbyl group, a $SiR^1_3$ group, a $GeR^1_3$ group, a $NR^1_2$ group, a $PR^1_2$ group, an $OR^1$ group, or a $SR^1$ group; every $R^1$ group is independently a hydrogen, a hydrocarbyl group, or a substituted hydrocarbyl group; wherein the R groups are optionally linked to each other to form a stable bridging group and the $R^1$ groups are optionally linked to each other to form a stable bridging group; wherein the average a is a number from 2 to 1,000,000, and a fraction of the R groups are replaced with cross-linking bonds between polymer chains wherein the cross-linking chains comprise $-(ER_2)_{a'}-$ polymeric chains with the R groups being independently selected from the R groups above, and a' is a distribution of numbers with an average from 1 to about 1000; and when the R groups of the polymer represented by the formula I are not H, reacting the product of polymerization with a source of hydride to replace the R groups with H to form said hydrogenated cross-linked polymer.

2. The method of claim 1 wherein the polymerization is driven with an apparatus for conducting electrolysis or with a catalyst selected from the group consisting of $Cp_2 MH_2$, $CpCp^*MH_2$, $Cp_2M(CH_3)_2$, $CpCp^*M(CH_3)_2$, $Cp_2M(C_6H_5)_2$, $CpCp^*M(C_6H_5)_2$, $Cp_2M(C_2H_5)_2$, $CpCp^*M(C_2H_5)_2$, $Cp_2M(C_3H_7)_2$, $CpCp^*M(C_3H_7)_2$, $Cp_2M(C_4H_9)_2$, $CpCp^*M(C_4H_9)_2$, $R^2_dR^3_eM$, $R^2_dR^3_eM^{f+}A^{f-}$, in situ synthesized analogs thereof, and immobilized derivatives thereof, wherein Cp is $C_5H_5$ cyclopentadienyl and Cp* is $C_5(CH_3)_5$ pentamethylcyclopentadienyl, wherein M is selected from the group consisting of metals and metalloids of group 3 through group 13 of the Periodic Table of Elements, lanthanides, and actinides; d and e are integer numbers from 0 to 10, f is a number from 0 to 2, every $R^2$ is independently a $SiR^4_3$ group, a $GeR^4_3$ group, a $NR^4$ group, a $NR^4_2$ group, a $NR^4_3$ group, a $PR^4$ group, a $PR^4_2$ group, a $PR^4_3$ group, an $OR^4$ group, a $SR^4$ group, and a cyclopentadienyl group or substituted cyclopentadienyl group represented by the formula $C_5H_gR^4_{5-g}$, the $R^2$ are optionally linked to each other to form a stable bridging group, wherein g is an integer number from 0 to 5, every $R^4$ is independently selected from the group consisting of a hydrogen, a hydrocarbyl group, a substituted hydrocarbyl group, an $OR^5$ group, a $C(=O)R^5$ group, a $CO_2R^5$ group, a $SiR^5_3$ group, a $GeR^5_3$ group, or a $NR^5_2$ group; the $R_4$ groups are optionally linked to each other to form a stable bridging group, wherein every $R^5$ is independently a hydrogen, a hydrocarbyl group, or a substituted hydrocarbyl group, the $R^5$ groups are optionally linked to each other to form a stable bridging group, $R^3$ is independently a CO group, a $R^6CN$ group, a $R^6NC$ group, a hydride group, a hydrocarbyl group, a substituted hydrocarbyl group, a $SiR^6_3$ group, a $GeR^6_3$ group, a $NR^6$ group, a $NR^6_2$ group, a $NR^6_3$ group, a $PR^6$ group, a $PR^6_2$ group, a $PR^6_3$ group, a $OR^6$ group, or a $SR^6$ group, the $R^3$ are optionally linked to each other to form a stable bridging group, wherein every $R^6$ is independently a hydrogen, a hydrocarbyl group, a substituted hydrocarbyl group, an $OR^7$ group, a $C(=O)R^7$ group, a $CO_2R^7$ group, a SiR$^7_3$ group, a GeR$^7_3$ group, or a NR$^7_2$ group, the R$^6$ are optionally linked to each other to form a stable bridging group, wherein every R$^7$ is independently a hydrogen, a hydrocarbyl group, or a substituted hydrocarbyl group, the R$^7$ are optionally linked to each other to form a stable bridging group, and A$^{j-}$ is an anion selected from the group consisting of BF$_4^-$, PF$_6^-$, SbF$_6^-$, CF$_3$SO$_3^-$, CB$_{11}$H$_{12}^-$, CB$_9$H$_{10}^-$, CB$_9$H$_5$X$^1_5{}^-$, CB$_{11}$H$_6$X$^1_6{}^-$, B(C$_6$F$_5$)$_4^-$, and [(M$^1$)$_h$Z$^1$Z$^2$ ... Z$^j$]$^{j-}$, wherein X$^1$ is halogen, M$^1$ is B, Al, or Ga, h is a number from 0 to 4, j is an integer number from 0 to 12, or j is 4, and Z$^1$ through Z$^j$ are independently an H, a hydrocarbyl group, a substituted hydrocarbyl group, a halogen, a halogen substituted hydrocarbyl group, a halogen substituted hydrocarbyl organometalloid group, an OR$^8$, C(=O)R$^8$, CO$_2$R$^8$, and NR$^8_2$, wherein every R$^8$ is an H, a hydrocarbyl group, a substituted hydrocarbyl group, and a halogen substituted hydrocarbyl group, the Z$^1$ through Z$^j$ are optionally linked to each other to form a stable bridging group.

3. The method of claim 1 wherein the reactive composition comprises a solubilization agent selected from the group consisting of cryptands, crown ethers, encapsulating ligands, linear oligoethers, linear polyethers, compounds R$^9$O ((CR$^{10}_2$)$_k$O)$_m$R$^9$, compounds R$^9$(NR$^{11}$)((CR$^{10}_2$)$_k$(NR$^{11}$))$_m$R$^9$, compounds R$^9$N[((CR$^{10}_2$)$_k$O)$_m$(CR$^{10}_2$)$_k$]$_2$NR$^9$, and compounds N[((CR$^{10}_2$)$_k$O)$_m$(CR$^{10}_2$)$_k$]$_3$N, wherein k and m are numbers from 1 to 20, every R$^9$ and R$^{11}$ are independently a hydrocarbyl group or a substituted hydrocarbyl group, every R$^{10}$ is independently a hydride group, a hydrocarbyl group, or a substituted hydrocarbyl group, the R$^9$, R$^{10}$, and R$^{11}$ are optionally linked to each other to form a stable bridging group.

4. The method of claim 1 wherein the source of hydride is selected from the group consisting of LiH, NaH, KH, LiAlH$_4$, NaBH$_4$, NaAlH$_2$(OCH$_2$CH$_2$OCH$_3$)$_2$, H$_n$M$^2_p$X$^2_q$R$^{12}_r$, and H$_n$M$^2_p$M$^3_s$X$^2_q$R$^{12}_r$, wherein n, p, q, r and s are independently numbers from 0 to 20, M$^2$ and M$^3$ are independently Li, Na, K, Rb, Cs, Mg, Ca, Sr, B, Al, Si, or Sn, every X$^2$ is an independently a halogen, and every R$^{12}$ is independently a hydrocarbyl group, a substituted hydrocarbyl group, a NR$^{13}_2$ group, or an OR$^{13}$ group, wherein every R$^{13}$ is independently a hydrocarbyl group or a substituted hydrocarbyl group, the R$^{12}$ and R$^{13}$ groups are optionally substituted with a plurality of O and N atoms, the R$^{12}$ are optionally linked to each other to form a stable bridging group, and the R$^{13}$ are optionally linked to each other to form a stable bridging group.

5. The method of claim 1 further comprising halogenating the product of polymerization prior to reacting the product of polymerization with the source of hydride, wherein the halogenation replaces one or more of the R groups of the polymer represented by the formula I with a halogen atom and the halogenation is carried out by reacting the product of polymerization with a halogenation source, wherein the halogen source is HX$^3$, R$^{14}$(C=O)X$^3$, or a combination of HX$^5$ with M$^6$X$^3$, wherein X$^3$ is independently a halogen and X$^5$ is OMs (methanesulfonate group), OTf (trifluoromethanesulfonate) group, or OTs (toluenesulfonate) group; wherein M$^6$ is Li, Na, K, Cs, or Rb; and wherein R$^{14}$ is a hydride group, a hydrocarbyl group, or a substituted hydrocarbyl group.

6. The method of claim 5 wherein the halogenation is facilitated by a catalytic composition comprising M$^4_t$X$^4_u$, wherein M$^4$ is selected from the group consisting of metals and metalloids of group 3 through group 13 of the Periodic Table of Elements, lanthanides, and actinides, X$^4$ are independently a halogen, t is a number from 1 to 5, and u is a number from 1 to 30.

7. The method of claim 1 further comprising halogenating the product of polymerization prior to reacting the product of polymerization with the source of hydride, wherein the halogenation replaces one or more of the R groups of the polymer represented by the formula I with a halogen atom and the halogenation is carried out by reacting the product of polymerization with a halogenation source, wherein the halogen source is HX$^3$, R$^{14}$(C=O)X$^3$, or a combination of HX$^5$ with M$^6$X$^3$, wherein X$^3$ is independently a halogen and X$^5$ is OMs methanesulfonate group, OTf trifluoromethanesulfonate group, or OTs toluenesulfonate group; wherein M$^6$ is Li, Na, K, Cs, or Rb; and wherein R$^{14}$ is a hydride group, a hydrocarbyl group, or a substituted hydrocarbyl group, and wherein the monomers are represented by the formula III, but the R group of the monomers is not an aromatic hydrocarbyl group, or a substituted aromatic hydrocarbyl group.

8. The method of claim 1, wherein the total number of E atoms in the polymer is from 20 to 4000.

9. The method of claim 1, wherein R is hydrogen, a halogen, an aromatic hydrocarbyl group, a substituted aromatic hydrocarbyl group, a SiR$^1_3$ group, a GeR$^1_3$ group or a PR$^1_2$ group, and R$^1$ is hydrogen, an aromatic hydrocarbyl group or a substituted aromatic hydrocarbyl group.

10. The method of claim 9, wherein R$^1$ is hydrogen.

11. The method of claim 1, wherein said monomers are selected from the group consisting of REH$_3$ and H$_3$E-(ER$_2$)$_c$-EH$_3$.

12. The method of claim 11, where R is hydrogen, an aromatic hydrocarbyl group, a substituted aromatic hydrocarbyl group, a SiR$^1_3$ group, a GeR$^1_3$ group or a PR$^1_2$ group, and R$^1$ is hydrogen, an aromatic hydrocarbyl group or a substituted aromatic hydrocarbyl group.

13. The method of claim 2, wherein said catalyst for polymerizing said formula III monomers is selected from the group consisting of Cp$_2$MH$_2$, CpCp*MH$_2$, Cp$_2$M(C$_6$H$_5$)$_2$, and CpCp*M(C$_6$H$_5$)$_2$.

14. The method of claim 13, wherein M is a metal selected from the group consisting of Ti, Zr and Hf.

15. The method of claim 4, wherein said source of hydride is selected from the group consisting of LiAlH$_4$, NaBH$_4$ and NaAlH$_2$(OCH$_2$CH$_2$OCH$_3$)$_2$.

16. The method of claim 5, wherein said halogen source is HX$^3$.

17. The method of claim 6, wherein said halogen source is a combination of HX$^3$ and M$^6$X$^3$.

18. The method of claim 6, where M$^4$ is a group 13 element, X$^4$ is Br or Cl, t is 1 or 2, and u=3t.

19. The method of claim 6, wherein M$^4$ is Al and X$^4$ is Cl.

20. The method of claim 7, wherein said halogen source is HX$^3$.

21. The method of claim 1, wherein one or more of the R groups of the cross-linked polymer represented by the formula I are aryl groups.

22. The method of claim 1, wherein one or more of the R groups of the cross-linked polymer represented by the formula I are phenyl groups.

23. The method of claim 1, wherein the R is aryl or phenyl.

24. The method of claim 21 further comprising halogenating the product of polymerization prior to reacting the product of polymerization with the source of hydride, wherein the halogenation replaces one or more of the R groups of the polymer represented by the formula I with a halogen atom and the halogenation is carried out by reacting the product of polymerization with a halogenation source, wherein the halogen source is HX$^3$, R$^{14}$(C=O)X$^3$, or a combination of HX$^5$ with M$^6$X$^3$, wherein X$^3$ is independently a halogen and X$^5$ is OMs (methanesulfonate group), OTf (trifluoromethanesulfonate) group, or OTs (toluenesulfonate) group; wherein $M^6$ is Li, Na, K, Cs, or Rb; and wherein $R^{14}$ is a hydride group, a hydrocarbyl group, or a substituted hydrocarbyl group.

25. The method of claim 24 wherein the halogenation is facilitated by a catalytic composition comprising $M^4_t X^4_u$, wherein $M^4$ is selected from the group consisting of metals and metalloids of group 3 through group 13 of the Periodic Table of Elements, lanthanides, and actinides, $X^4$ are independently a halogen, t is a number from 1 to 5, and u is a number from 1 to 30.

26. The method of claim 24 wherein the source of hydride is selected from the group consisting of LiH, NaH, KH, LiAlH$_4$, NaBH$_4$, NaAlH$_2$(OCH$_2$CH$_2$OCH$_3$)$_2$, $H_n M^2_p X^2_q R^{12}_r$, and $H_n M^2_p M^3_s X^2_q R^{12}_r$, wherein n, p, q, r and s are independently numbers from 0 to 20, $M^2$ and $M^3$ are independently Li, Na, K, Rb, Cs, Mg, Ca, Sr, B, Al, Si, or Sn, every $X^2$ is an independently a halogen, and every $R^{12}$ is independently a hydrocarbyl group, a substituted hydrocarbyl group, a $NR^{13}_2$ group, or an $OR^{13}$ group, wherein every $R^{13}$ is independently a hydrocarbyl group or a substituted hydrocarbyl group, the $R^{12}$ and $R^{13}$ groups are optionally substituted with a plurality of O and N atoms, the $R^{12}$ are optionally linked to each other to form a stable bridging group, and the $R^{13}$ are optionally linked to each other to form a stable bridging group.

27. The method of claim 23 further comprising halogenating the product of polymerization prior to reacting the product of polymerization with the source of hydride, wherein the halogenation replaces one or more of the R groups of the polymer represented by the formula I with a halogen atom and the halogenation is carried out by reacting the product of polymerization with a halogenation source, wherein the halogen source is $HX^3$, $R^{14}(C=O)X^3$, or a combination of $HX^5$ with $M^6 X^3$, wherein $X^3$ is independently a halogen and $X^5$ is OMs (methanesulfonate) group, OTf (trifluoromethanesulfonate) group, or OTs (toluenesulfonate) group; wherein $M^6$ is Li, Na, K, Cs, or Rb; and wherein $R^{14}$ is a hydride group, a hydrocarbyl group, or a substituted hydrocarbyl group.

28. The method of claim 27 wherein the halogenation is facilitated by a catalytic composition comprising $M^4_t X^4_u$, wherein $M^4$ is selected from the group consisting of metals and metalloids of group 3 through group 13 of the Periodic Table of Elements, lanthanides, and actinides, $X^4$ are independently a halogen, t is a number from 1 to 5, and u is a number from 1 to 30.

29. The method of claim 27 wherein the source of hydride is selected from the group consisting of LiH, NaH, KH, LiAlH$_4$, NaBH$_4$, NaAlH$_2$(OCH$_2$CH$_2$OCH$_3$)$_2$, $H_n M^2_p X^2_q R^1_r$, and $H_n M^2_p M^3_s X^2_q R^{12}_r$, wherein n, p, q, r and s are independently numbers from 0 to 20, $M^2$ and $M^3$ are independently Li, Na, K, Rb, Cs, Mg, Ca, Sr, B, Al, Si, or Sn, every $X^2$ is an independently a halogen, and every $R^{12}$ is independently a hydrocarbyl group, a substituted hydrocarbyl group, a $NR^{13}_2$ group, or an $OR^{13}$ group, wherein every $R^{13}$ is independently a hydrocarbyl group or a substituted hydrocarbyl group, the $R^{12}$ and $R^{13}$ groups are optionally substituted with a plurality of O and N atoms, the $R^{12}$ are optionally linked to each other to form a stable bridging group, and the $R^{13}$ are optionally linked to each other to form a stable bridging group.

* * * * *